(12) United States Patent
Marty

(10) Patent No.: US 11,123,605 B1
(45) Date of Patent: Sep. 21, 2021

(54) SYSTEMS AND METHODS FOR MONITORING BASKETBALL SHOTS

(71) Applicant: Pillar Vision, Inc., Menlo Park, CA (US)

(72) Inventor: Alan W. Marty, Menlo Park, CA (US)

(73) Assignee: Pillar Vision, Inc., Menlo Park, CA (US)

( * ) Notice: Subject to any disclaimer, the term of this patent is extended or adjusted under 35 U.S.C. 154(b) by 0 days.

(21) Appl. No.: 15/366,606

(22) Filed: Dec. 1, 2016

Related U.S. Application Data

(63) Continuation of application No. 15/258,587, filed on Sep. 7, 2016, which is a continuation of application No. 14/979,401, filed on Dec. 27, 2015, which is a continuation of application No. 14/089,667, filed on Nov. 25, 2013, now Pat. No. 9,238,165, which is a continuation of application No. 12/966,301, filed on Dec. 13, 2010, now Pat. No. 8,617,008, which is a
(Continued)

(51) Int. Cl.
*A63F 7/06* (2006.01)
*A63B 24/00* (2006.01)
*A63B 69/00* (2006.01)

(52) U.S. Cl.
CPC ...... *A63B 24/0062* (2013.01); *A63B 69/0071* (2013.01); *A63B 2208/0204* (2013.01); *A63B 2220/17* (2013.01); *A63B 2220/833* (2013.01)

(58) Field of Classification Search
CPC ............ A63B 2225/50; A63B 24/0062; A63B 2220/40; A63B 2220/833; A63B 2220/836; A63B 43/00; A63B 2024/0025; A63B 2024/0028; A63B 2243/0037; A63B 24/0003; A63B 69/0071; A63B 71/06; A63B 2220/34; A63B 2220/44; A43B 3/0005; A43B 5/00; A63F 2300/105; G09B 19/0038; G09B 9/006
See application file for complete search history.

(56) References Cited

U.S. PATENT DOCUMENTS 4,545,576 A 10/1985 Harris
4,805,917 A * 2/1989 Cochran ............. A63B 47/025
273/397
(Continued)

OTHER PUBLICATIONS

Final Written Decision, USPTO PTAB Case No. IPR2014-00764, U.S. Pat. No. 8,622,832 B2, dated Nov. 12, 2015.
(Continued)

*Primary Examiner* — Justin L Myhr
(74) *Attorney, Agent, or Firm* — Maynard Cooper & Gale, P. C.; Jon E. Holland

(57) ABSTRACT

Methods and apparatuses related to monitoring basketballs are described. In particular, a system for monitoring basketballs may include at least one non-intrusive sensor for sensing motion of a basketball during a missed basketball shot as the basketball travels along a rebound flight path from a basketball goal. The system may also include at least one processor configured to i) generate, based on the sensed motion, trajectory parameters that characterize one or more states of the basketball along the rebound flight path and ii) generate feedback information using the trajectory parameters. The system may further include at least one feedback output mechanism for providing the feedback information to a user.

34 Claims, 29 Drawing Sheets

Related U.S. Application Data continuation-in-part of application No. 12/015,445, filed on Jan. 16, 2008, now Pat. No. 8,409,024, and a continuation-in-part of application No. 11/508,004, filed on Aug. 21, 2006, now Pat. No. 7,854,669, which is a continuation-in-part of application No. 10/242,373, filed on Sep. 11, 2002, now Pat. No. 7,094,164.

(60) Provisional application No. 60/880,773, filed on Jan. 16, 2007, provisional application No. 60/323,029, filed on Sep. 12, 2001, provisional application No. 60/348,057, filed on Jan. 11, 2002, provisional application No. 60/395,875, filed on Jul. 12, 2002, provisional application No. 61/286,474, filed on Dec. 15, 2009.

(56) References Cited

U.S. PATENT DOCUMENTS

| | | | |
|---|---|---|---|
| 4,999,603 A * | 3/1991 | Mele | A63B 71/06 273/371 |
| 5,365,427 A | 11/1994 | Soignet | |
| 5,471,383 A | 11/1995 | Gobush et al. | |
| 5,515,378 A | 5/1996 | Roy, III et al. | |
| 5,562,550 A | 10/1996 | Chartrand | |
| 5,566,934 A | 10/1996 | Black et al. | |
| 5,768,151 A * | 6/1998 | Lowy | A63B 24/0021 273/317.1 |
| 5,798,519 A | 8/1998 | Vock | |
| 6,148,271 A | 11/2000 | Marinelli | |
| 6,304,665 B1 * | 10/2001 | Cavallaro | A63B 24/0021 382/106 |
| 6,389,368 B1 * | 5/2002 | Hampton | A63B 24/0021 473/479 |
| 6,514,081 B1 * | 2/2003 | Mengoli | A63B 24/0003 434/252 |
| 7,094,164 B2 | 8/2006 | Marty et al. | |
| 7,854,669 B2 | 12/2010 | Marty et al. | |
| 8,408,982 B2 | 4/2013 | Marty et al. | |
| 8,409,024 B2 | 4/2013 | Marty et al. | |
| 8,617,008 B2 | 12/2013 | Marty et al. | |
| 8,622,832 B2 | 1/2014 | Marty et al. | |
| 9,238,165 B2 | 1/2016 | Marty et al. | |
| 2002/0160864 A1 * | 10/2002 | Mosley | A63B 69/0071 473/472 |
| 2003/0054905 A1 * | 3/2003 | King, Jr. | A63B 24/0021 473/467 |
| 2008/0015061 A1 | 1/2008 | Klein | |
| 2008/0312010 A1 | 12/2008 | Marty et al. | |
| 2013/0172058 A1 | 7/2013 | Marty et al. | |
| 2015/0332450 A1 | 11/2015 | Marty et al. | |
| 2016/0121193 A1 | 5/2016 | Marty et al. | |

OTHER PUBLICATIONS

*RSPCT Basketball Technologies, Ltd. v. Pillar Vision Corporation*, "Petition for Inter Partes Review of U.S. Pat. No. 7,094,164 Under 35 U.S.C. § 311 and 37 C.F.R. § 42.100," U.S. Patent and Trademark Office Patent Trial and Appeal Board, filed Oct. 1, 2020.

*RSPCT Basketball Technologies, Ltd. v. Pillar Vision, Inc.*, "Petition for Inter Partes Review of U.S. Pat. No. 7,854,669 Under 35 U.S.C. § 311 and 37 C.F.R. § 42.100," U.S. Patent and Trademark Office Patent Trial and Appeal Board, filed Oct. 1, 2020.

Bartlett, et al., "The relationship between basketball shooting kinematics, distance and playing position," Journal of Sports Science, 1993, pp. 285-293, vol. 14, No. 3.

Bartlett, et al., "The effects of increased shooting distance in the basketball jump shot," Journal of Sports Science, 1993, pp. 285-293, vol. 11, No. 4.

Kim, et al., "Physics-based 3D position analysis of a soccer ball from monocular image sequences," IEEE Xplore, 1998, pp. 1-7.

*RSPCT Basketball Technologies, Ltd. v. Pillar Vision, Inc.*, "Declaration of Expert, Gal Oz in Support of Petitioner, RSPCT Basketball Technologies, Ltd,'s Petition for Inter Partes Review of U.S. Pat. No. 7,094,164 under 35 U.S.C. §311 and 37 C.F.R. § 42.100," U.S. Patent and Trademark Office Patent Trial and Appeal Board, filed Oct. 1, 2020.

*RSPCT Basketball Technologies, Ltd. v. Pillar Vision, Inc.*, "Declaration of Expert, Gal Oz in Support of Petitioner, RSPCT Basketball Technologies, Ltd,'s Petition for Inter Partes Review of U.S. Pat. No. 7,854,669 under 35 U.S.C. §311 and 37 C.F.R. § 42.100," U.S. Patent and Trademark Office Patent Trial and Appeal Board, filed Oct. 1, 2020.

* cited by examiner

Coordinate system

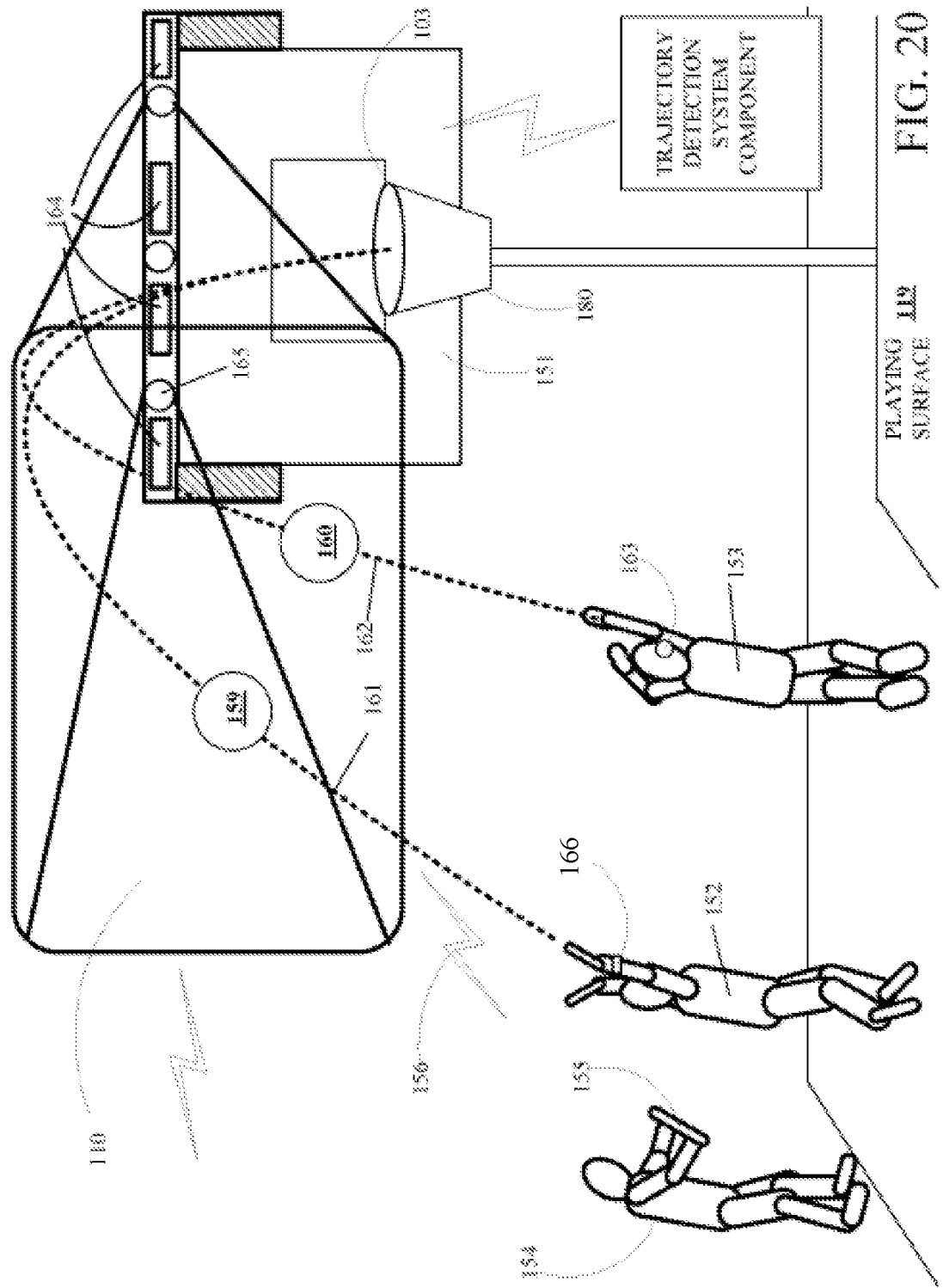

SYSTEMS AND METHODS FOR MONITORING BASKETBALL SHOTS

CROSS REFERENCE TO RELATED APPLICATIONS

This application is a Continuation Application and claims priority under 35 U.S.C. § 120 to U.S. application Ser. No. 15/258,587, filed Sep. 7, 2016, which is a Continuation Application and claims priority under 35 U.S.C. § 120 to U.S. application Ser. No. 14/979,401, filed Dec. 27, 2015, which is a Continuation Application and claims priority under 35 U.S.C. § 120 to U.S. application Ser. No. 14/089,667, filed Nov. 25, 2013, which is a Continuation Application and claims priority under 35 U.S.C. § 120 to U.S. application Ser. No. 12/966,301, filed Dec. 13, 2010, which is a Continuation In Part Application and claims priority under 35 U.S.C. § 120 to U.S. application Ser. No. 12/015,445, filed Jan. 16, 2008, which claims priority under 35 U.S.C. § 119(e) to U.S. Provisional Patent Application No. 60/880,773, filed Jan. 16, 2007. Additionally, U.S. application Ser. No. 12/015,445 is a Continuation In Part Application and claims priority under 35 U.S.C. § 120 to U.S. application Ser. No. 11/508,004, filed Aug. 21, 2006, now U.S. Pat. No. 7,854,669, which is a Continuation-in-Part Application and claims priority under 35 U.S.C. § 120 to U.S. application Ser. No. 10/242,373, filed Sep. 11, 2002, now U.S. Pat. No. 7,094,164, which claims priority under 35 U.S.C. § 119(e) to: U.S. Provisional Patent Application No. 60/323,029, filed Sep. 12, 2001; U.S. Provisional Patent Application No. 60/348,057, filed Jan. 11, 2002; and U.S. Provisional Patent Application No. 60/395,875 filed Jul. 12, 2002. U.S. application Ser. No. 14/089,667 is a Continuation In Part Application and claims priority under 35 U.S.C. § 120 to U.S. application Ser. No. 12/127,744, filed May 27, 2008, which claims priority under 35 U.S.C. § 119(e) to U.S. Provisional Patent Application No. 60/931,950, filed on May 24, 2007. Additionally, U.S. Application No. 12,966,301 claims priority under 35 U.S.C. § 119(e) to U.S. Provisional Patent Application No. 61/286,474, filed Dec. 15, 2009. All of the foregoing patents and patent applications are incorporated by reference in their entireties for all purposes.

BACKGROUND OF THE INVENTION

Field of the Invention

The present invention relates generally to devices and systems for sports training and entertainment and more specifically to a trajectory detection and feed back systems and outcome prediction in sporting environments.

Description of the Related Art

In sports, player performance is primarily results based. A player is said to be a good player when they produce a consistent result over some range of circumstances. For instance, a professional basketball player might be considered good when on average they produce a certain number of points per game, rebounds, assists, etc., over the course of a season. A player is said to be a great player when they produce a consistent result in more extreme circumstances, such as, in a championship or play-off game as well as providing good performances on average at other times. For example, some basketball players are known for being able to "take over a game" or impose their will on another team in certain situations and are considered to be great for this ability.

The difference between a great and a good player is often described as some intangible quality, such as their will or drive to succeed. Sometimes even when a player produces what appears to be a result consistent with a great player, it is argued that the player is not really great and their performance is a result of circumstances, such as having a really great supporting team. Further, in general, it is often difficult, in a quantifiable manner, to classify and distinguish the performances between players of varying abilities or to distinguish between varying performances by the same player, in regards to answering the questions, such as, why is player 1 good while player 2 is average, why does the performance of a player vary so much, what is a quantifiable different between two performances?

The intangible nature of describing in a quantifiable manner the differences between performances in a sporting environment can be frustrating to players, coaches, broadcasters and spectators alike. Players want to be able identify in a quantifiable manner why their own performances vary from one to another or how their performance varies from a better player so that they can improve their performance. Coaches in team and individual sports want this information so that they can help their players improve. In team sports, coaches may want this information as a way to exploit weaknesses possessed by opposing players. Broadcasters and spectators may want this information because it can add to the entertainment value of watching a sport. Further, spectators are also participants in many of the sports they watch, and thus the spectators may want to be able to quantify and compare their own performances as well as compare their performance to the performances of professional players or other participants of the sport in general.

In view of the preceding paragraphs, methods and apparatus are described in the following paragraphs for determining quantifiable differences between performances in a sporting environment that are not strictly results based. The methods and apparatus may include but are not limited to methods and apparatus related to 1) capturing a performance in a sporting environment, 2) analyzing a performance, 3) comparing performances, 4) presenting results obtained from any analyses or comparisons, 5) archiving captured performances, analyses and comparisons and 6) providing simulations of performances using captured and analyzed performance data.

SUMMARY

Methods and apparatus relating to predicting trajectory outcome in a sporting environment are described. The methods and apparatus may be used to relate trajectory performance of an object to body motions and body orientation associated with generating the trajectory of the object. When equipment is utilized to generate the trajectory of an object, than the effects of equipment motions and equipment orientation may be also related to trajectory performance. The methods and apparatus may be used to predict body motions and body orientations that increase the likelihood of achieving a desired trajectory outcome including specifying optimum motions and orientations for a particular individual to employ. The methods and apparatus may also be used to accurately assess performance and performance improvements of an individual relating to the individual generating trajectories with a desired outcome. The method and apparatus may be used in training, coaching and broadcasting environments.

One aspect of the invention may provide a method for basketball. The method may be generally characterized as comprising: 1) capturing, in a sequence of video frames, images of a basketball shot towards a basketball hoop where the images of the basketball are between leaving a hand of a shooter of the basketball and prior to the basketball making contact with a rim of the basketball hoop or a backboard coupled to the basketball hoop, 2) determining a trajectory of the basketball from the sequence of video frames; and 3) predicting an outcome of the trajectory wherein the outcome includes whether the basketball passes through the basketball hoop or does not pass through the basketball hoop. The predicting may include trajectories where the basketball makes contact with the rim.

Another aspect of the present invention may provide a method for basketball. The method may be generally characterized as comprising, 1) capturing a first plurality of actual basketball shots wherein, for each shot, images of the basketball are captured in a sequence of video frames wherein the images of the basketball are between leaving a hand of a shooter of the basketball and prior to the basketball making contact with a rim of the basketball hoop or a backboard coupled to the basketball hoop, 2) determining, for each of the first plurality of actual basketball shots, a trajectory of the basketball from the sequence of video frames associated with each shot; 3) determining a range for at least one trajectory parameter from the trajectories determined for the first plurality of actual basketball shots; and 4) generating a first plurality of simulated basketball shots including determining whether each of the first plurality of simulated basketball shots is a made or a missed shot where each of the trajectories of the first plurality of simulated basketball shots is generated using a value within the range of the at least one trajectory parameter.

In particular embodiments, a percentage of made shots in the first plurality of simulated basketball shots may be determined. The value for each the simulated trajectories may be determined using a random number. Further, the range may be determined using a statistical analysis. For example, the range may be based upon at least a statistical mean of the trajectory parameter and a deviation associated with the trajectory parameter.

Yet another aspect of the present invention may provide a method for basketball. The method may be generally characterized as comprising, 1) receiving data relating to an individual shooting a plurality of basketball shots, 2) determining a variability associated with the data; and 3) predicting a maximum shooting percentage for the individual based upon the variability. The data may be a sequence of video frames including images of the individual shooting the plurality of basketball shots. The variability may be associated with a range in parameter associated with a motion of a body part of the individual. Further, the variability may be associated with a range in a trajectory parameter associated with trajectories of a basketball generating from shooting the plurality of basketball shots. In addition, the variability may be associated with a range in a parameter associated with an orientation of a body part of the individual.

In particular embodiments, the method may further comprise relating the shooting percentage to a body orientation associated with shooting a basketball where the body orientation is associated with a release angle of a basketball as it leaves a hand of the individual or where the body orientation is associated with a release direction of a basketball as it leaves the hand of the individual.

A further aspect of the present invention provides method for basketball. The method may be generally characterized as comprising: 1) receiving data relating to an individual shooting a basketball shot, 2) generating one or more parameters associated with a body motion, a body orientation or combinations thereof of individual using the received data; and 3) predicting an outcome to the basketball shot from the one or more parameters. The data may be a sequence of video frames comprising images of the individual shooting the basketball shot. Further, the received data may include images generated during one or more of a) prior to the individual initiating a shot, b) while the shot is being taken, c) after the shot is taken and d) combinations thereof.

The method may further comprise generating an image that shows the outcome predicted for the plurality of basketball shots as a function of the one or more parameters. The one or more parameters may relate to 1) a body motion, a body orientation or combinations thereof prior to the individual initiating the shot, 2) a body motion, a body motion or combination thereof, during the shot or 3) a body motion, a body orientation or combinations after the shot. The image may be used in a broadcasting environment, coaching or training environment.

These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The invention will be readily understood by the following detailed description in conjunction with the accompanying drawings, wherein like reference numerals designate like structural elements, and in which:

FIG. 20 is a diagram of a trajectory capture and feedback scenario employing a trajectory detection and analysis device of the present invention.

DETAILED DESCRIPTION OF SELECTED EMBODIMENTS

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1A:
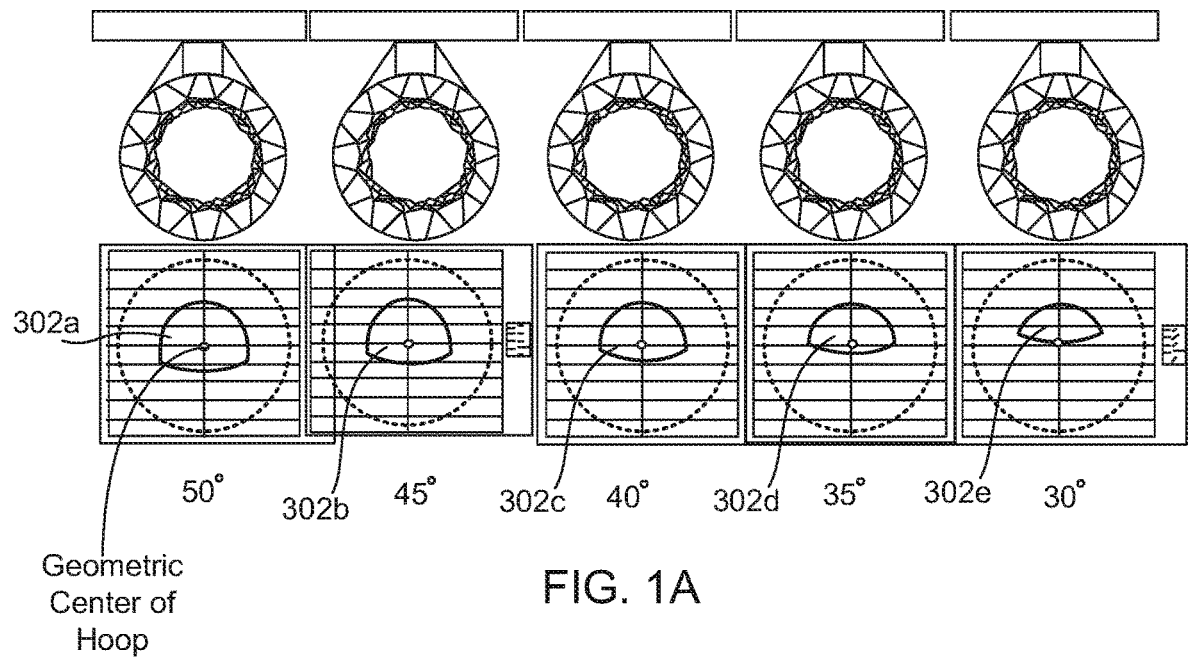
FIGS. 1A-1C are examples of graphic output formats related to the evaluation of a basketball trajectory performance including outcome prediction.
Figure 1B:
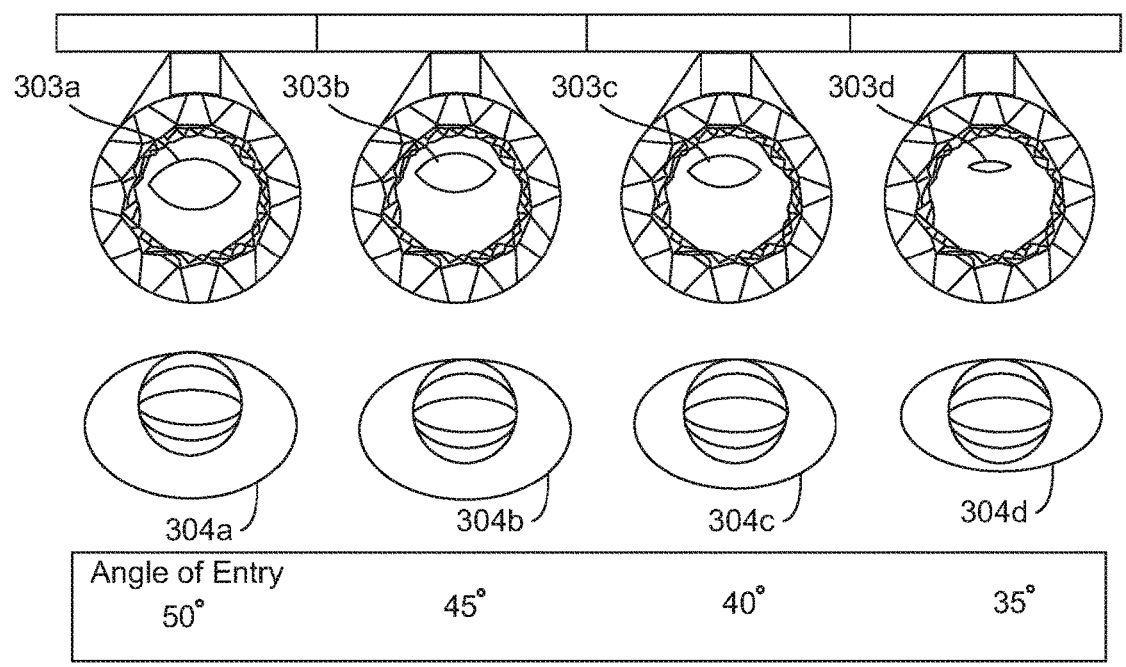
Figure 1C:
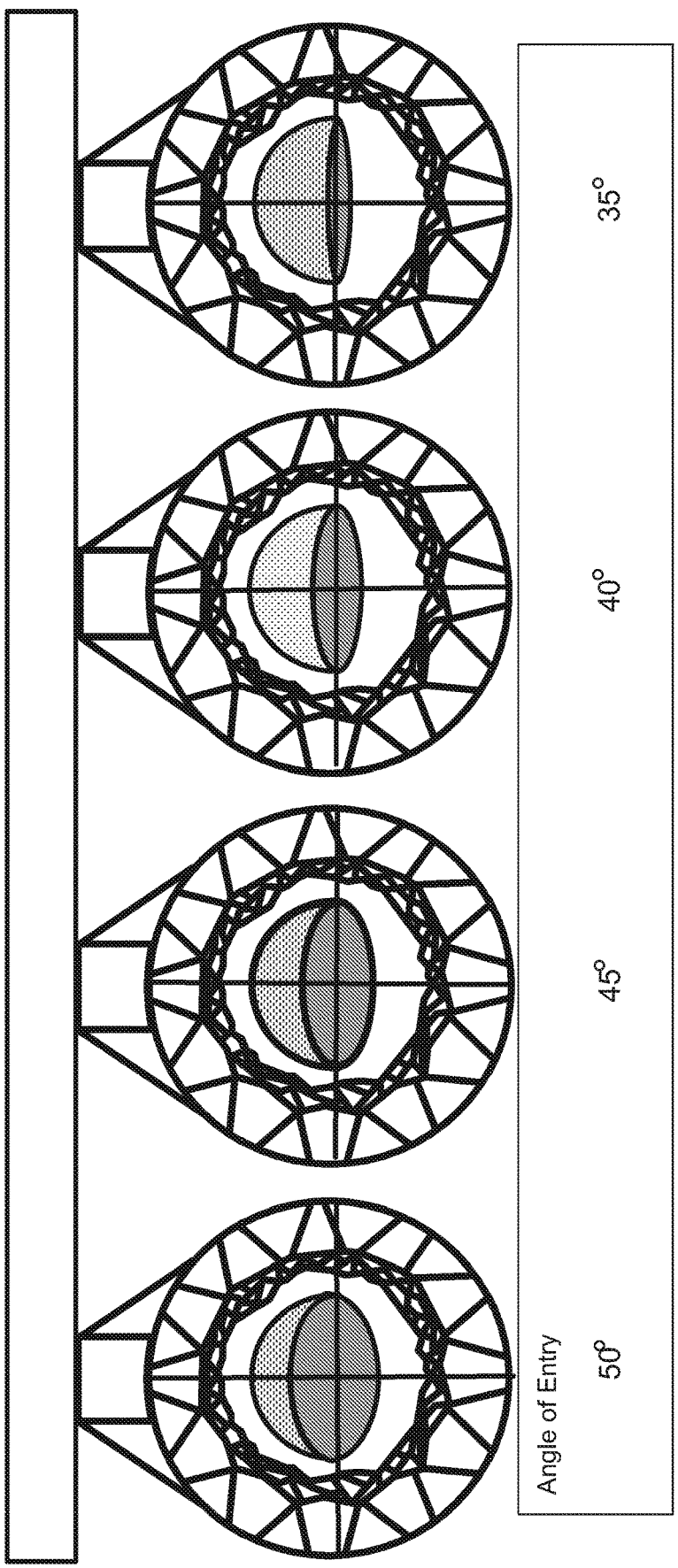

The following FIGS. 1A, 1B and 1C show the effect of the entry angle of the shot on the size of the make/miss zone. In FIG. 1A, the success criterion that leads to make miss/zones, 302a-302e, include shots that hit the rim and went in as well as shots that didn't hit the rim and went in. In FIG. 1B, the success criterion that leads to make/miss zones, 303a-303e, include only shots that don't hit the rim. For 302a-302e and 303a-303e, any shot where the center of the basketball passes through the make zone as it enters the basketball hoop is predicted to be a made shot, which is graphically represented in FIGS. 1A, 1B and 1C. As is shown in the following section, "Calculating Basketball Trajectory Dynamics: Basketball Swish/Make Analysis," the prediction methodology is validated experimentally but may not be 100% accurate.

FIGS. 1A, 1B and 1C provide examples graphic output formats related to the evaluation of a basketball trajectory performance for embodiments described herein. The make or miss zones for any entry angle may be generated, but in FIGS. 1A and 1B increments of five degrees starting at 30 degrees are shown. The location of shots in the make/miss zones for entry angles of 50, 45, 40, 35 and 30 are shown in FIGS. 1A and 1B. In FIG. 1C, make/miss zones for entry angles of 50, 45, 40 and 35 degrees are shown. In FIG. 1A, the outline of the area defining the make/miss zone is shown. This make/miss zone includes shot that went in the hoop after hitting the rim and shots that went in the hoop without touching the rim. The outline of each of the make/miss zone is drawn in the plane defining a top of a basketball hoop.

In FIG. 1B, the outline of the area of the make/miss zone, which includes only shots that went through the hoop with out touching the rim are shown. The make/miss zone is plotted for shots with entry angles of 50, 45, 40 and 35 degrees. Again, the outlines of the make/miss zones are drawn in the plane defining a top of a basketball hoop. In FIG. 1B, a graphical format showing the rim size, 304a-304d, from the point of view of the basketball is shown. As the entry angle of the basketball as it approaches the hoop decreases, the hoop appears smaller to the basketball. The entry angle decreasing relates to a basketball shot with a decreasing arc. Drawing the hoop from the perspective of the basketball is a way to graphically indicate that as the arc of the shot decreases, there is less room for error in shooting the ball in regards to placement of the ball between the front and the back of the rim.

At larger entry angles, the hoop appears larger to the basketball. Nevertheless, it has been observed the probability of making a shot decreases when the arc of the shot becomes too large. The probability of making a shot decreases for higher arced shots because changes in entry angle to the hoop at larger entry angles, which are associated with higher arced shots, affects the position of the ball as it enters the hoop more than changes in entry angle at lower entry angles associated with lower arced shots. This effect is illustrated and described in more detail with respect to FIGS. 3B-3F.

In FIG. 1C, the make zone is shown plotted within the center of the basketball hoop. The make zone is generated analytically and is plotted for different entry angles into the hoop. Any trajectory where the center of the basketball passes outside of the make zone, i.e., the area outside the make zone but within the basketball hoop will be a missed shot. Of course, shots outside of the basketball hoop will be a missed shot as well.

In FIG. 1C, the make zone is divided into two parts, a swish zone and a BRAD zone. The BRAD zone refers to shots where the basketball hits the Back of the Rim And goes Down through the basketball hoop. The Swish zone refers to shots that pass through the basketball hoop without hitting the rim. It can be seen in FIG. 1C, as the trajectory of the basketball flattens, i.e., the entry angle decreases, the rim becomes more important for making the shot. The rim becomes more important because as the entry angle decreases the percentage of made shots involving the rim increases. At higher entry angles, such as 50 degrees, swish shots are a much higher percentage of the made shots as compared to the made shots at the lower entry angles.

Figure 3A:
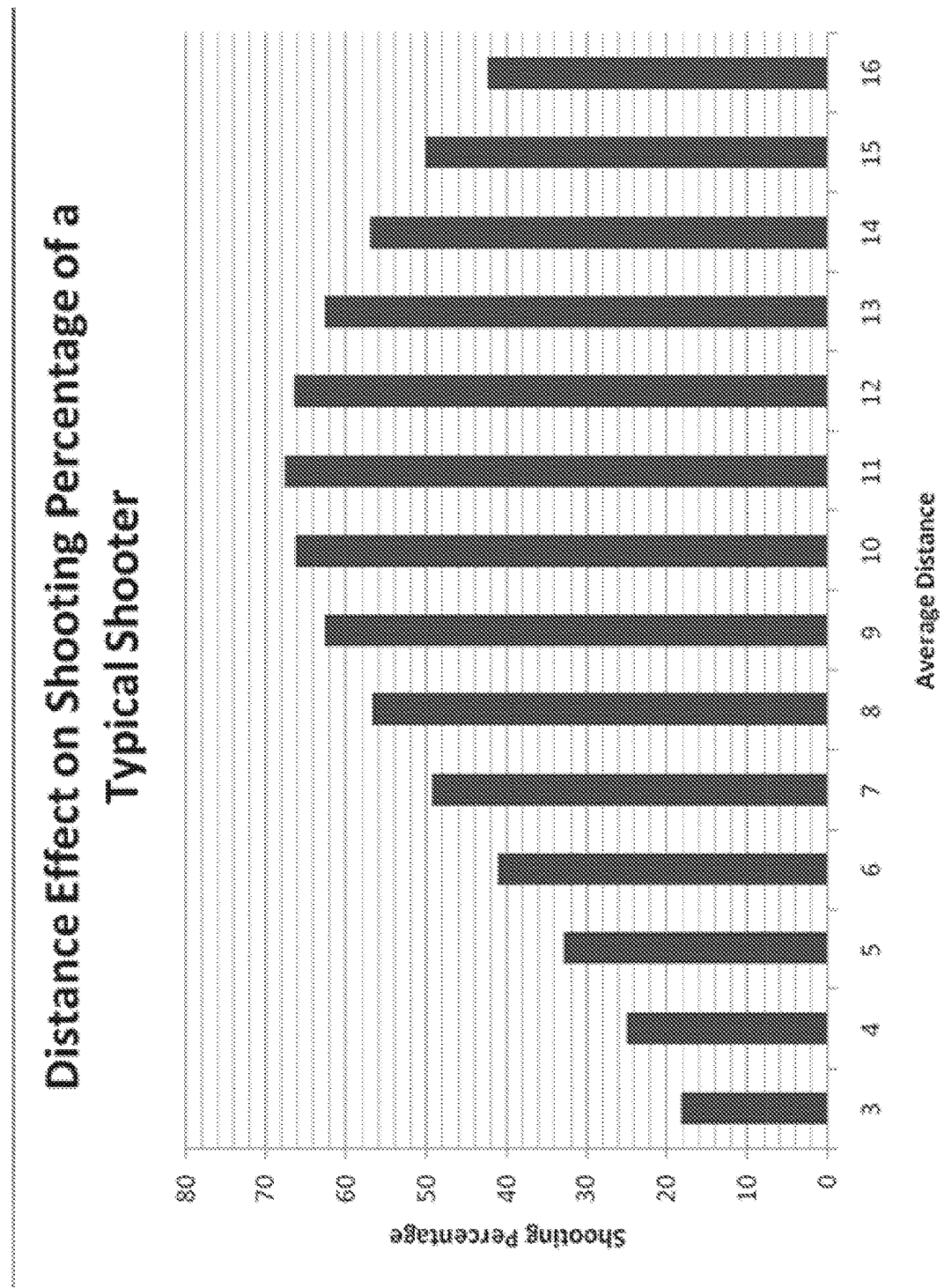
FIG. 3A is plot of predicted shooting percentage for shots aimed at various locations within a basket ball rim.
Figure 3B:
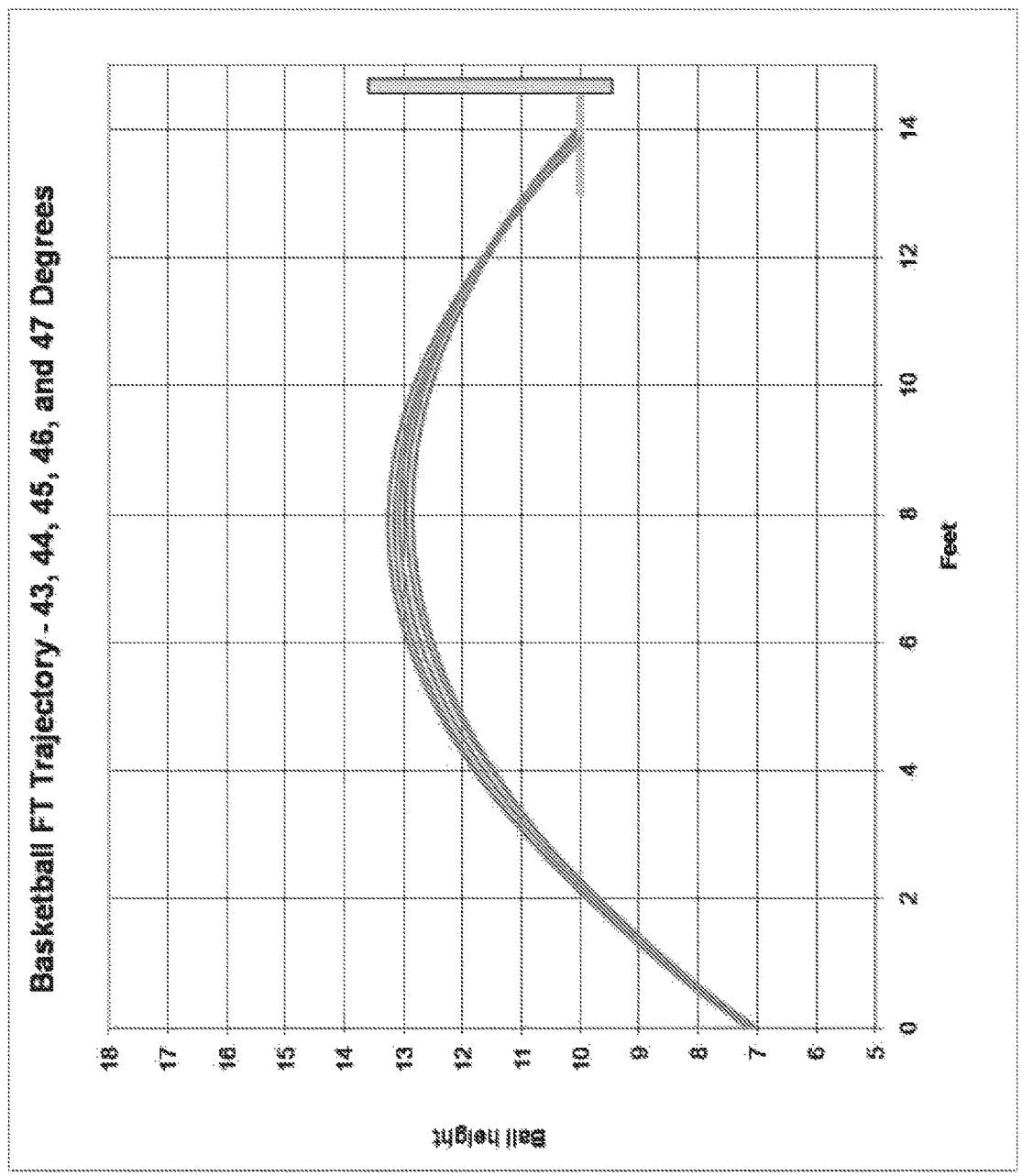
FIGS. 3B-3E show trajectories drawn through the center of a basketball for shots with entry angles that vary between 43 and 57 degrees respectively.
Figure 3C:
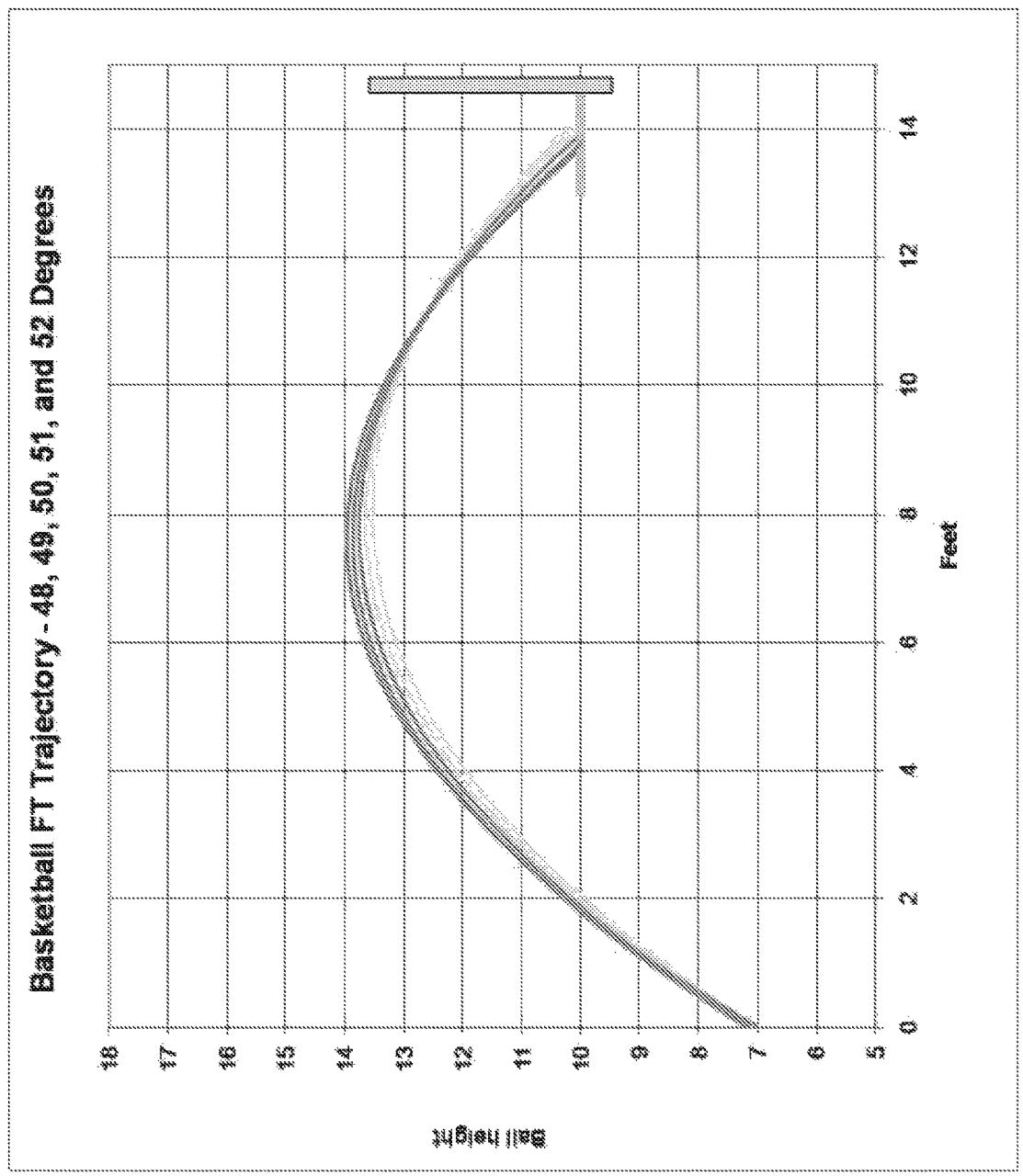
Figure 3D:
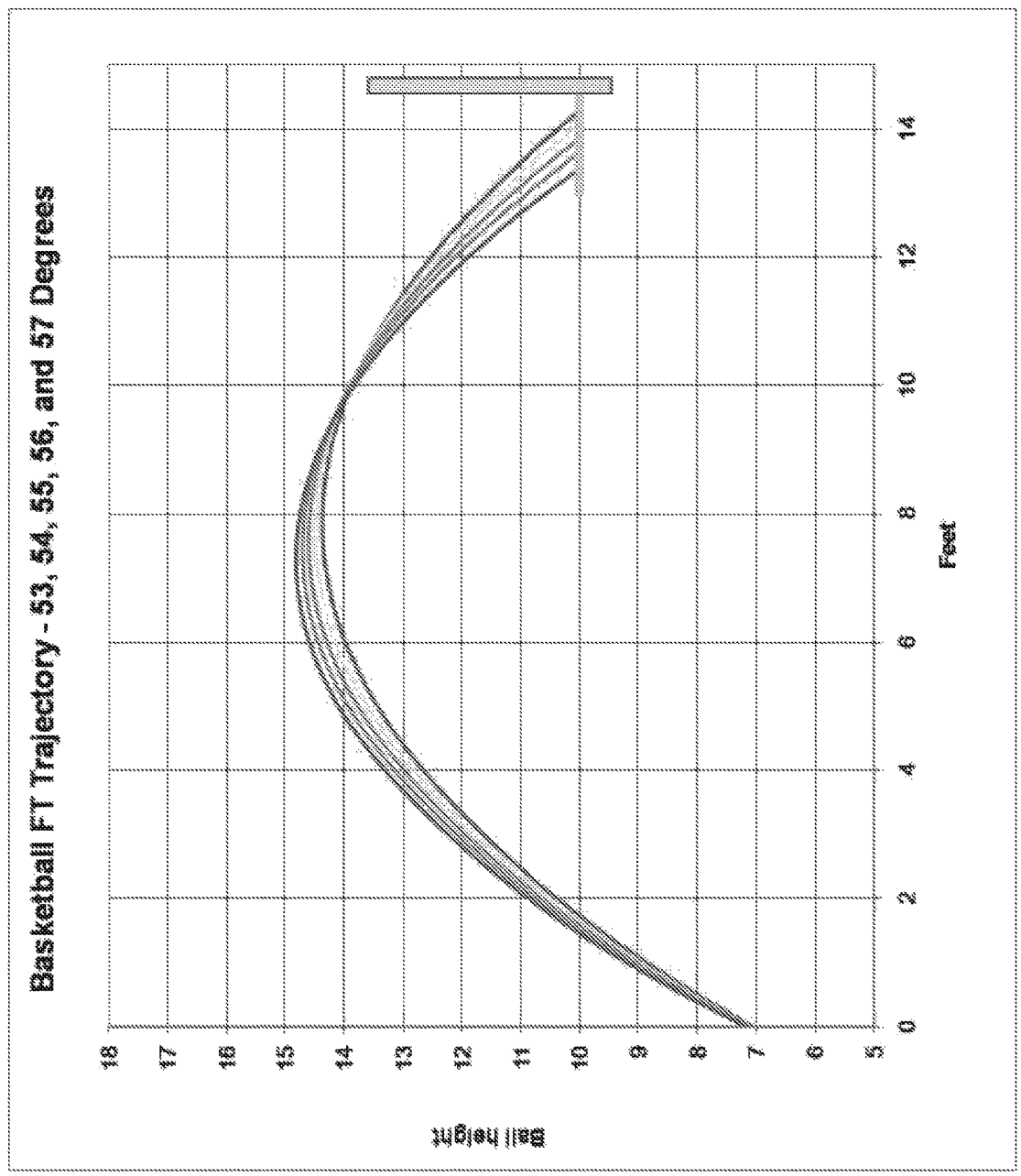
Figure 3E:
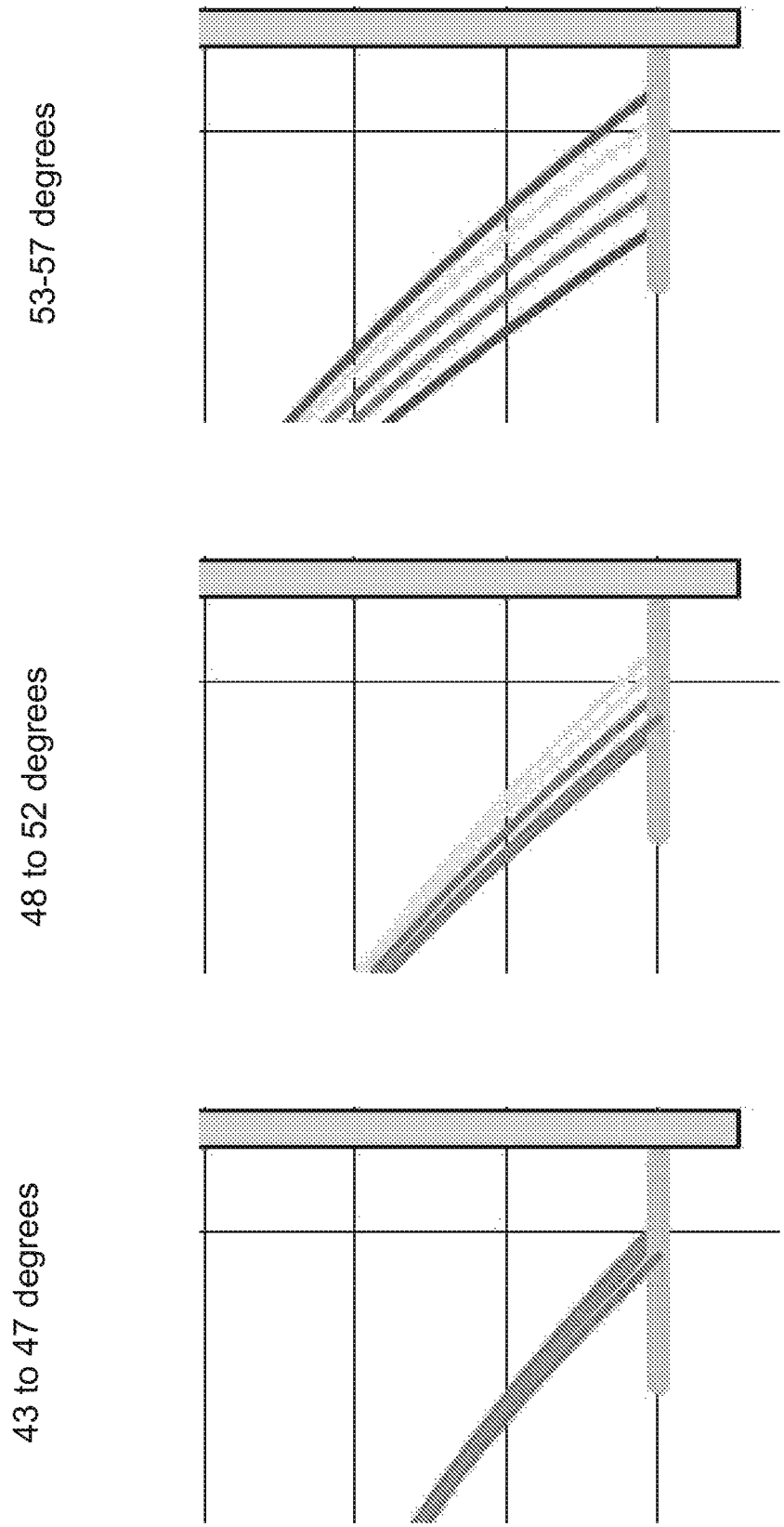

In FIGS. 3B-3F, a number of shot trajectories are simulated where all of the initial conditions are held constant accept for the arc of the shot. Each of the shots is a free throw released at a height of 7 feet. FIG. 3B shows shots with trajectories that enter the basket from 43-47 degrees, respectively. FIG. 3C shows shots with trajectories that enter the basket from 48-52 degrees, respectively. FIG. 3D shows shots with trajectories that enter the basket from 53-57 degrees, respectively. FIG. 3E shows the portion of the trajectories near the basket for each of the shots between 43 and 57 degrees shown in FIGS. 3B-3D.

In the figures, the initial shot conditions are selected that lead to shots with entry angles from 43-57 degrees. Fifteen shots are shown where the entry angle of the shots increases by one degree increments from 43 to 57 degrees. Trajectories are drawn through the center of the basketball. The trajectories start at the point where the shot is launch and end where the trajectory intersects the plane defined by the basketball rim. As the entry angle of the shots increase the arc of each shot also increases.

A comparison can be made between trajectories with entry angles that differ by one degree. For instance, a comparison can be made between the trajectories with entry angles of 44 and 45 degrees, 45 and 46 degrees, 54 and 55 degrees and 55 and 56 degrees, respectively. It can be seen in the figures that the distance between the locations at which the trajectories intersect the basketball rim is much greater between the 54, 55 and 56 degree shots as compared to the 44, 45 and 46 degree shots. Thus, if a first player tries to shoot shots with an average arc of 55 degrees and a second player tries to shoot shots with an average arc of 45 degrees, an error in the entry angle by the first player has a much greater effect on location at which the trajectory of the shot intersects the plane of the basketball rim than the second player. Entry angle errors for the first player trying to shoot at a 55 degree entry angle is much more likely to lead to a missed shot than entry angle errors for the player trying to shoot an arc of 45 degrees. This effect is further illustrated with respect to FIG. 3F.

Figure 3F:
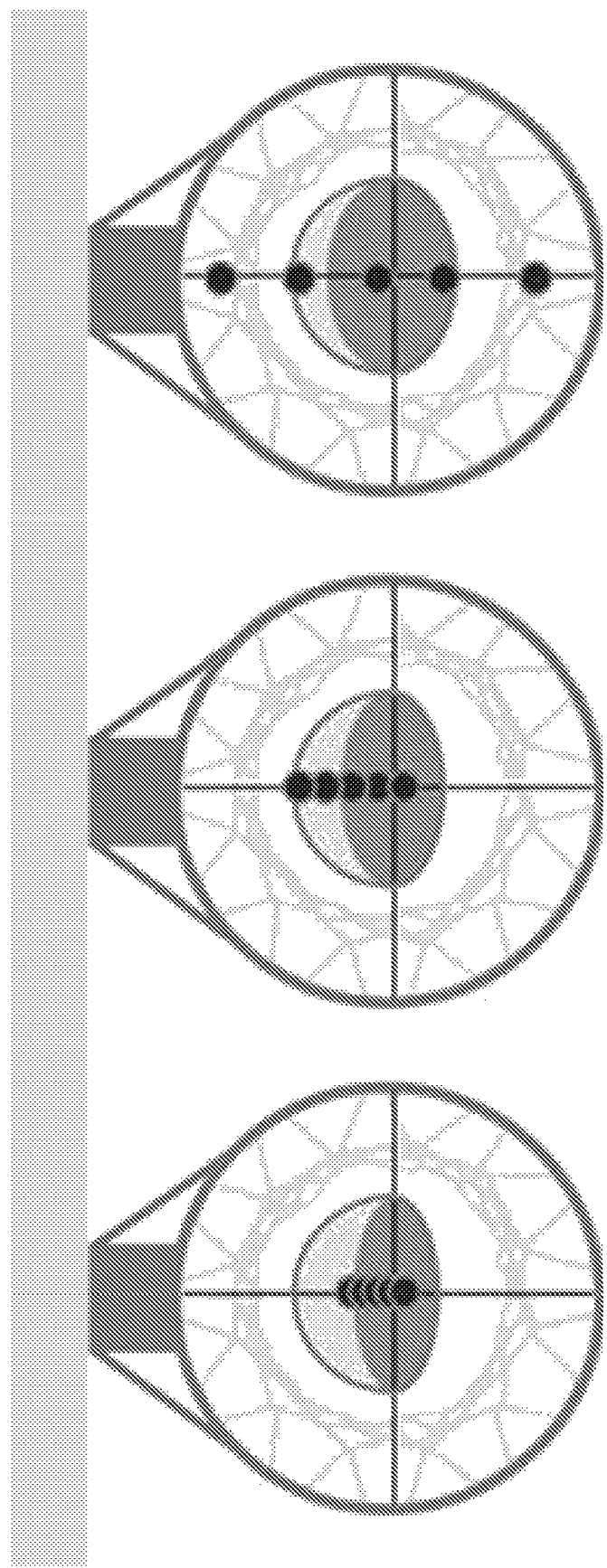
FIG. 3F shows make/miss zones and shot locations within the make/miss zone for the various shots shown in FIGS. 3B-3E.

FIG. 3F shows the locations at which the 43-47 degree trajectories intersect the plane of the basket ball rim where the locations are plotted on the make/miss zone for 45 degrees, the locations at which the 48-52 degree trajectories intersect the plane of the basketball rim, where the trajectories are plotted on the make/miss zone for 50 degrees and the locations at which the trajectories of the 53-57 degree trajectories intersect the plan of the basketball rim, where the locations are plotted on the on the make/miss zone for 55 degrees. It can be seen in FIG. 3F that the make/miss zone at 55 degrees is greater in area than the make/miss zone at 50 or 45 degrees. However, it can also be seen in the figure that for shots with entry angles near 55 degrees the effect of entry angle on shot location within the hoop is much greater than for shots with entry angles near 45 degrees. For the shots near 55 degrees, the changes in entry angle lead to shots falling outside the make/miss zone while at 45 degrees the changes in entry angle do not lead to shots falling outside of the make/miss zone. Thus, trying to shoot a shot with a higher entry angle, such as 55 degrees, is going to be more difficult on average to make than trying to shoot a shot with a lower entry angle, such as a 45 degree entry angle. This result is consistent with experimental data and theoretical predictions shown in FIGS. 12 and 13, which shows shooting percentage decreasing at higher shot entry angles.

Figure 2:
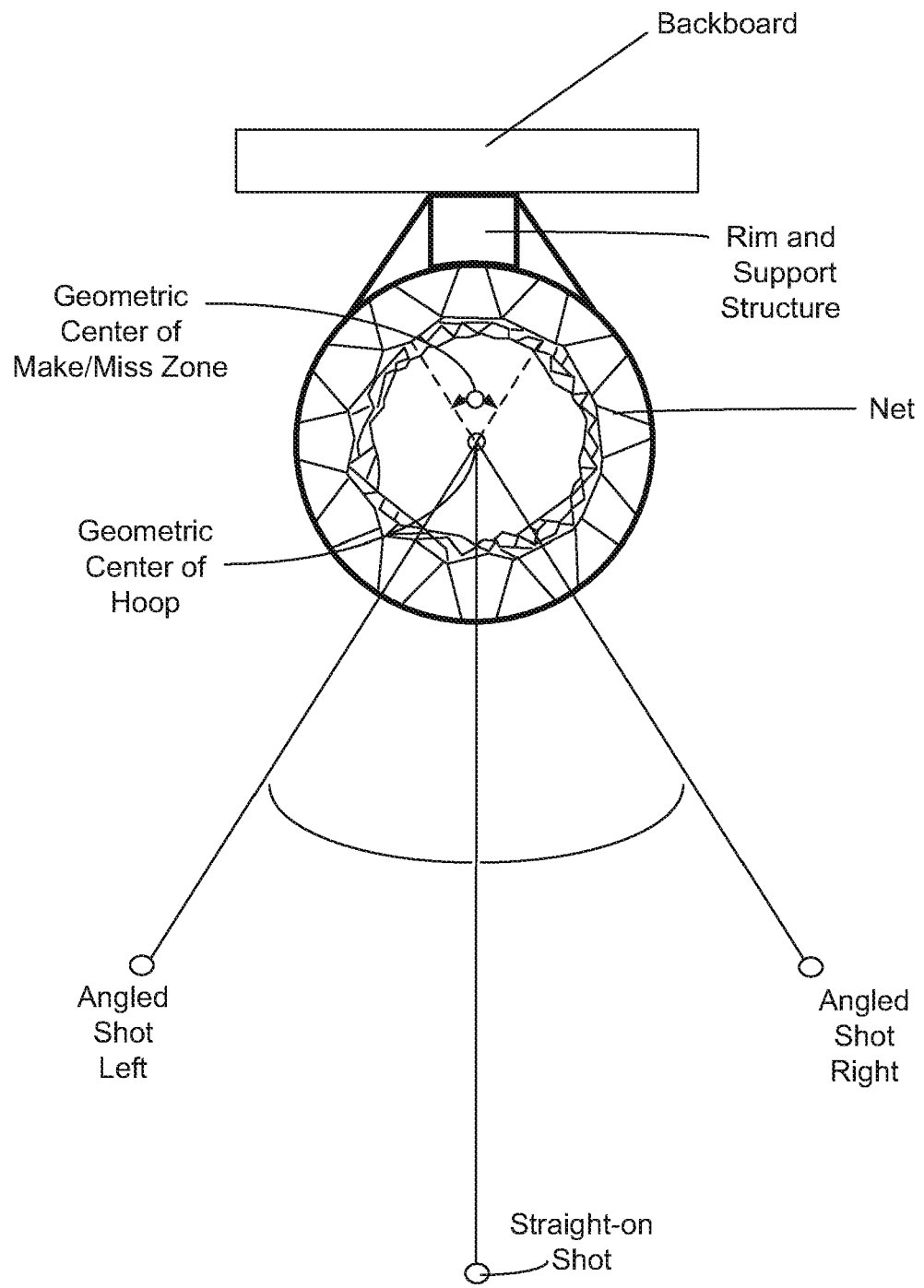
FIG. 2 shows a top view of a basketball rim, backboard and net including the geometric center of the hoop and the geometric center of the make/miss zone.

The shape of the make/miss zone can vary depending on the release point of the shot. FIG. 2 shows a top view of a basketball rim, backboard and net including the geometric center of the hoop and the geometric center of the make/miss zone. Because of back board/rim rebound effects, for shots released from an angle, such as either side of a straight-on shot as shown in the FIG. 2, the make/miss zone may not be symmetric around a line drawn from the shot location through the geometric center of the hoop, as it is for the straight on shots shown in FIG. 1A. Nevertheless, the geometric center of the make/miss zone may tend to move to the right of its location, which is shown for a straight on shot, for shots released from a location to the left of a straight on shot and the geometric center of the make/miss zone may tend to move to the left for shots released from a location to the right of a straight on shot.

Returning to FIG. 1A, the geometric center of the hoop within the area of the make/miss zone is shown. The make/miss zone includes shots that hit the rim in and go in as well as shots that pass through without touching the rim. The shot release point is for a shot released directly in front of the basketball hoop. In FIG. 1A, it can be seen that the geometric center of the hoop is not the geometric center of the make/miss zone. The geometric center of the make/miss zone is behind or deeper in the basket than the geometric center of the hoop. At an optimal shooting angle of about 43 degrees for a straight-on shot, the geometric center of the make/miss zone is about 2 inches behind the geometric center of the hoop.

The difference between the location of the geometric center of the hoop and geometric center of the make/miss zone suggests that it may be beneficial to shoot the ball deeper in the basket behind the geometric center of the basket. It can be seen in FIG. 1A that the margin of error a shot aimed toward the center of the hoop is greater if the shot is long as opposed to if the shot is short. A more equal margin of error for short and long shots can be obtained when the shot is aimed deeper, i.e., behind the geometric center of the hoop.

As an example, at 30 degrees entry angle, the geometric center of the hoop is approximately at the boundary of the make/miss zone. Thus, a shot aimed toward the center of the hoop will miss if a shooting error results in the shot being short at all or slightly off-center. If the shooting error results in the shot being long, then margin of error exists for the shot to still go in. The margin of error is much greater for the long shot than for the short shot. If the shot is aimed behind geometric center of the hoop, such as toward the geometric center of the make/miss zone, the shooting error margins for long and short shots are more equally balanced.

It is often observed that as a player gets tired over the course of a game, their shots are often short. If one player is trained to shoot deeper in the basket behind the geometric center of the hoop and another player is trained to shoot at the geometric center of the hoop, then as both players tire and their shots are more likely to go shorter, the player trained to shoot deeper in the basket may have an advantage over the player trained to shoot at the geometric hoop center. The player that is trained to shoot deeper in the basket may have an advantage over the other player because the player trained to shoot deeper would have a greater margin of error on their short shots than the player trained to shoot at the geometric center of hoop.

The strategy above assumes that for a given player the odds of making a shooting error, such as 'long or short' and 'left or right,' are equally likely for a given player. With an equal distribution among the probability of making a shooting error, it may be beneficial to balance the error margins for each type of shooting error that can occur. For instance, the player has a similar margin of error for a shooting error that results in the shot being short of its intended target or for a shooting error that results in the shot being past its intended target, i.e., long. If it were demonstrated for a particular player that their shooting errors were biased in a particular manner, such as the player was much more likely overshoot the target they were aiming for rather than undershoot their shot, it might be more advantageous to utilize another shooting strategy for this type of player.

As an example of a shooting strategy for a player with an unequal shooting error distribution, for a player that always tends to shoot their shots long, it may be beneficial to implement a shooting strategy that favors increasing the error margins for long shots as opposed to short shots, such as training to aim their shots more towards the center of the hoop. Conversely, if a player tended to make more shooting errors short, than for this type of player it may be advantageous to devise a shooting strategy where they are trained to aim deeper in the basket as compared to a player equally likely to miss a shot short or a long shot. Similarly, a player that tends to have more shooting errors to the left as opposed to shooting errors to the right might gain an advantage if they trained to aim for a point in the basket that is slightly right of the center of the hoop rather than straight on.

Besides player variations, a likelihood of a shooting error may be affected by shooting physics. As described above, it takes more force to shoot a shot longer than a shot shorter. As the force used to generate a shot increases, velocity errors can become more important. Thus, for a given target location within the hoop, the error distribution for long shots, i.e., past the target location, as a function of the distance from the target location may differ with distance differently than short shots as a function of distance from the target location. For instance, the error rate as a function of distance for long shots may increase faster than the error rate as a function of distance for short shots because of the increasing forces associated with long shots. Based upon the error distribution, a target location can be selected that optimizes their chance of making a shot. As described above, this target location may be different than the geometric center of the hoop and may be closer to the geometric center of the make/miss zone but may not be exactly equal to the geometric center of the make/miss zone.

In general, shooting strategies can be developed for players in general or tailored to an individual player. A general shooting strategy can be developed based on an error analysis of the types of errors players as a group tend to make and then a shooting location within the hoop, which accounts for the make/miss zone, can be tailored that optimizes their chances of making shots based upon an error distribution of shooting errors that the group is likely to make. The optimal target location within the hoop that maximizes their chances of making the shot may be different than the geometric center of the hoop. For instance, the optimal target location may be closer to the geometric center of the make/miss zone, which tends to be deeper in the basket, i.e., behind the geometric center of the hoop. In addition, if because of a player's shooting habits or particular physique, i.e., such as being left handed or right handed, the player's tendency to make shooting errors is biased in a particular direction, then a shooting strategy including a shooting target location can be developed that accounts for the particular shooting errors of the individual. These shooting errors may be determined from analysis of shot data gathered using the measuring devices described with respect FIGS. 5-16.

Figure 3G:
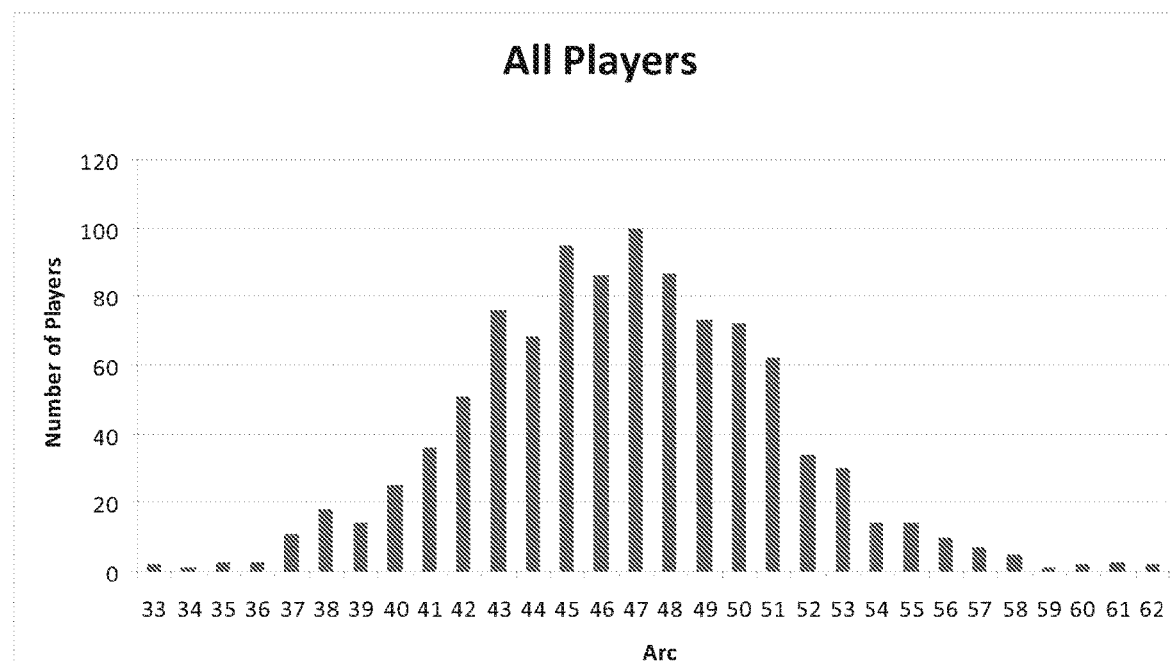
FIGS. 3G and 3H show entry angle and shot location data measured for 1000 players.
Figure 3H:
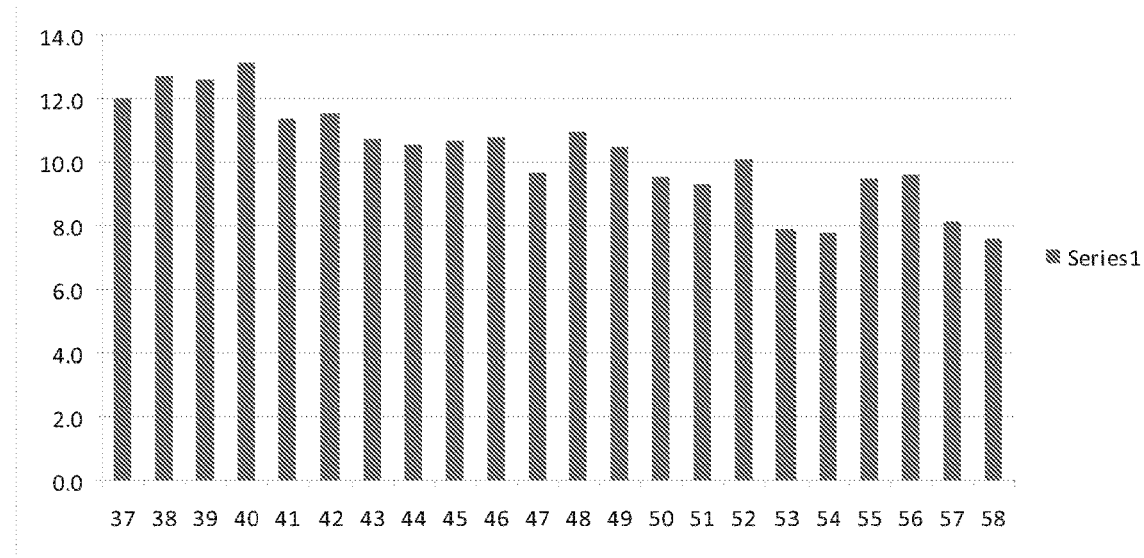

FIG. 3A shows a prediction of shooting percentage as a function of the distance from the front of the rim of the basketball hoop for a basketball rim with an 18 inch diameter. The prediction methodology is described in more detail with respect to FIGS. 8-13. In FIG. 3A, the shooting percentage peaks at a distance of about 11 inches from the front of the rim (the front of the rim is 0 inches), which is about two inches behind the center of the hoop at 9 inches. FIGS. 3G and 3H show entry angle and rim location data gathered using embodiments of the devices described herein for about 1000 players.

FIG. 3G shows a distribution of the average shot entry angle for the 1000 players. As discussed herein, an optimum entry angle is about 43 degrees. FIG. 3G illustrates that a large majority of players shoot a shot with a sub-optimal arc. FIG. 3H shows a location in the basket measure from the front of the rim as a function of the entry angle. As described above, 11 inches in the basket optimizes a predicted shooting percentage. FIG. 3H illustrates that most players shoot shots with trajectories that are not aimed at an optimal location within the basketball rim. This data indicates a large majority of players could benefit from the training methodologies and devices described herein.

Figure 4:
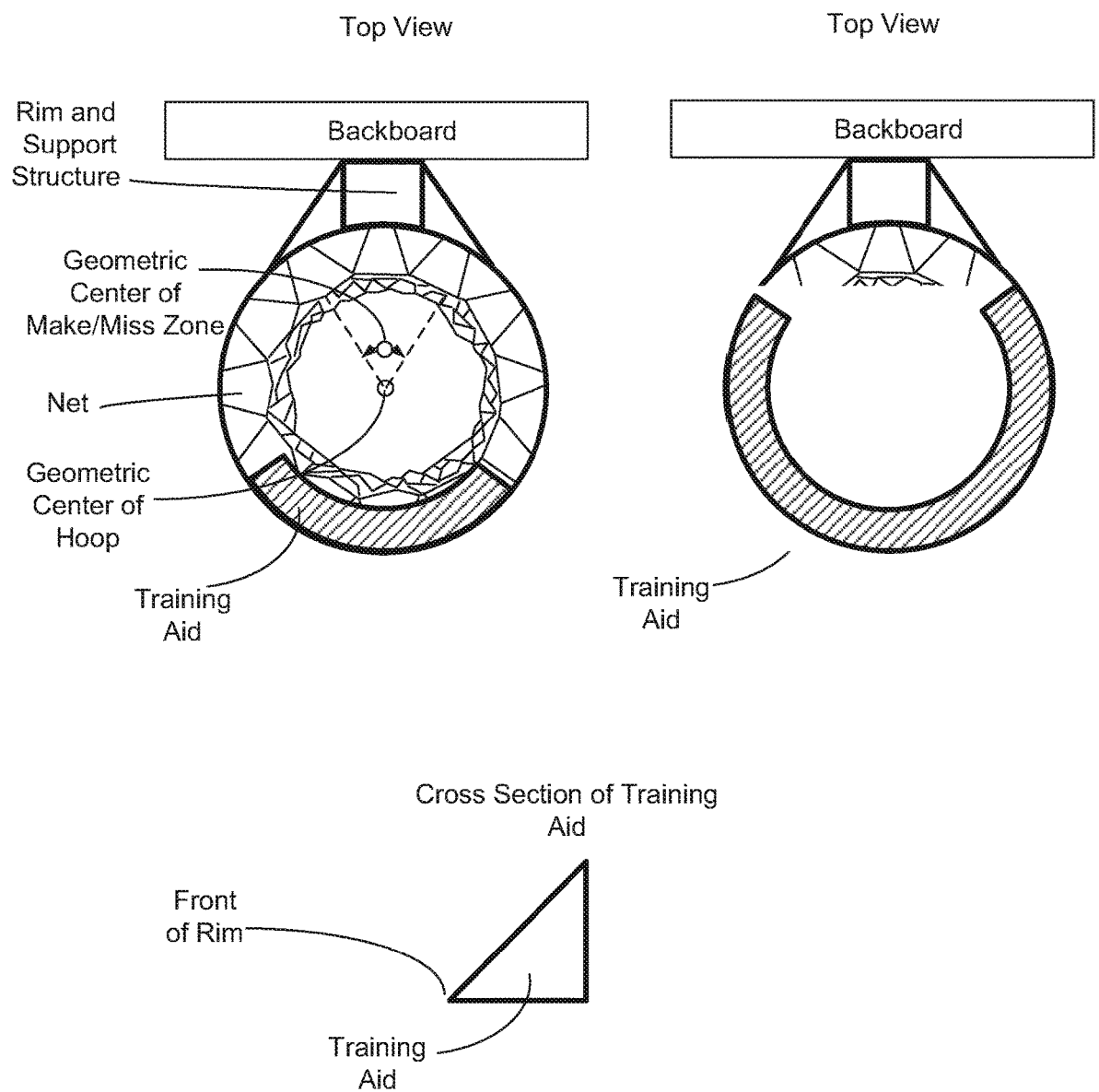
FIG. 4 shows top views of a backboard, basketball rim structure coupled to the backboard and net where a training aid is attached to the rim and a cross section of the training aid.

FIG. 4 shows top views of a backboard, basketball rim structure coupled to the backboard and net where a training aid is attached to the rim and a cross section of the training aid. A training aid can be devised that encourages a shot target location that differs from the geometric center of hoop. The training aid can extend around some portion of the perimeter of the hoop as shown in the figure. The distance that the training aid extends around the perimeter can be selected to allow training for shots other than straight on shots while also allowing for rim effects for long shots where the shot hits the back of the rim and goes in. The training aid can be coupled to the rim and backboard structure in some manner.

A possible triangular cross section for the training aid is shown in the figure. The height of the triangle can be selected to encourage a player to shoot deeper in the basketball, such as 2-3 inches behind the geometric center of the hoop. Typically, the height of the training aid will be less than 3 inches and possibly 2-2.5 inches above the top height of the rim. The height of the training aid in some embodiments may be lower. For instance, cross-section of the training aid could be more rectangular with the top of the training aid proximate to the top of the rim. The training aid can encourage players to shoot deeper because some shots that would normally be made will be deflected by the training aid.

As described with respect to FIG. 1C, shots that hit the rim and go in can be a large percentage of the made shots for a given entry angle. For example, as shown in FIG. 1C, shots that hit the back of the rim and go in, can compose a large fraction of the made shots for a particular entry angle. As shown in FIG. 1C, rim effects become more important at lower entry angles. Thus, In view of FIG. 1C, it may be desirable to consider rim effects when designing a training aid that encourages a player to shoot deeper in the basket.

When a shot approaches the basketball hoop along a particular trajectory, it can pass over the front of the rim and then interact with the back of the rim. As described above, a training aid can be developed that encourages a player to shoot deeper in the basketball by adding a hoop insert that blocks shots that just pass over the front the rim along its trajectory within some margin to encourage shots deeper in the basket. For instance, an insert can be designed that works for straight-on shots, i.e., a shot vector that is perpendicular to the backboard. This training aid can extend around some portion of the front of the rim. Since the insert only extends around the front portion of the rim, the back of the rim is unaffected and rim effects can be correctly reproduced.

To allow for non-straight on shots, the insert can be extended around perimeter of the rim. However, if the insert is extended too far, the insert can interfere with rim effects related to the back part of the rim associated with the shot vector. For instance, if the an insert extended around the front half of a basketball hoop, then for a shot from one side of the hoop, i.e., with a vector parallel to the back board, the insert can block shots that just cleared the front rim, which is desired, but can also block shots that would hit the back of the rim and go-in, which is not desired. In one embodiment, an insert can be provided that covers about 90-110 degree arc of the rim, i.e, about one quadrant of the basketball hoop. The insert can extend from about or slightly past the front of the rim to one side of the rim to allow for straight on shots as well as for shots from the side of the rim from one side of the basket only.

In another embodiment, the rim insert could be placed on a track, such that its position can be rotated around the rim. If a motor is provided, this rotation can be provided through actuation of the motor. Else, the rotation could be performed manually, such as by using a pole. As an example, an insert that spanned proximately a quarter of the hoop could be rotatable from one side of the hoop to another side of the hoop. To allow for shots from one side of the hoop, the insert would be rotated to a first position. To allow for shots from opposite side of the hoop, the insert can be rotated to the opposite side of the hoop by sliding it around the rim.

In yet another embodiment, if the insert can include parts that are rigid or flexible depending on the direction of the shot. For example, an insert can be configured that spans across the front-half of the rim. For a shot from one side of the basket, the part proximate to the front of the rim can be rigid, while the part proximate to the back of the rim can be flexible so as not to prevent the ball from hitting the back rim and going in. For a shot from the other side of the basket, the part that was previously flexible can be designed to be rigid as it is now the front of the rim for this shot and the part that was previously rigid can be flexible as it now the back of the rim for this shot. In one embodiment, the flexibility and rigidity of the insert can be varied using sensors and mechanical actuators.

The training aid can be tailored to shooting errors associated with a particular player, such that it encourages a shooting target location that is optimized for the shooting errors of an individual. As an example, the training aid may be asymmetric around a line drawn between a shot location and the center of the hoop to encourage a shot target location that is left or right of this line for a straight on shot. As described above, this may be advantageous if the player shooting errors are biased to the left or right of this line in some manner. For instance, for a player that tends to make more shooting errors to the left as opposed to the right, the training aid may extend deeper into the rim on left side of the hoop as opposed to the right to encourage the player to target a shot location that is shifted to right of center for a straight on shot. Shooting slightly to the right of the center of the hoop may better accommodate the player's tendency to the make more shooting errors to the left.

A trajectory capture and feedback system, as is described in the following figures, can also be used to help a player train to shoot to a target location in the hoop that differs from the geometric center of the hoop. This system could be used a training device as described with respect to FIG. 5 or separately from the training device. The feedback information could be provided relative to a selected target location within the hoop, such as 'short or long,' 'left or right' or combinations thereof. The feedback information could also be combined with other trajectory information, such as entry angle feedback. For instance, combination feedback could include short 43 or long 43 to indicate the entry angle was 43 degrees but the shot entered the basket short or long of the target location.

Figure 5:
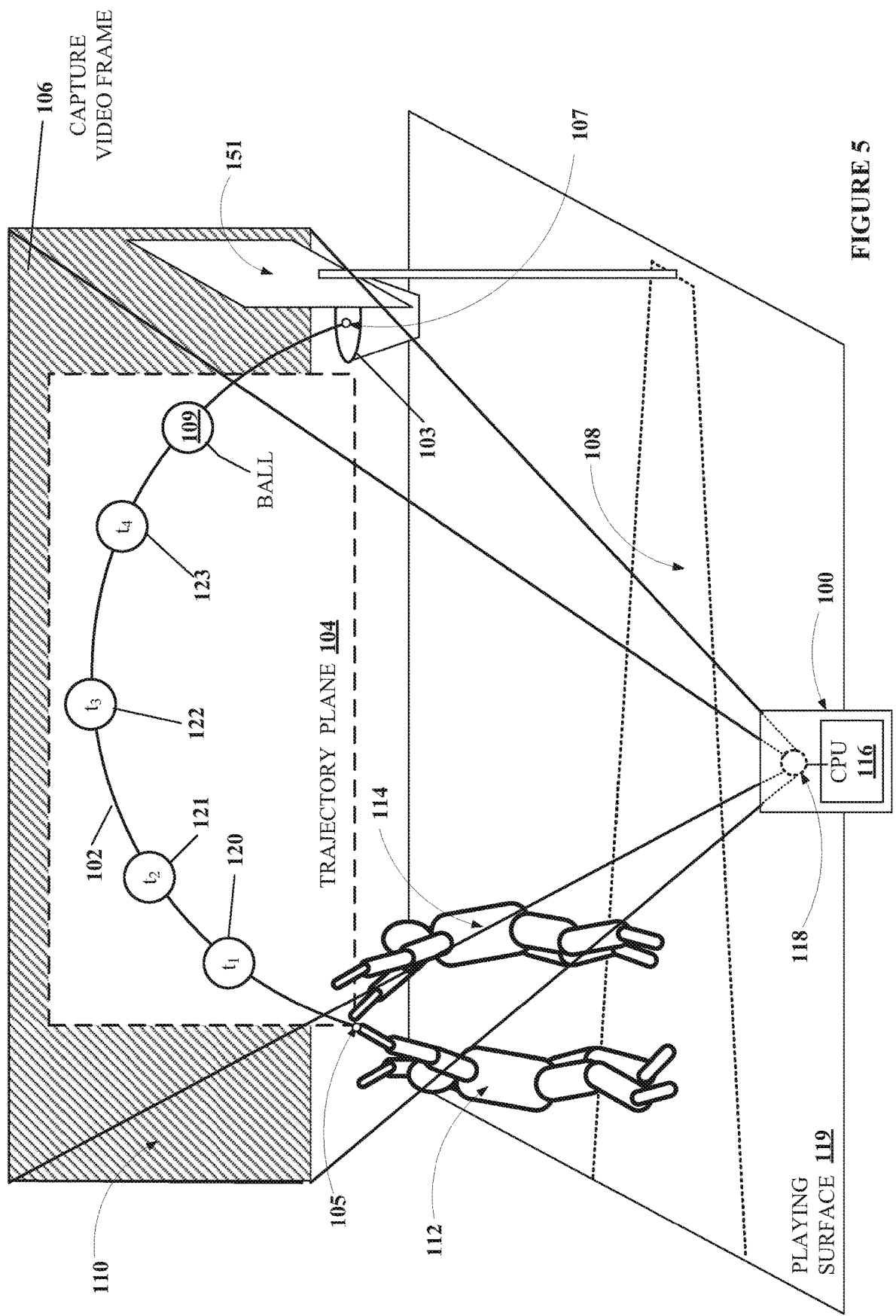
FIG. 5 is a diagram of a trajectory capture and feedback scenario employing a trajectory detection and feedback system.

FIG. 5 is a diagram of a trajectory capture and feedback scenario employing a trajectory detection and feedback system of the present invention. In the embodiment shown in the figure, a trajectory detection, analysis and feedback system 100 uses a machine vision system with a single camera 118 to detect and to analyze a trajectory 102 of a basketball 109 shot towards the basketball hoop 103 by the shooter 112. The camera 118 may record visible light.

The basketball hoop 103 may be mounted to a backboard 151 with a support system to hold it up, such as a pole anchored into the ground, a support anchored into a wall or supports suspended from a ceiling. The basketball hoop 103 may be of a standard height and the basketball may be a standard men's size basketball. However, trajectories for a basketball of a different size, such as a women's ball, shot at basketball hoop of varying heights may also be detected and analyzed with the present invention.

The camera 118 in the machine vision system records physical information within a detection volume 110. The physical information that is recorded is images of objects at a particular time in the detection volume 110. The images recorded at a particular time may be stored as a video frame 106. The camera 118 may capture images of the basketball 109 as it moves in trajectory plane 104 as well as images of other secondary objects. The secondary objects may be closer to the camera than the basketball 109 (i.e., between the camera 118 and the trajectory plane 104) or the secondary objects may be farther away from the camera than the basketball 109 (i.e., beyond the trajectory plane 104). The machine vision system may utilize software to distinguish between the movement of secondary objects that may be detected and the movement of the basketball 109.

The trajectory detection system 100 may be set-up in a playing area where basketball is normally played, such as a basketball court with playing surface 119 located in gymnasium or arena. The system 100 may be positioned on the side of court and remotely detect the trajectories of the shots by shooter 112 using the machine vision system. Thus, the shooter 112 and defender 114 may engage in any of their normal activities on the playing surface 119 without any interference from the detection system 100. In the figure, the shooter 112 is guarded by a defender 114. However, the system 100 may also be used when the shooter 112 is unguarded.

With a machine vision system that uses a single camera 118, the locations where the trajectory 102 may be accurately analyzed may be limited. In one embodiment, with the set-up of the trajectory detection system 100 on the side of playing surface 119, accurate analysis may require that the shooter 112 shoot from within the active area 108. In this alignment, the trajectory plane 104 may be nearly normal to the basketball backboard 151. Although, the system 100 may accurately detect and analyze trajectories where the angle between the trajectory plane 104 and the normal to the backboard 151 is within a few degrees. The active area 108 may be different for different systems 100. Further, the present invention is not limited to machine vision systems for detecting the trajectory of the basketball and other sensor systems may allow for different active areas.

The trajectory system 100 may be set-up in different locations around the playing surface 119. By moving the system 100, the active area 108 may be changed. For instance, the trajectory detection may be positioned behind the backboard 151. For this set-up, the active area 108 may be a rectangular area on the playing surface 119 that is parallel to the backboard 151.

Although the active area 108 may be limited with a single camera 118 in a machine vision system, an advantage of the system is it simple to set-up and to operate. With some multiple camera machine vision systems, the active area may be larger than with a single camera system. However, the set-up and calibration of a multi-camera system may be more time consuming as compared to a single camera system because a known alignment of the cameras relatively to one another and relative to the tracked object is needed to process the data.

The single camera system 100 is simple enough to be capable of autonomous set-up and operation with minimal user input. The system may autonomously calibrate itself using known distance markers, such as the height of the basketball hoop or a distance to a free throw line or 3-point arc, which may be captured in video frame data. In another embodiment, a user may be required to stand within the detection zone of the system, holding a basketball or other object, at a fixed distance from the camera and at a fixed height. After the system is calibrated, a user may use the system 100 to practice without the help of an additional operator to run to the system 100. The system 100 may accept voice commands allowing the user to adjust the operation of the system from a distance.

To analyze a trajectory 102 of the basketball 109, the camera 118 may record a sequence of video frames in the detection volume 110 at different times. The number of frames recorded by the camera over a give time period, such as the duration of the ball's trajectory 102, may vary according to the refresh rate of camera 118. The captured video frames may show a sequence of states of the basketball 109 at different times along its trajectory 102. For instance, the camera 118 may capture 1) an initial state 105 of the trajectory shortly after the ball leaves the shooter's hand, 2) a number of states along the trajectory 102, such as 120, 121, 122 and 123 at times t1, t2, t3 and t4 and 3) a termination point 107 in the basketball hoop 103. Although not shown, the system may also be used to generate parameters for characterizing the trajectory of missed shots relating to the rebound flight path, such as but not limited to a rebound height, rebound angle, rebound velocity.

The sequence of captured video frames may be converted to digital data by a video capture card for analysis by the CPU 116. The analysis of video frame data may require the detection volume 110 to remain constant during the trajectory 102. However, the detection volume 110 may be adjusted to account for different set-up conditions of a playing area where the system 100 is employed. For instance, the camera 118 may be capable of zooming in or out of a particular area and changing its focus.

The series of frames used to capture the trajectory may also capture the shooter 112 shooting the basketball 109 including all or a portion of the shooter's 112 body as well as the defender's body 114 during the shot. The physical information captured by the camera 118 regarding the shooter 112 and the defender 114 may also be analyzed by the system 100. For example, different motions of the shooter 112 may be analyzed by the system 100 determine if the shooter is using proper shooting mechanics. As another example, data, such as, a jump height, hang-time, a release point floor position on the playing surface 109, a landing position on the playing surface 109 may be determined using the video frame data captured by the camera 118 in the machine vision system.

After detecting and analyzing the trajectory 102, the system 100 may generate one or more trajectory parameters. The one or more trajectory parameters may be output as feedback information to the shooter 112 and the defender 114. Typically, the system 100 may provide the feedback information while the shot is in the air or shortly after the shot has reached the hoop 103. The feedback information may be provided within less than a second or less than 10 seconds of the initiation of the shot depending on the type of feedback information that is generated. The immediate feedback may increase the training benefits of using the system. The shooter 112 may use the feedback information to improve their skill at making shots. The defender 114 may use the feedback information to improve their defense in preventing the shooter from making their shots. A brief description of the methods used to develop the feedback information is described as follows.

The shooter 112 may also use the feedback information for rehabilitative purposes. For instance, after an injury and/or for psychologically reasons, a player's skill at shooting may decline from a previously obtained skill level. In rehabilitative setting, the present invention may be used by the player to regain their previous skill level and even improve upon their previous skill level. For instance, the feedback information provided by the present invention may increase a shooter's confidence which may provide psychological benefits that lead to an improvement in performance.

To develop basketball feedback information, the basic nature of a basketball shot is considered with the objectives of 1) informing the player in regards to what are a set of optimal trajectory parameters that they can adjust to increase their probability of making a shot and 2) informing their player about how their shots compare to the optimal. This information is output to the player as feedback information. As an example of this process, the basketball shot by the shooter 112 is described. However, the system 100 may be applied to the trajectories of other objects in different sports where optimal trajectory parameters may be different than basketball. Thus, the description is presented for illustrated purposes only.

The basketball shot by the shooter 112 travels in an essentially parabolic arc in the trajectory plane 104. The arc is essentially parabolic and the ball 109 travels in-plane because after the ball is released the dominant force acting on the ball is gravity 109. Other forces, such as ball spin, or if the ball is shot outside, wind, may cause the trajectory to deviate from a parabolic arc. But, when the ball is shot inside, these forces cause little deviation from the parabolic trajectory and a parabolic arc is a good approximation of the trajectory 102.

For each shot by the shooter with an initial release height, there are many different combinations of release velocity and release angles at the initial state 105 that allow the player to make the shot, i.e., the ball travels through the basket 103 and then many combinations of release velocity and release angles where the player does not make the shot. When a player shoots the basketball 109, the player selects a combination of release velocity and release angle. Typically, the selection of the shot parameters is performed intuitively and the player doesn't consciously think of what release velocity and release angle they are selecting. However, through training, the player may be able to improve their intuitive shot selection.

Within the group of the different combinations of release velocity and release angle that may be selected by the shooter, there are combinations of release velocity and release angle that provide the shooter with a greater or lesser margin of error for making the shot. For instance, for a basketball shot in the basket 103, an optimal entry angle into the hoop that provides the greatest margin of error is about 43-45 degrees measured from a plane including the basketball hoop 103. These optimal trajectories are close to trajectories that allow for the ball to reach to the basket 103 with a minimal amount of energy applied by the shooter. For perturbations around this optimal entry angle, such as when the defender 114 causes the shooter 112 to alter their shot, there are more combinations of release velocity and release angle that allow the shot to be made as compared to other combinations of release velocity and release angle away from the optimal.

With the general understanding of basketball trajectories provided above, methods may be developed for providing feedback information that allows for the shooter 112 to train for an initial state 105 that provides the greatest margin of energy i.e., a near minimum energy trajectory. In one embodiment of the present invention, an entry angle and an entry velocity of the basketball 109 near the termination point 107 are two trajectory parameters that may generated from the physical information recorded by the machine vision system in system 100. The entry angle and entry velocity are correlated to the release angle and the release velocity of the shot 102. Thus, after the shooter 112, releases the shot, the camera 118 may record a series of video frames with images of the ball 109 as it approaches the basket 103. With this information, the entry angle and the entry velocity of the shot may be generated. One or both of these trajectory parameters may be provided to the player as feedback information.

The feedback information may be provided to the shooter 112 and the defender 114 in one of a visual format, an audio format and a kinetic format. For instance, in one embodiment, on a visual display, the entry angle and/or entry velocity may be viewed in a numeric format by the players, 112 and 114. In another embodiment, when projected through an audio device, numeric values for these parameters may be heard by the players, 112 and 114. The audio feedback device may be a speaker built into the system 100, a speaker connected to the system 100 or audio devices worn by the players, 112 and 114 that receive information from the system 100. In yet another embodiment, a kinetic device, such as a bracelet or headband worn by the players may be used to transmit the feedback information in a kinetic format. For instance, the bracelet may vibrate more or less depending on how close the shot is to the optimum or may get hotter or colder depending on how close the shot is the optimum. Multiple feedback output mechanisms may also be employed. For instance, the feedback information may be viewed in a visual format by coaches or other spectators on a display while a sound projection device may be used to transmit the feedback information in an audio format to the players.

In general, the parameters may be presented qualitatively or quantitatively. An example of qualitative feedback may be a message such as "too high" or "too low" in reference to the entry angle of a shot by the player or "too fast" or "too slow" in reference to the entry velocity. An example of qualitative feedback may be the actual entry angle or entry velocity of the shot in an appropriate unit of measurement, such as a message of "45 degrees" for the entry angle. Again, the qualitative and/or quantitative information may be presented in different formats, such as a visual format, an auditory format, a kinetic format and combinations thereof.

With knowledge of what are optimal values of the trajectory parameters transmitted in the feedback information, the shooter 112 may adjust their next shot to generate a more optimal trajectory. For instance, if the feedback information is an entry angle and their shot is too flat, then the shooter 112 may adjust their next shot to increase their entry angle. Conversely, with their knowledge of what are the optimal values of the trajectory parameters, the defender 114 may adjust their defensive techniques to force the shooter 112 to launch a shot along a less than optimal trajectory 102. Thus, the defender 114 can experiment with different techniques to see which are most effective. In different training methods, the system 100 may be used to measure a trajectories for a shooter 112 training without a defender 114 or as is shown in the figure training with the presence of a defender 114.

The feedback information may be provided to the player before prior to the ball 109 reaching the basket or shortly after the ball reaches the basket 103. The system 100 is designed to minimize any waiting time between shots. For each shooter and for different training exercises, there may be an optimal time between when the shooter shoots the ball 109 and when the shooter 112 receives the feedback information. The system 100 may be designed to allow a variable delay time between the shot and the feedback information to suit the preferences of each shooter that uses the system 100 or to account for different training exercises that may be performed with the system. For instance, a rapid shooting drill may require a faster feedback time than a more relaxed drill, such as a player shooting free throws.

The present invention is not limited to providing feedback information for near minimum energy basketball trajectories. For instance, under some conditions, such as when a smaller player shoots over a larger player, it may be desirable for the shooter to shoot with a greater than optimal arc to prevent the larger player from blocking the shot. Thus, the shooter may use the feedback information provided by the system 100 to train for different conditions that may call for different types of shots, such as shooting over a larger player as compared to a wide-open shot. Further, the trajectory analysis systems of the present invention may be used to train in different types of basketball shots, such as bank shots, hook shots, lay-ups, jump shots, set-shots, free throws and running shots, that may requiring the mastery of different shooting skills and may have different optimal trajectory parameters. Thus, the detection system 100 may be adjustable to allow for training in different types of shots. Further, for different sports, different trajectory skills may be optimal for improving performance, which may be different than basketball. The different trajectory skills that may be required for different sports may be accounted for in the present invention.

A measure of how good a player's shooting skills may be a consistency of their trajectory parameters averaged in some manner over many shots. Typically, it has been determined empirically that better shooters have a lower variability in their trajectory parameters for a given shot, such as a free throw. Thus, to rate a shooter's performance, it may be desirable to generate trajectory parameters for a plurality of trajectories shot by a player in a trajectory session and then calculate a standard deviation for each of the trajectory parameters.

The standard deviation (SD) is a measure of the scatter of a particular set of data. It is calculated as, $$SD = [3(yi - y_{mean})^2/(N-1)]^{1/2}$$

where $y_{mean}$ is an average value of trajectory parameter, N is the number of trajectories and yi is a value of the trajectory parameter for a particular trajectory. There are other types of statistical parameters that may be used to characterize data variability and the present invention is not limited to the standard deviation formula described above.

During a trajectory session where a plurality of trajectories are analyzed by the system 100, the trajectory parameters generated for the plurality of trajectories may be stored to a mass storage device contained in the system 100 or in communication with the system 100. After the session, the standard deviation for all the trajectories in the session may be generated. In other embodiments, to provide measures of variability of different data sets representing different playing conditions, the system 100 may divide the trajectory data into different subsets, such as grouping according to types of shots, locations of shots, shots where the shooter is guarded, shots where the shooter is unguarded, made shots, swished shots, missed shots, shots made earlier in the session versus shots made later in the session, and combinations of these groupings.

The statistical variability calculated from the different data sets may be used as a guide by the system for suggesting methods that will improve the player's shooting skills. The system 100 may include software for suggesting methods based upon the statistical analysis. For instance, the system 100 may determine that a player's shot variability is greater when they are guarded as opposed to unguarded, thus, exercises may be prescribed to the player that focus and shooting while guarded. As another example, the player's shot variability may be greater later in a session as opposed to earlier in a session or greater in a training session before practice as opposed to after practice, thus, the system may suggest the player work on their aerobic conditioning. In yet another example, the player's shot variability may vary as a function of a distance from the basket and the system may suggest the player concentrate on shots at the distances where the variability is greatest.

In some embodiments, the trajectory session data and other information generated by the system 100 may be viewed via a number of different output mechanisms, such as a hard copy from a printer or a display. For example, a printer connected to the system 100 may be used to generate print-outs of trajectory session data in different formats. As another example, a display interface in communication with the system 100 may be used to view trajectory session data in different formats. In particular, the system 100 may include a touch screen interface for viewing trajectory session data and providing input parameters into the system. As another example, the system 100 may communicate with a portable viewing device capable of interfacing with the system 100.

Information generated with system 100, such as trajectory data from a plurality of trajectories in a trajectory sessions, may be archived. The archival storage system may be a remote storage device in communication with the system 100 or may be a mass storage device provided with the system 100. The archival storage system may include raw data of physical information recorded by the camera 118, such as video frame data, as well as, trajectory parameters and other information generated from analysis of the raw data. The archival data may store trajectory session data for a plurality of different trajectory sessions by one or more different players.

By accessing the archival data, an improvement over time for a particular parameter generated by the system 100, such as a shot variability parameter, may be assessed. Further, the archival data may be used for data mining and video editing purposes. For instance, in a video editing application, the graphic of the player's average trajectory may be integrated with video data of the player shooting. In another example, video clips of two or more different players shooting may be compared or video clips of a single player shooting during different trajectory sessions may be compared to show the player's improvement. In data mining applications, the video data may be further analyzed to characterize a player's shot mechanics. In another application, simulations may be generated to predict gains in team performance based-upon improvements in individual performance on the team. This type of simulation may require archival trajectory session data to be analyzed for a plurality of different players.

In some embodiments, the archival data may be accessible via a remote connection. For instance, a password-protected web-site may be used as a portal for accessing archival data generated from system 100. The web-site may allow clients, such as players, coaches, or scouts to gain access to the web-site from remote sites, such as home computer connected to the Internet or a portable computer connected to the Internet. The web-site may include a plurality of analysis tools and a graphical interface for viewing graphical data from the applications in different formats. In another embodiment, the archival data may be downloaded to a CD, DVD or other portable storage medium that the player can take with them. Analysis software may also be downloaded with the archival data so that the player can analyze the data on another computer.

Information generated during a trajectory session may be stored in a database. The database may relate player identification information, such as a name, an address, a team, a session time, a session location, a session data to raw data recorded during the trajectory session and information generated during the trajectory session. The database may be used for player tracking purposes and targeting services to players that have used the trajectory system.

Figure 6:
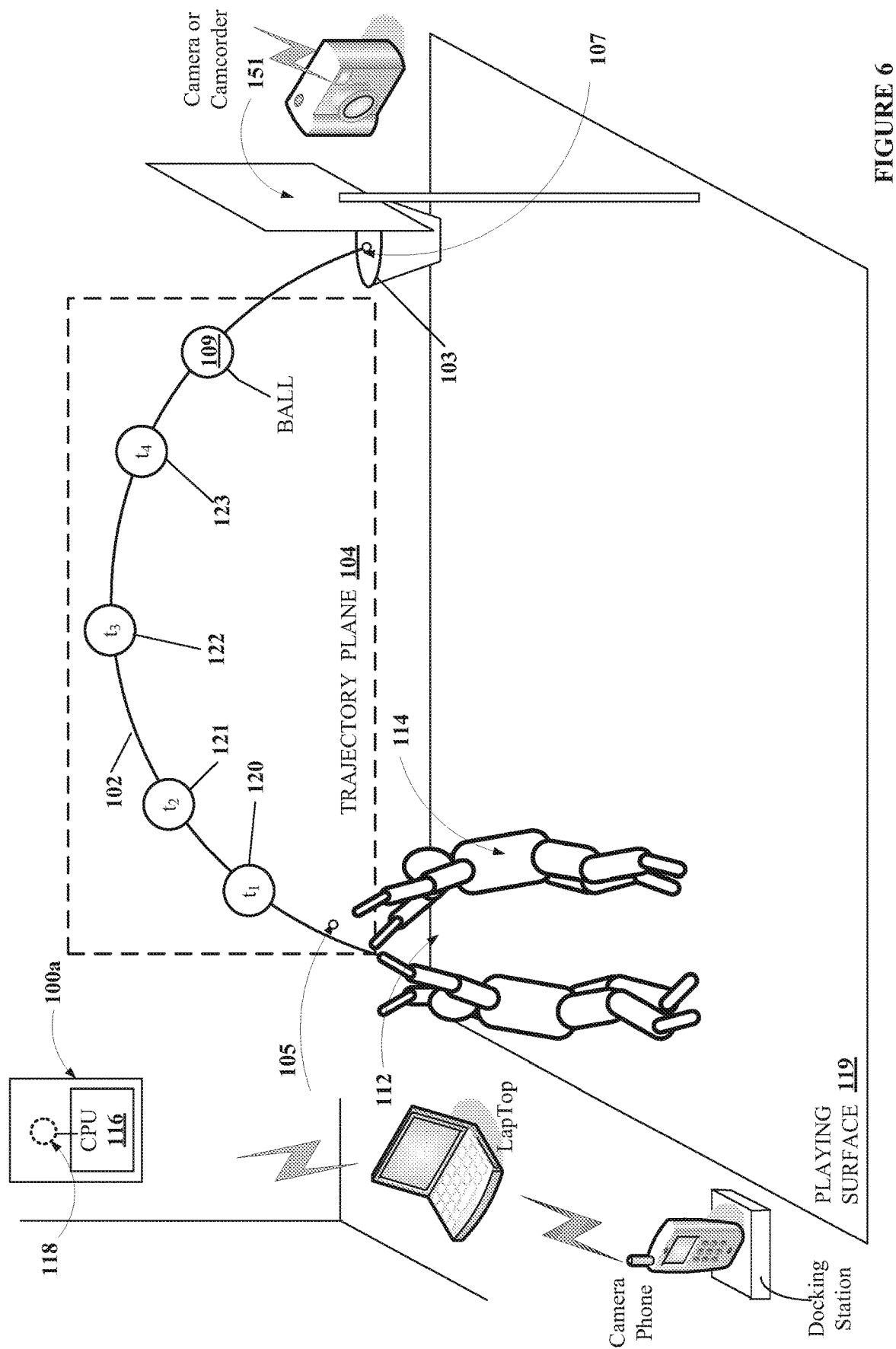
FIG. 6 is a diagram of trajectory capture scenario employing various embodiments of a trajectory detection and feedback system.

FIG. 6 is a diagram of trajectory capture scenario employing various embodiments of a trajectory detection and feedback system. In one embodiment, a portion of the feedback system, such as 100a, can be wall mounted for a more permanent installation. For example, a wall mounted system could include a machine vision system using camera 118 to provide trajectory analysis. The system 100a could include a CPU 116 that can be used in image processing. Further, the system 100a could include a speaker for providing feedback information to a user. In general, the system 100a can be designed for more permanent installation, such as on a wall, a pole separate from the basketball hoop structure or attached to the basketball hoop structure.

When the device is turned on, it may be configured to begin providing feedback information until it is turned off. The device may include a wireless or wired remote to provide options, such as but not limited to changing the feedback format options, recalibrating or resetting the device, changing the volume of a speaker or turning the device on or off. In one embodiment, the device may include a limited memory that can be overwritten over time. The memory may include captured images and/or associated trajectory analysis. For instance, the memory can be sized to store 24 hours of video that includes a time stamp. After the 24 hours of video are filled, the device can begin to rewrite over the oldest stored video with new captured video data.

The device 100a may include a wired and/or wireless interface that allows stored data including image data to be downloaded to a separate device, such as but not limited laptop computer or a cell phone. For instance, image data could be downloaded over a particular time period as selected by a user and downloaded to their device. The device 100a may provide video indexing and skipping features that allow a user to locate video data stored on the device and review it on their device. For instance, a preview capability could be provided that is compatible with a user's cell phone, such that the video stored on the device 100a could be viewed on a screen associated with the user's cell phone. Software downloads could be provided from the device 100a or from another remote location, such as server associated with a website, that allows captured image data downloaded from the device 100a to be further manipulated and stored on the user's device, such as their cellphone or laptop. In another embodiment, a web-site may be set up that allows data stored on their personal device, such as a cell phone or laptop, to be uploaded an further processed using software provided in association with the web-site In other embodiments, a server associated with a web-site, may be configured to download software to a user's device with a camera that allows it to behave like the machine vision system described with respect to FIGS. 5 and 6. For instance, the web-site could provide an application that allows an Iphone™ from Apple™ that is available at an app store that allows iphone to act as an image capture and analysis system. As another example, an application could be downloaded to a user's laptop, camera or camcorder that allows these devices to function in this manner.

Thus, when one of these devices where placed near a sports venue, such as indoor or outdoor basket ball hoop structure, the device could be used to provide image capture and trajectory analysis capabilities. If the device included audio capabilities, it could also be used to provide feedback information. For instance, a cell phone could be configured to communicate with a Blue-Tooth™ capable head set worn by a user and coupled to the cell phone to provide feedback information. In another embodiment, a portable speaker system could be coupled to the cell phone to provide audio capabilities.

In one embodiment, a docking station or stand, such as a tripod, could be provided for use with a user's device, such as a cell phone, camera or camcorder. The docking station could be configured to allow a user's device to be fixed in a particular orientation. For instance, the docking station or stand could include a flexible device that attaches to the cellphone or camera that allows it to be mounted in various orientations, such as a multi-armed Gorrilapod™ The docking station may also be configured to allow augment features of the user's device. For instance, the docking station could include a power source, a power/communication interface, such as a USB compatible interface, additional electronic storage and additional processing.

The docking station could also be designed with an enclosure that provides some protection to the device. For instance, the enclosure could cover the device to provide some protection from rain. Further, the enclosure could partially enclose and secure the user's device to protect it from damage if it were impacted in some way, such as hit by an errant basketball or other object for which the device is being used to capture and analyze trajectory data.

Calculating Basketball Trajectory Dynamics: Basketball Swish/Make Analysis

Figure 7A:
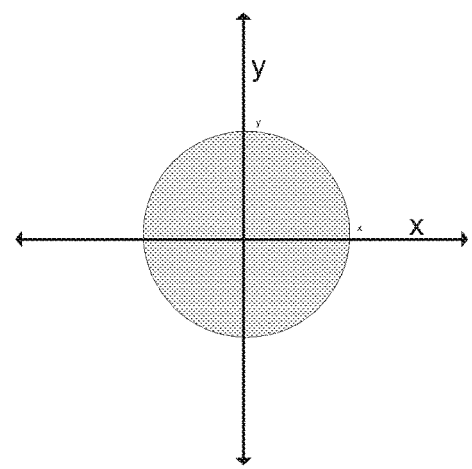
FIG. 7A is an illustration of coordinate system for determining a make/miss zone for basketball.

When a basketball shot goes through the hoop without contacting any part of the rim, we call it a "swish." Since the hoop is larger than the ball, there can be some variation in the shot and still get a swish. This analysis first determines the range of straight-on shots that will swish. The shot possibilities may be described by locating the center of the ball at the instant it passes through the hoop or, more technically, when the center of the ball lies in the plane of the hoop. The locus of points that describe shots that swish may be referred to as the swish zone, and can be illustrated by drawing a top view of the hoop with the swish zone defined within that circular region. The reference point (coordinate system origin) is the center of the hoop, with the positive x-axis projecting to the right and the positive y-axis projecting toward the back of the hoop, as shown in FIG. 7A.

For the purposes of illustration, it may be assumed that the hoop is 9" in radius and the ball is a men's pro ball, approximately 4.77" in radius. These assumptions may be varied to address different hoop and ball geometries as desired. For this example, it may be assumed that the ball's trajectory is a straight line in the immediate vicinity of the hoop, described by the hoop entry angle and measured from the horizontal. In this frame of reference, a perfectly flat shot would be 0 degrees and a ball dropped from directly above the hoop would be 90 degrees. This analysis may be generalized to include a more representative parabolic trajectory, or even a trajectory corrected for aerodynamic and buoyant forces, if necessary. For this example, it may be assumed the curvature of the trajectory in the immediate vicinity of the hoop is insignificant.

Figure 7B:
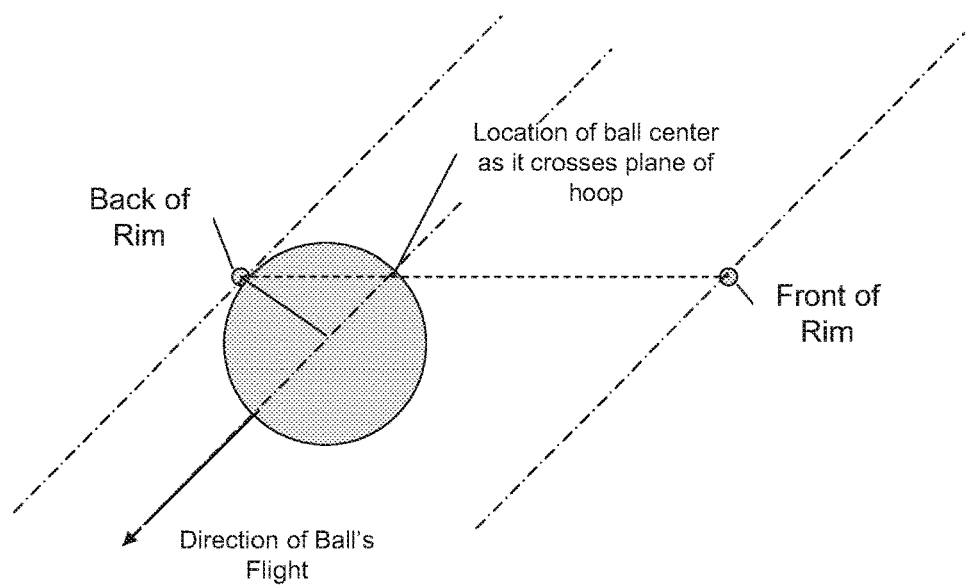
FIG. 7B is a side view of basketball shot passing through hoop at location of longest possible swish.
Figure 7C:
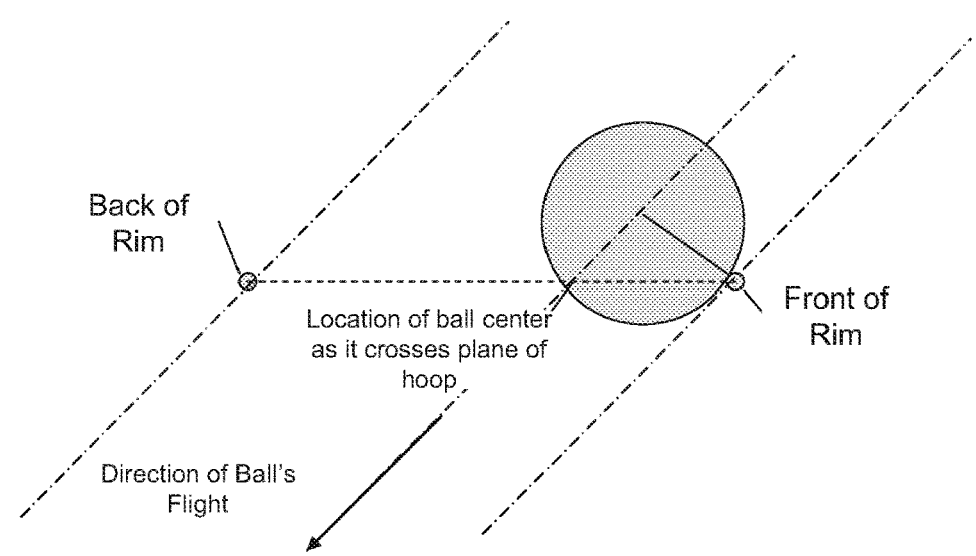
FIG. 7C is a side view of basketball shot passing through hoop at location of shortest possible swish.

For the ball to swish, it must pass over the front of the rim and under the back of the rim. These constraints limit the range of possible shots that may swish for a given entry angle, and the widest part of the ball (its diameter) determines the extent of that range. The geometry may be described for the longest possible swish at a particular entry angle and shortest possible swish at a particular entry angle. FIG. 7B is a side view of basketball shot passing through hoop at location of longest possible swish and FIG. 7C is a side view of basketball shot passing through hoop at location of shortest possible swish.

As can be seen in FIG. 7B, the center of the ball is below the rim when the widest part of the ball passes the rim for the longest possible swish. This is because the radius of the ball is measured perpendicular to the flight path in order to ensure the ball is a sufficient distance away from the rim to pass without hitting it. Similarly, for the shortest possible swish, the center of the ball is above the hoop when the widest part of the ball passes the rim, as shown in FIG. 7C. In order to define the range of swish shots for a given entry angle, the location of the center of the ball must be projected onto the plane of the hoop. This is accomplished by simple trigonometric computation using the expression $$y = R_{hoop} - R_{ball}/\sin(\theta)$$

where
y=location of center of ball in plane of hoop
$R_{hoop}$=radius of basketball hoop (set at 9")
$R_{ball}$=radius of basketball (set at 4.77")
$\theta$=shot entry angle measured from horizontal This formula results in the following values for the longest and shortest possible swish shots as a function of shot entry angle:

| Angle | Y long | Y short |
| --- | --- | --- |
| 90 | 4.23 | −4.23 |
| 89 | 4.229273 | −4.22927 |
| 88 | 4.227092 | −4.22709 |
| 87 | 4.223454 | −4.22345 |
| 86 | 4.218352 | −4.21835 |
| 85 | 4.211779 | −4.21178 |
| 84 | 4.203726 | −4.20373 |

-continued

| Angle | Y long | Y short |
|---|---|---|
| 83 | 4.194178 | −4.19418 |
| 82 | 4.183122 | −4.18312 |
| 81 | 4.170541 | −4.17054 |
| 80 | 4.156415 | −4.15642 |
| 79 | 4.140721 | −4.14072 |
| 78 | 4.123435 | −4.12344 |
| 77 | 4.104529 | −4.10453 |
| 76 | 4.083973 | −4.08397 |
| 75 | 4.061733 | −4.06173 |
| 74 | 4.037772 | −4.03777 |
| 73 | 4.01205 | −4.01205 |
| 72 | 3.984525 | −3.98453 |
| 71 | 3.955149 | −3.95515 |
| 70 | 3.923872 | −3.92387 |
| 69 | 3.890638 | −3.89064 |
| 68 | 3.855389 | −3.85539 |
| 67 | 3.818061 | −3.81806 |
| 66 | 3.778585 | −3.77858 |
| 65 | 3.736887 | −3.73689 |
| 64 | 3.692889 | −3.69289 |
| 63 | 3.646504 | −3.6465 |
| 62 | 3.597641 | −3.59764 |
| 61 | 3.546201 | −3.5462 |
| 60 | 3.492078 | −3.49208 |
| 59 | 3.435159 | −3.43516 |
| 58 | 3.375319 | −3.37532 |
| 57 | 3.312427 | −3.31243 |
| 56 | 3.24634 | −3.24634 |
| 55 | 3.176905 | −3.17691 |
| 54 | 3.103956 | −3.10396 |
| 53 | 3.027313 | −3.02731 |
| 52 | 2.946783 | −2.94678 |
| 51 | 2.862157 | −2.86216 |
| 50 | 2.773207 | −2.77321 |
| 49 | 2.679688 | −2.67969 |
| 48 | 2.581332 | −2.58133 |
| 47 | 2.477848 | −2.47785 |
| 46 | 2.36892 | −2.36892 |
| 45 | 2.254201 | −2.2542 |
| 44 | 2.133315 | −2.13332 |
| 43 | 2.005848 | −2.00585 |
| 42 | 1.871347 | −1.87135 |
| 41 | 1.729313 | −1.72931 |
| 40 | 1.579197 | −1.5792 |
| 39 | 1.420395 | −1.42039 |
| 38 | 1.252236 | −1.25224 |
| 37 | 1.073977 | −1.07398 |
| 36 | 0.884791 | −0.88479 |
| 35 | 0.683759 | −0.68376 |
| 34 | 0.469849 | −0.46985 |
| 33 | 0.241906 | −0.24191 |
| 32 | 0 | 0 |

Figure 8:
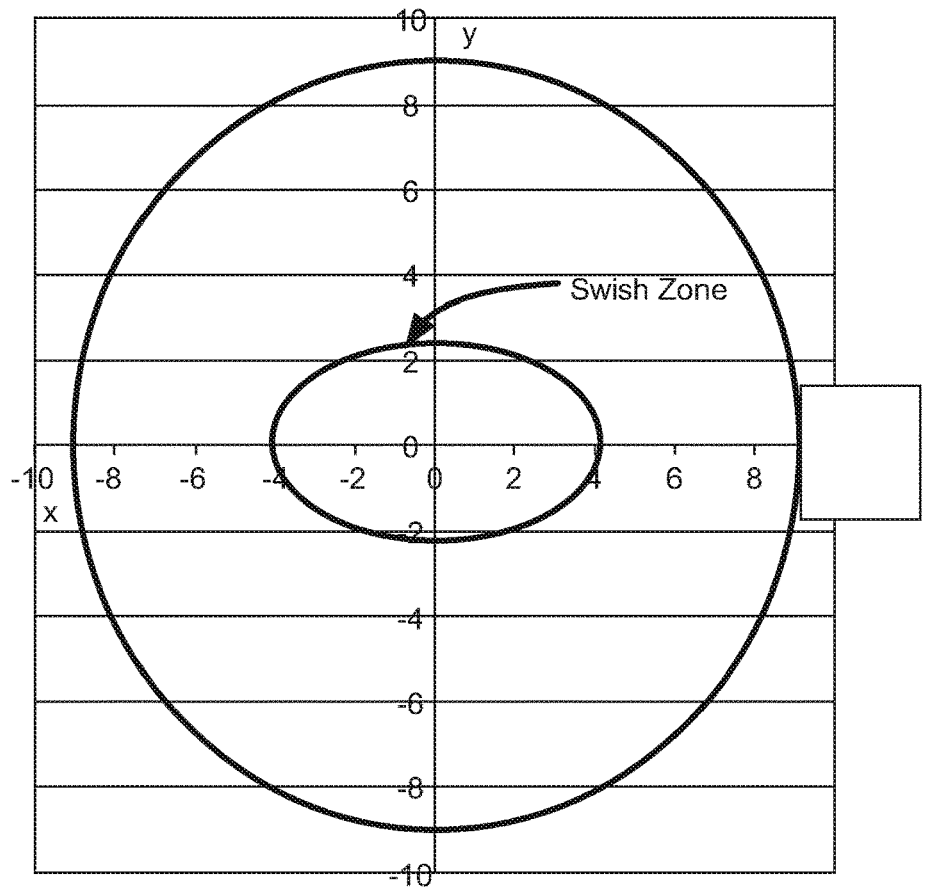
FIG. 8 is an illustration of the swish zone for a 45-degree hoop entry angle.

These results apply to a straight-on shot. In order to calculate the swish zone for off-center shots, compound angles must be computed that are difficult to illustrate geometrically. The result is more easily depicted graphically by showing the swish zone within the hoop. For example, the swish zone for a 45-degree shot is shown in FIG. 8.

Make Zone

Figure 9:
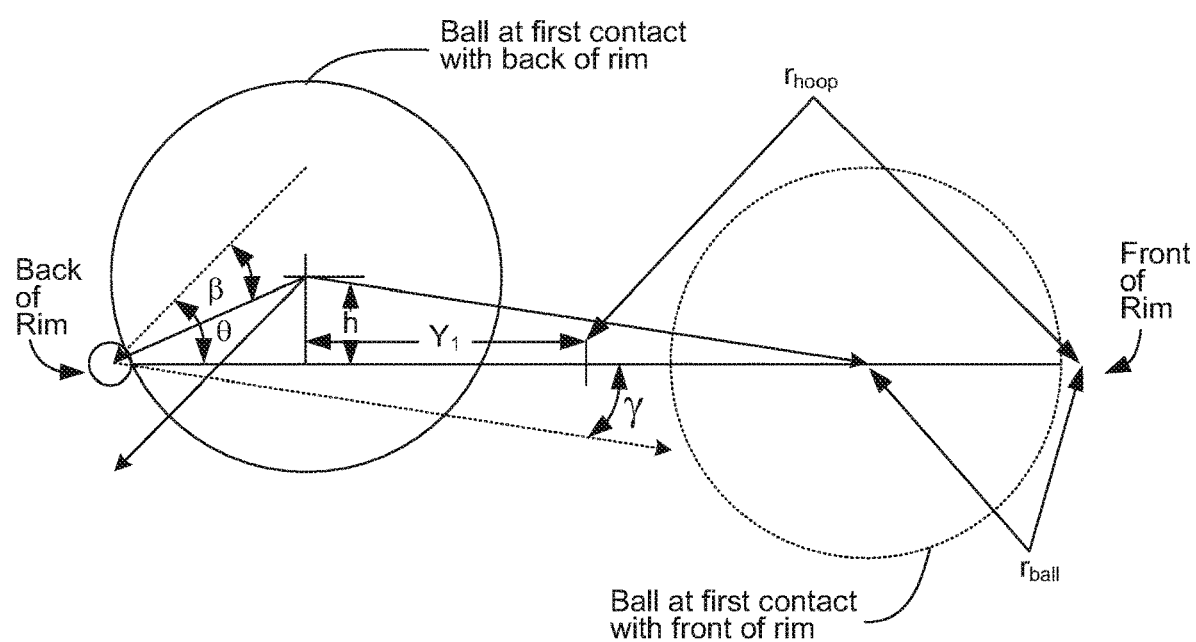
FIG. 9 is an illustration of the geometry of rim-in shot off the back rim.

It is still possible for the ball to go through the hoop if it does not pass through the swish zone. Shots near the swish zone will hit the rim. Depending on the shot and hoop geometry, it is possible for the ball to bounce off the rim and pass downward through the hoop. The locus of points for which this occurs may be called the make zone. The boundary of the make zone may be defined by the longest shot that can hit the back rim and rebound downward to the plane of the hoop before contacting the front rim. FIG. 9 is an illustration of the geometry of rim-in shot off the back rim.

The location of the boundary of the make zone for a straight-on shot may be determined from the following system of equations, which are shown in FIG. 9.

$$h=\sqrt{r_b^2-(r_h-y_1)^2}$$

$$\beta=\sin^{-1}(h/r_b)$$

$$\gamma=\theta-\beta$$

$$\gamma=\tan^{-1}(h/(r_h-r_b+y_1))$$

where
h=height of center of ball above plane of hoop when ball strikes back rim
$r_b$=radius of ball
$r_h$=radius of hoop
$y_1$=y-location of center of ball in plane of hoop when ball strikes back rim
β=angle between rim-normal and plane of hoop
γ=angle between plane of hoop and resultant ball direction after rebounding off back rim These equations do not have a closed-form solution. Nevertheless, the equations may be solved iteratively using a variety of progressive solution techniques, such as the Newtonian method. Using this method, the location of the make zone boundary may be determined as a function of entry angle. The results of a sample calculation are given in the table below.

| Entry angle, deg. | Make zone boundary, in. |
|---|---|
| 50 | 5.04 |
| 45 | 4.88 |
| 40 | 4.73 |
| 35 | 4.61 |
| 30 | 4.51 |
| 25 | 4.42 |
| 20 | — |

The table indicates that below 25 degrees entry angle, there is no make zone. The geometry for off-center rim shots is more complicated, but the make zones may be depicted graphically. There are some idealizations used in generating these plots that may be relaxed if necessary to produce a more accurate depiction of the make zone.

Figure 10A:
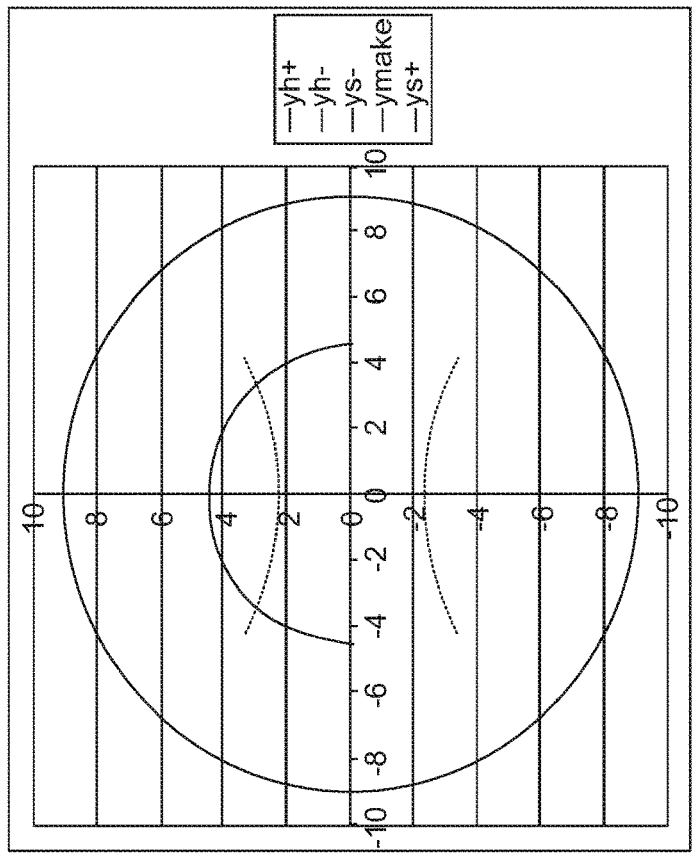
FIG. 10A is a plot of a make zone for a hoop entry angle of 45 degrees.
Figure 10B:
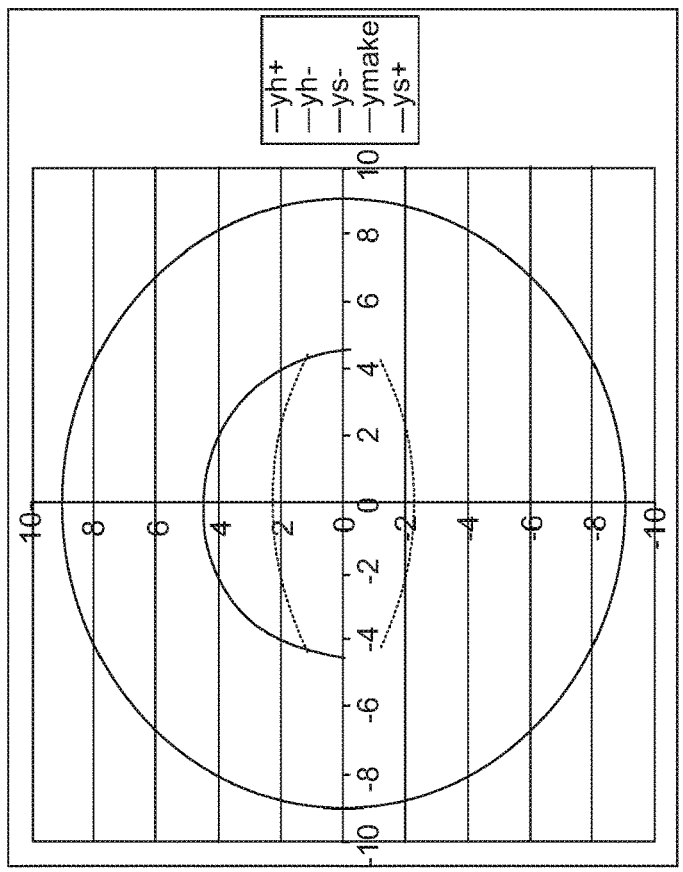
FIG. 10B is a plot of the make zone for a hoop entry angle of 25 degrees.

FIG. 10A is a plot of a make zone for a hoop entry angle of 45 degrees. Three curves are depicted in a circle, which depicts the hoop. The area between the dashed lines represents the swish zone. The area between the upper solid line the lower dashed line represents the make zone. FIG. 10B is a plot of the make zone for a hoop entry angle of 25 degrees. Again, three curves are depicted in a circle. There is no swish zone at this entry angle. This is indicated by the dashed curves in the figure where the lower dashed curve and upper dashed curves depicted in FIG. 10A have switched positions in FIG. 10B. The make zone in FIG. 10B is defined by the area between the solid downward turned curve and the upwardly turned dashed curve depicted in the figure.

In performing this analysis, a conservative assumption has been made that only rim bounces that cause the ball to continue downward have the potential to score. In practice, many shots are observed to bounce up off the rim, then either drop through the hoop or make subsequent contact with the rim and/or backboard ultimately resulting in a made shot. As a result, the make percentage calculated by the present method may be lower than what would be expected in practice. This observation has been confirmed with empirical data as is described with respect to FIGS. 11 and 12.

One means of addressing this under-prediction of made shots may be to develop a calibration factor based on empirical evidence. The make zone may be enlarged by a multiplicative factor such that the calculated made shots more nearly replicate observations. This factor, which may be dependent on a number of variables such as entry angle and speed, may be deduced from an experimental dataset, then applied to the algorithm for use in subsequent predictions.

Another approach to developing a more accurate make zone may be to incorporate a more complete kinetic model of the ball and its interactions with the hoop, bracket, and backboard. Effects to be included may include the angle of rebound when the ball contacts a solid surface, the effects of spin and ball friction against a solid surface, energy loss of the ball as a result of its impact, and the flexibility and energy absorption of the hoop and associated hardware. This would allow the calculation to model multiple ball/rim interactions and thereby determine the make zone even for very complex dynamics. The bounce dynamics may also be verified experimentally.

Figure 11:
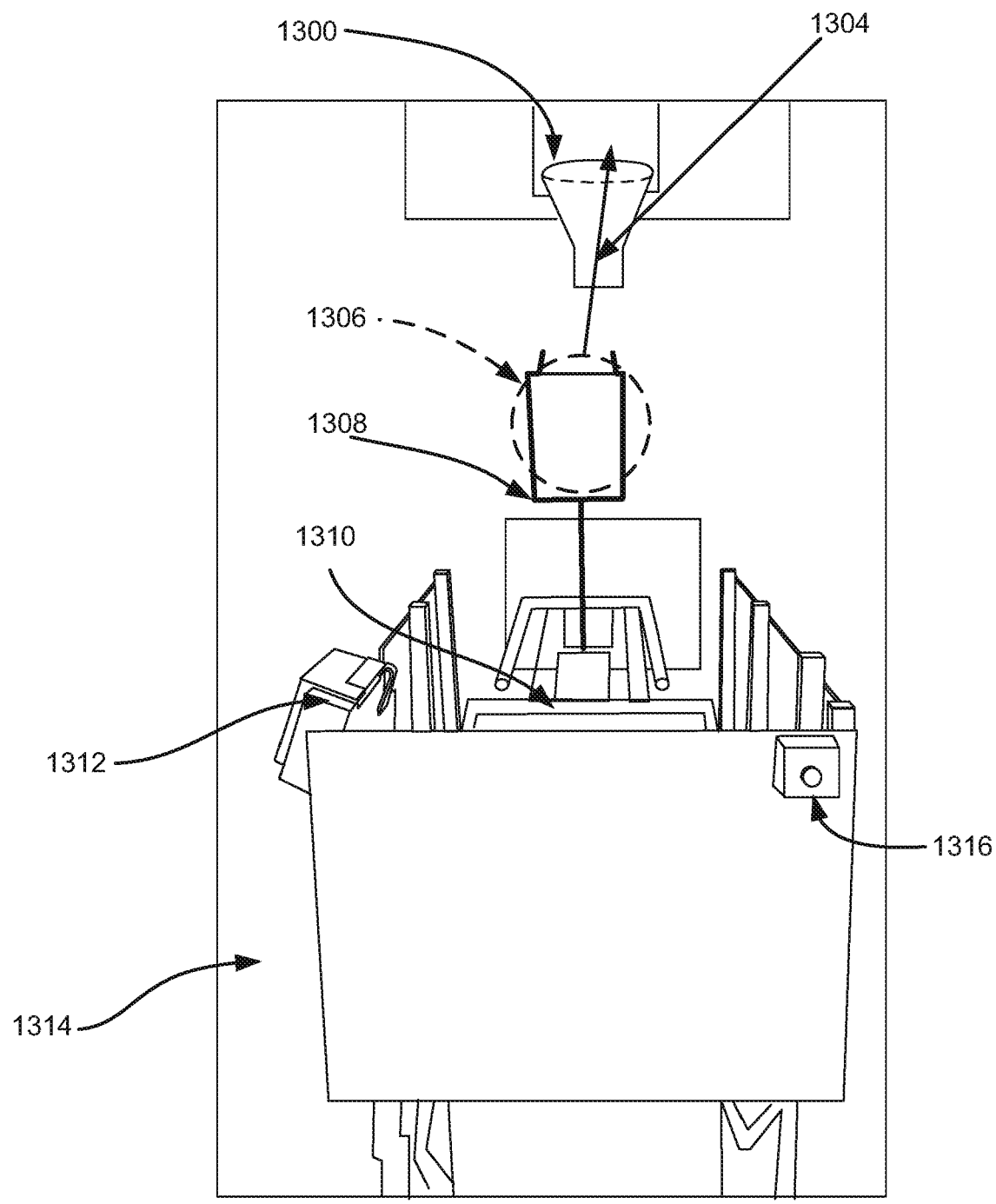
FIG. 11 is a rear view of an experimental set-up for generating basketball trajectories.

A rear view of an experimental set-up for generating basketball trajectories is shown with respect to FIG. 11. The shooting machine 1302 includes an arm 1308 that can launch a basketball 1306 (a real basketball is not shown in the figure only an outline of a basketball is shown) towards a basketball hoop 1300 along a trajectory 1304. The arm is propelled by mechanism 1310. The shooting machine 1302 includes an on-off switch and a display/control mechanism 1312.

The machine 1302 may be programmed to execute a large number of shots and the outcome for each shot may be recorded. The release height of the device may be set to a particular value. From shot to shot, a left-right orientation of the shot relative to the center of the basketball hoop, a release velocity and a release angle may be automatically adjusted. Each of the values, left-right orientation, release velocity and release angle may be varied to generate a number of shots, such as but not limited to 10,000 shots. Different ball sizes may be employed with the machine 1302, such as a men's ball or a women's ball.

The shooting machine may be positioned at a location on the court 1314 that is a fixed distance from the basketball hoop. In this example, the shooting machine 1302 is positioned to generate a shot near the free throw line. The shooting machine is mobile and may be moved to different locations to generate a set of shots at each location.

Figure 12:
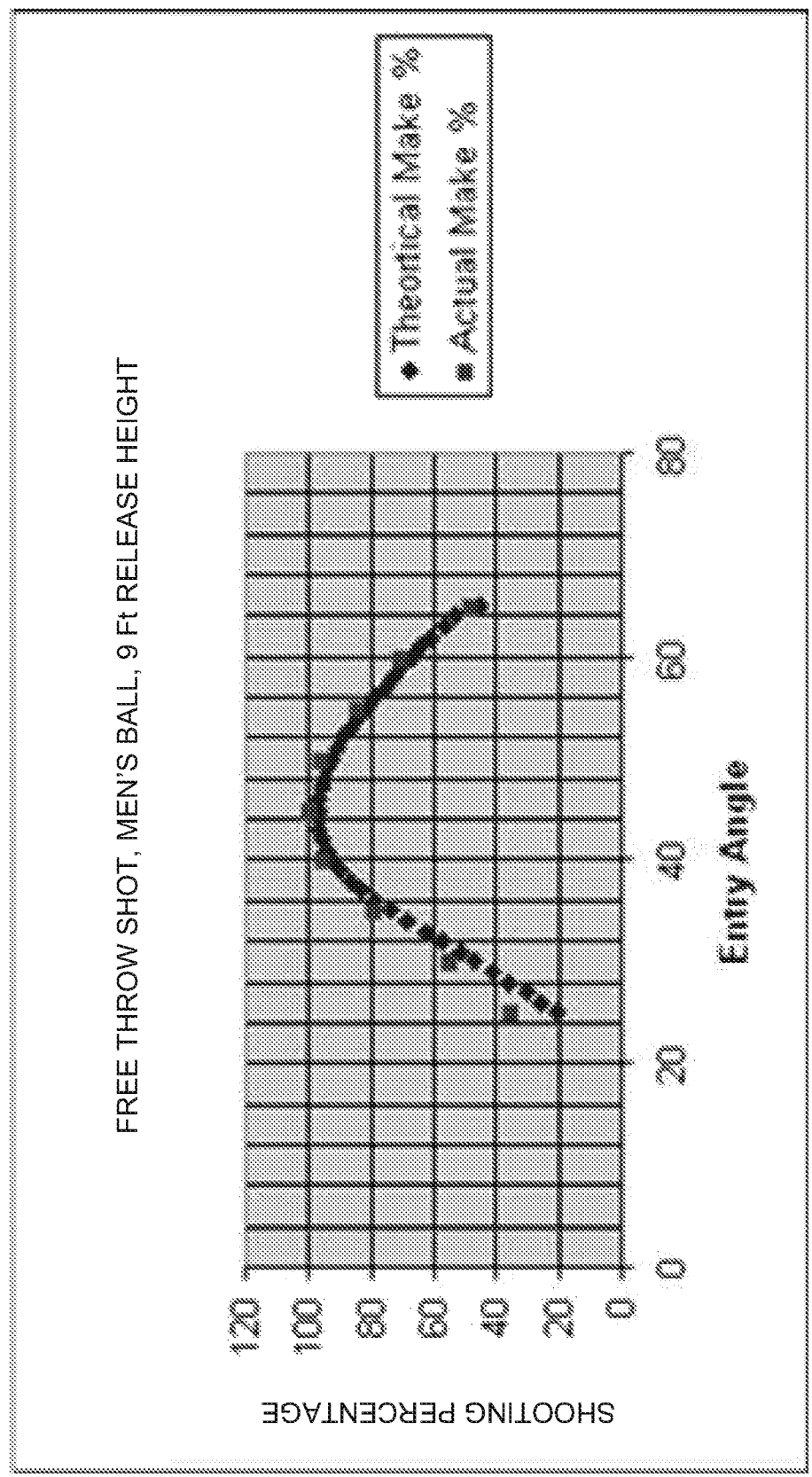
FIG. 12 is a graph of shooting percentage as a function hoop entry angle generated both experimentally and analytically.

FIG. 12 is a plot of a theoretical make percentage predicting from analytical method previously described as compared to an actual make percentage generated using the shooting machine described with respect to FIG. 11. The shooting machine was positioned to generate a free throw shot at a release height of 9 feet using a men's ball. The range of parameters used to perform both the theoretical calculations and the actual shots generated using the shooting machine were selected to match a variability of a particular individual. The variability and the associated range of parameters was determined from a number of shots actually made by the individual From an entry angle between 40-65%, the theoretical make/miss percentage is 2-3 percentage points less than the experimentally predicted values. Below 40%, the error between the calculations is greater. As previously mentioned some rebound dynamics were not considered in the theoretical calculations for the embodiments described herein and hence some shots that may be made are not captured by the methodology, such as hitting the back rim, then the front rim and then going in. At lower entry angles, shots such as these are more prevalent as compared to the higher entry angles and hence there is a larger error in the calculations at lower entry angles.

As previously noted, it may be possible to better model the rim effects and hence produce a more accurate simulation. In another embodiment, it may be possible to correct the theoretical simulation using a correction factor derived from the shooting machine data. In yet another embodiment, it may be possible to generate a series of curves like the one shown in FIG. 12. The curves may be generated based upon data generated using the shooting machine, data generated from theoretical calculations, alone or in combination. Next, based on a measured variability of a particular individual, an existing curve that is appropriate for the variability of the individual may be located or a curve may be interpolated or extrapolated from existing curves as needed. Thus, it may not be necessary to perform additional trajectory simulations to determine an optimal or maximum shooting percentage for the individual in the manner shown in FIG. 11.

Of note in FIG. 12, an optimum shooting angle is predicted for the individual based upon their measured variability in their shooting mechanics (i.e., body motion and body orientation). The theoretical and experimental data both predict an optimum entry to be about 45 degrees. In this example, the shooter had a variability that was characteristic of a highly skilled shooter. Thus, a recommendation for this type of player may be to adjust their shot so that their average entry angle is a close to 45 degrees as possible.

Figure 13:
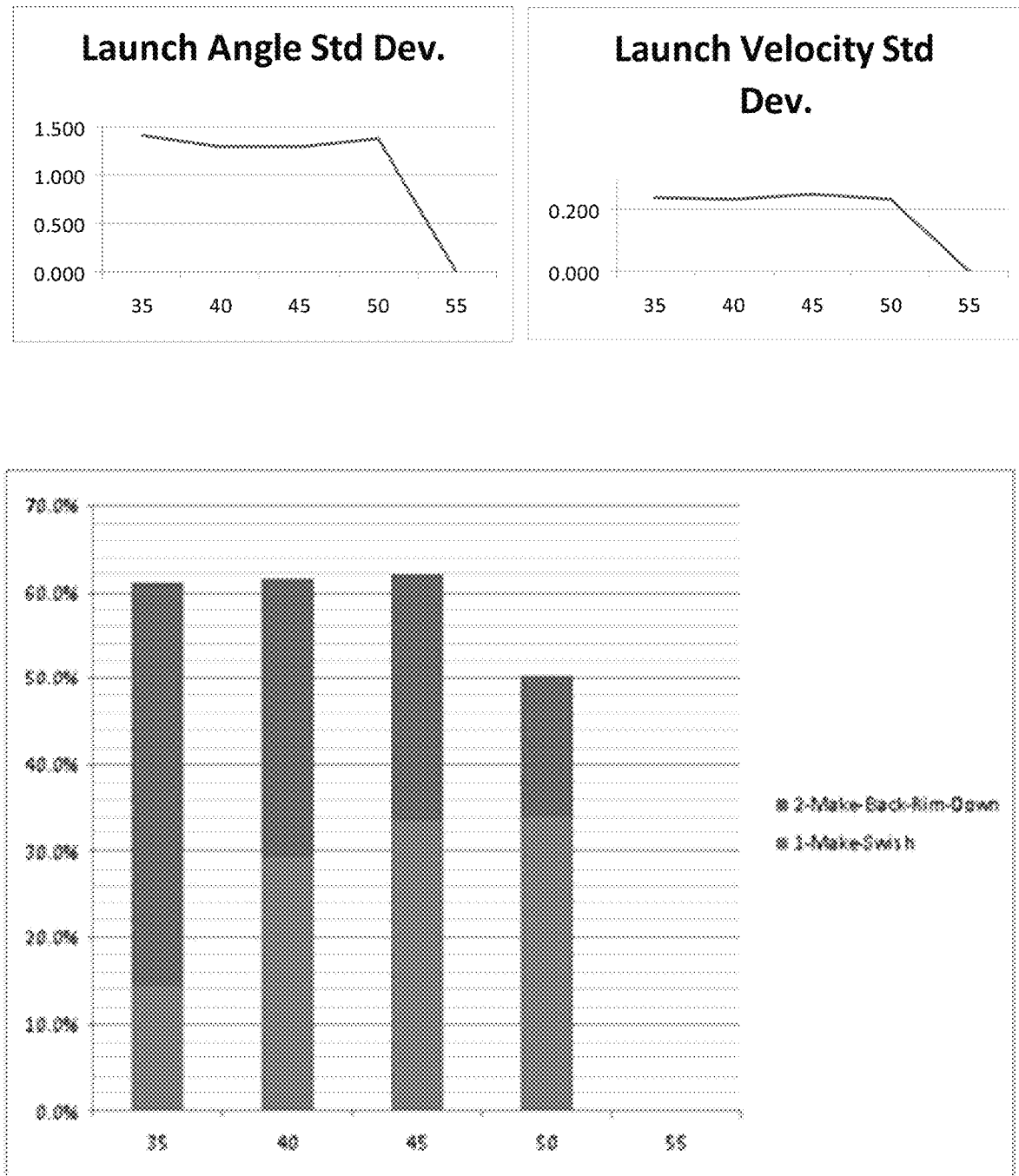
FIG. 13 shows standard deviations for launch angle and launch velocity as a function of entry angle for a number of experimentally generated shots and a percentage of shots made for various entry angles.

FIG. 13 shows standard deviations for launch angle and launch velocity as a function of entry angle for a number of experimentally generated shots and a percentage of shots made for various entry angles. Two shots types of shots are plotted: 1) shots that pass through the rim without touching the rim and 2) shots that hit the back of the rim and go through the rim. It can be seen in the figure that as the entry angle increases, the percentage of swish shots increases. The percentage of shots made is greatest for the 45 degree entry angle.

Figure 14:
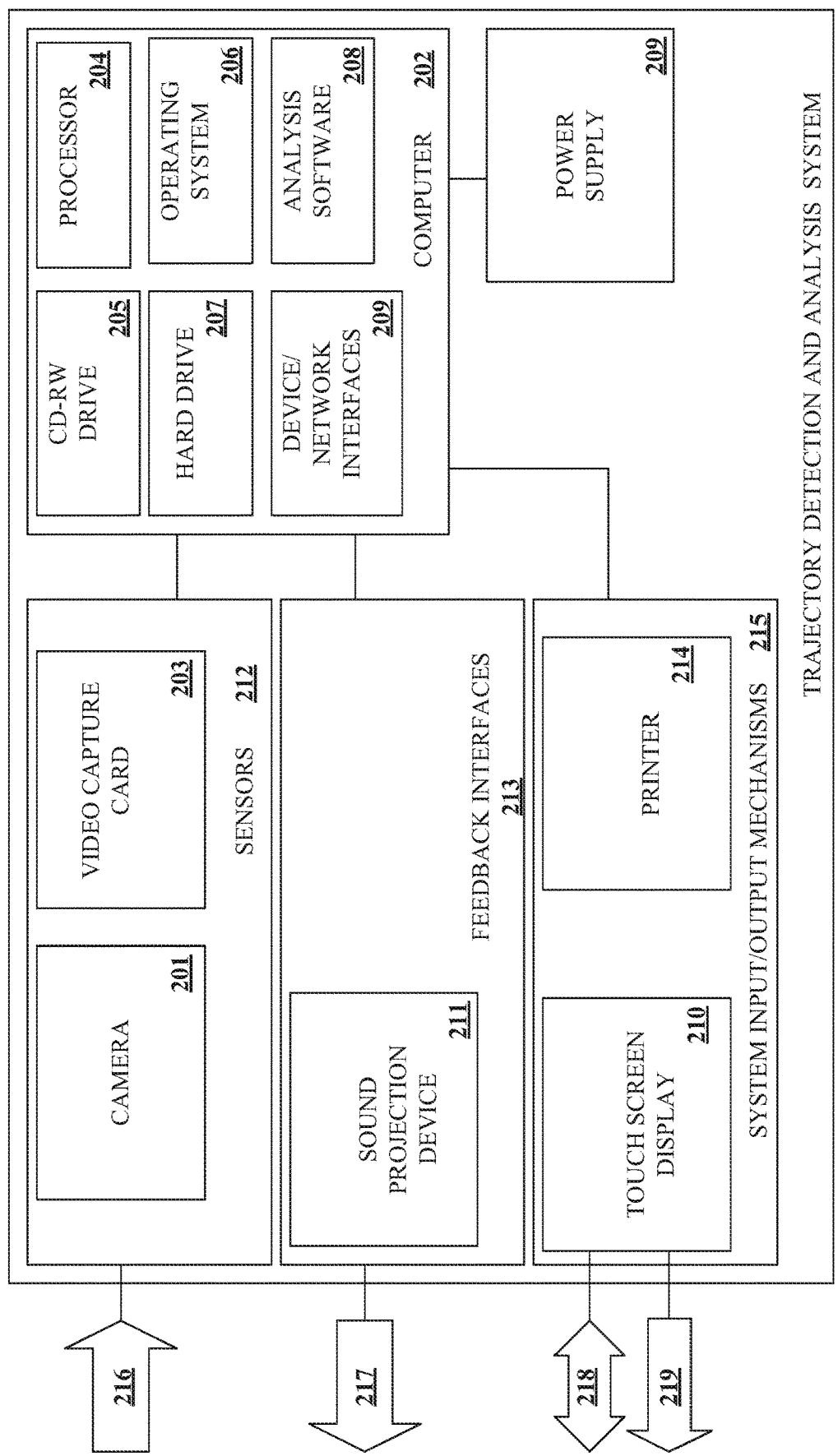
FIG. 14 is a block diagram of an embodiment of a trajectory detection and analysis system.
Figure 15:
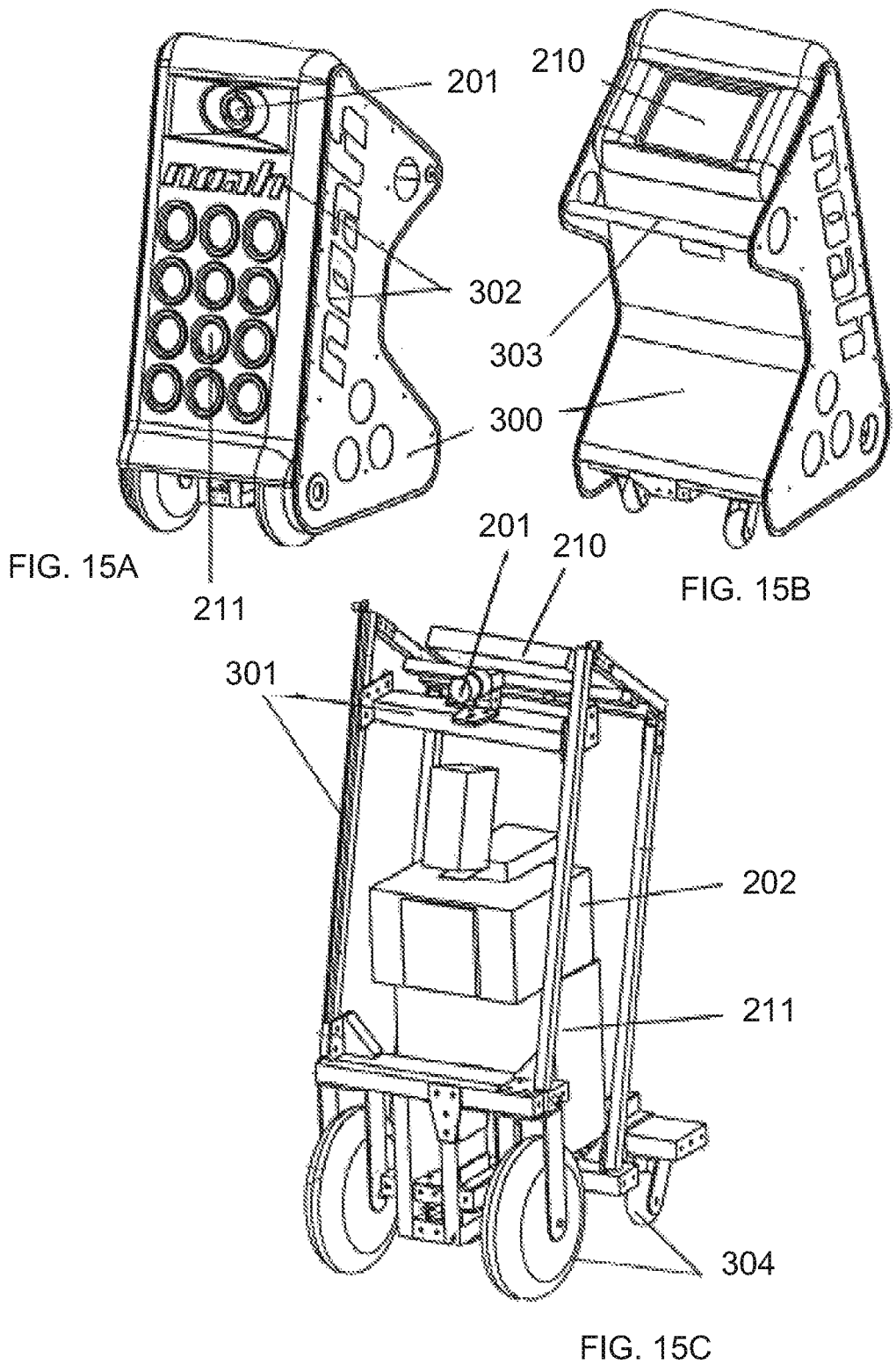
FIGS. 15A-15C are perspective drawings of one embodiment of a trajectory detection and analysis system.

FIG. 14 is a block diagram of a trajectory detection and analysis system 100 for one embodiment. The components of the system 100 may be enclosed within a single housing or may be divided between a plurality of different housings enclosing different components of the system. Further, the system 100 may include different components that are not shown, such as the peripheral devices and remote servers.

Physical information 216 is input into the system 100 via sensors 212. In one embodiment, a machine vision system may be used where the machine vision system comprises one or more cameras 201 (e.g., a CCD camera) and a video capture card 203 for digitizing captured frame data. The video capture card 203 may capture color pixel data. The camera 201 may employ a 3.5-8 mm zoom lens and may allow for different lens attachments. In another embodiment, the system may employ a plurality of cameras arranged on a mechanism that allows different type cameras to be rotated or moved into place where only one camera is used at a time to record frame data. The different cameras may allow the detection volume of the system to be adjusted.

The digitized frame data from a machine vision system and other sensor data may be processed by a computer 202. The computer 202 may be a modified PC using a 1.6 GHz processor 204 w/RAM and a CD-RW drive 205 for inputting and outputting data and software. The computer 202 may also include a mass storage device, such as hard drive 207 and various network/device communication interfaces, such as wireless and wired network interfaces, for connecting to a local area network (LAN), wide-area network (WAN) or the Internet. The device communication interfaces may allow the computer to communicate with a plurality of peripheral devices and other remote system components.

The computer 202 may include operating system software 206 for controlling system resources, such as feedback interfaces 213 and the system input/output mechanisms 215. The computer 202 may be used to execute analysis software 208 for analyzing trajectories using the sensor data from sensors 212 and for generating feedback information 217. The analysis software 208 may include software for providing various services, such as 1) providing a list or a plot of trajectory session information comprising one or more of physical information, trajectory parameters and feedback information for the plurality of trajectories, 2) comparing the trajectory session information from the trajectory session with trajectory session information from one or more different trajectory sessions, 3) generating trajectory session parameters used to characterize a human's performance in the trajectory session, 4) predicting performance improvement as a function of the trajectory session parameters, 5) prescribing actions for improving performance and 6) performing video editing tasks. The computer 202 may also be used to execute database software for relating physical information 216 and other information generated by the computer 202 to player identification information (e.g., name, age, address, team, school, etc.) and session identification information (e.g., time, data, location, number of trajectories analyzed, types of shots, etc.).

Power to the computer 202 and other devices may be provided from the power supply 209. In one embodiment, the power supply 209 may be a re-chargeable battery or a fuel cell. The power supply 209 may include one or more power interfaces for receiving power from an external source, such as an AC outlet, and conditioning the power for use by the various system components. In one embodiment, for in-door/outdoor models, the system 100 may include photocells that are used to provide direct power and charge an internal battery.

Feedback information 217, used by clients of the system 100 to improve their trajectory skills, may be output through one or more feedback interface devices 213, such as a sound projection device 211. In general, the system may be capable of outputting feedback information 217 to a plurality of different devices simultaneously in a plurality of different formats, such as visual formats, auditory formats and kinetic formats.

The system 100 may support a plurality of different input/output mechanisms 215 that are used to input/display operational information 218 for the system 100. The operational information 218 may include calibration and configuration setting inputs for the system and system components. In one embodiment, a touch screen display 210 may be used to input and display operational information 218 using a plurality of menus. Menus may be available for configuring and setting up the system 100, for allowing a player to sign into the system and to select preferred setting for the system 100 and for viewing session information 219 in various formats that have been generated by the system. The printer 214 may be used to output hard copies of the session information 219 for a player or other client of the system 100. The present invention is not limited to a touch screen display as an interface for operational information. Other input mechanisms, such as but not limited, a key board, a mouse, a touch pad, a joystick and a microphone with voice recognition software may be used to input operation information 218 into the system.

FIGS. 15A-15C are perspective drawings of exemplary components of a trajectory detection and analysis system. The figures provided to illustrate types of components in a trajectory system and not mean to limit various form factors and configurations of these components. For instance, the locations, sizes and form factors of these components could look substantially different if they were integrated into a golf bag. Further, every component of the system need not be included in every embodiment. For instance, the sound output device 211 may be eliminated in some designs or made substantially smaller, which could alter the form factor of the design.

In FIGS. 15A-15C, a camera 201 used in a machine vision system, a touch screen display 210, a computer 202 and a sound projection device 211 are integrated into a housing 300 with a support chassis 301. The system 100 may also include an amplifier for the speaker 211 (not shown).

Wheels 304 are attached to the chassis 301 to allow the system 100 to be easily moved and positioned for use. In general, the chassis of devices of the present invention may be designed with a weight and a form factor, which may facilitate transport, storage and unobtrusive set-up, calibration and operation of the device. For instance, the device includes a handle 303 attached to panels 300 comprising the housing that may be used to move the device and which may aid in set-up and storage of the device.

The speaker 211 takes up a large portion of the internal volume of the system. In one embodiment, a travel system may be used that incorporates a portable computer system such as laptop that is connected to a machine vision system with the camera 201. To use the travel system, it may be placed on top of a support platform, such as a tripod, a table, a chair or even coupled to a golf bag or golf cart. The travel system may provide feedback information via a wireless communication interface to audio device, such as an "earbud," worn by the player or wearable feed back device. In another embodiment, the travel system may generate output signals that may be routed through a portable audio system (e.g., a boom box) for amplification via speakers on the audio system to provide feedback information.

Figure 16:
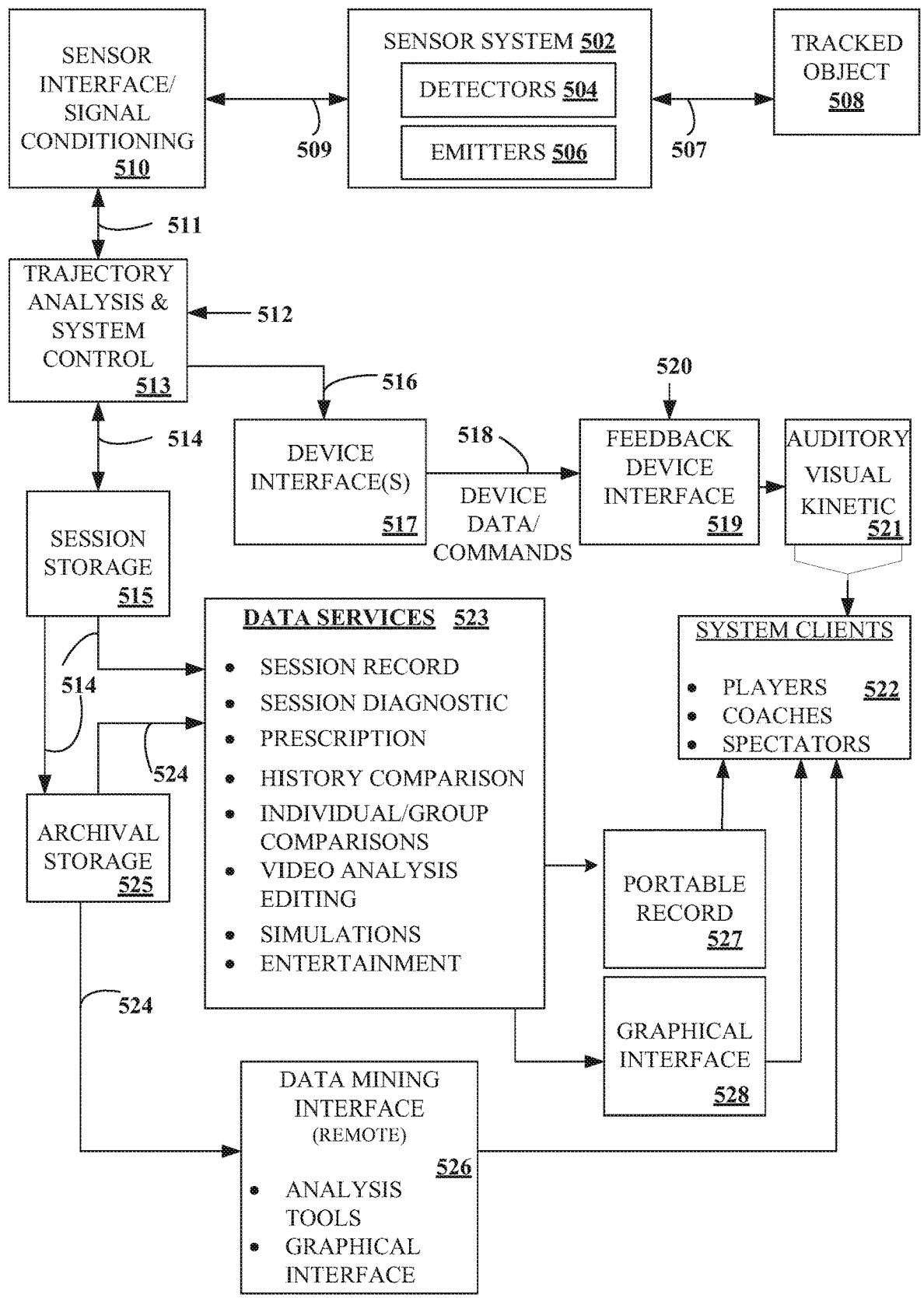
FIG. 16 is an information flow diagram of an embodiment for of a trajectory detection and analysis system.

FIG. 16 is an information flow diagram for a trajectory detection and analysis system of the present invention. A sensor system 502, which may comprise emitters 506 and detectors 506, receives physical information 507. The physical information 507 may be energy signals reflected from a tracked object 508, such as a golf ball. In the case where sensors are mounted to the tracked object 508, then the physical information 507 may be sent as signals from the sensors to a detector 504. Typically, the physical information 508 is transmitted through a medium such as air.

The sensor system 502 may convert the physical information 507 to sensor data signals 509. For instance, a charge-coupling device generates electronic signals in response to photons striking a sensor array. The sensor data signals 509 may be sent through a wired or wireless connection to a sensor interface 510, which provides signal conditioning. The signal conditioning may be needed to allow the sensor data 509 to be processed. For instance, prior to analysis, video frame data may be digitized by a video capture card.

In 513, the conditioned signals 511 may be processed according to system control software and according to trajectory analysis software 513 using set-up and control inputs 512 that have been input into the system. The system control software 513 may analyze portions of the data 511 to determine whether the sensor system 502 is operating properly. Based-upon the analysis of the data 511, the system control software may provide calibration instructions and other operational instructions to the sensor system which may be transmitted to the sensors via the senor interface 510.

The trajectory analysis software 513 may be used to process the conditioned signals 511 and generate trajectory parameters. The trajectory parameters may be used to generate feedback information. The feedback information may be one or more trajectory parameters or a combination of trajectory parameters, such as a ratio of trajectory parameters or a product of trajectory parameters that may be useful to a system client in improving their trajectory skills.

Depending such factors as the application (trajectory of a specific type of object), the set-up and components of the system, the environment in which the system is used and what portion of the trajectory of an object the device is used to measure, the present invention may provide feedback to the player nearly immediately, within a second or within 10 seconds as measured from some time state along the trajectory that has been analyzed by the system. For instance, when information on the beginning of the trajectory is directly generated by the system, then the time to provide feedback may be measured from the time when the trajectory is initiated and then first detected by the system. When information on the end of the trajectory is directly measured, then the time to provide feedback may be measured from the time to when the trajectory has neared completion and has been detected by the system.

The feedback information may be sent as feedback information parameters 516 to one or more device interfaces 517. The device interfaces 517 may communicate with a plurality of feedback devices. The device interfaces 517, which may include device drivers, may transmit device data/commands 518 to a feedback device interface 519 located on each feedback device. The device data/commands 518 may be used to control the operation of the feedback devices. The output from the feedback device may also be modified using set-up/control inputs 520 that may vary for each device.

The feedback devices may output the feedback information parameters 516 received as device data 518 in one of an audio, visual or kinetic format 521 depending on the capabilities of the feedback device. For example, the device interface 517 may send device data/commands 518 to a display that allows a numeric value of a feedback information parameter 516 to be viewed on the display by one of the system clients 522, such as players, coaches and spectators. As another example, a device interface 517 may send device data/commands 518 to an audio output device that allows feedback information parameters 516 to be output in an audio format to one or more of the system clients 522.

The feedback parameters 516 generated from the trajectory analysis software 513 and other raw data generated from the sensor system 502 may be sent to session storage 515. The session storage 515 may accumulate trajectory data from a plurality of trajectories generated during a trajectory session for one or more players. All of a portion of the trajectory data 514 may be sent to archival storage 525 when the session has been completed. For example, only a portion of the raw data, such as video frame data, may be sent to archival storage. Further, the data may be filtered for bad data prior to being sent to archival storage 525. The archival storage 525 may include a database used to relate trajectory data from one or more trajectory sessions to the conditions of the trajectory session, such as time place and location, and player identification information.

The archival data 524 and session data 514 may be used to provide one or more services 523 including but not limited to 1) a session record of trajectory parameters, 2) session diagnostics, 3) prescription for improvement, 4) a history comparison of trajectory data from different sessions, 5) individual/group comparisons of trajectory session data, 6) video analysis and editing tools, 7) simulations (e.g., predicting a player's driving distance improvement based upon changing one or more of their swing parameters and 8) entertainment. As an example of entertainment, a player's trajectory average trajectory parameters and variability may be used in trajectory simulations for a video golf game or another game where the parameters have been measured. Two players that have used the system 100 may both enter their parameters and compete against one another in the video game. The player may also use the game to see how they match up against professional or other athletes who have had their trajectory parameters defined.

Output from the data services 523 may be converted to a portable record 527, such as print-out from a printer, or may be formatted for viewing on a graphical interface 528. The graphical interface may also include a storage capacity allowing data to be viewed at a later time. The output from the data services 523, such as a portable record 527 or information viewed on the graphical interface 528, may be used by the system clients 522. The data services 523 may also be provided via a data mining interface 526. The data mining interface 526 may include analysis tools and a graphical interface. When the archival storage is remotely accessible, it may be used to access archived data 524 via a remote connection, such as from the Internet.

Information passed between the different components in the system may be transmitted using a number of different wired and wireless communication protocols. For instance, for wire communication, USB compatible, Firewire compatible and IEEE 1394 compatible hardware communication interfaces and communication protocols may be used. For wireless communication, hardware and software compatible with standards such as Bluetooth, IEEE 802.11a, IEEE 802.11b, IEEE 802.11x (e.g. other IEEE 802.11 standards such as IEEE 802.11c, IEEE 802.11d, IEEE 802.11e, etc.), IrDA, WiFi and HomeRF.

Figure 17:
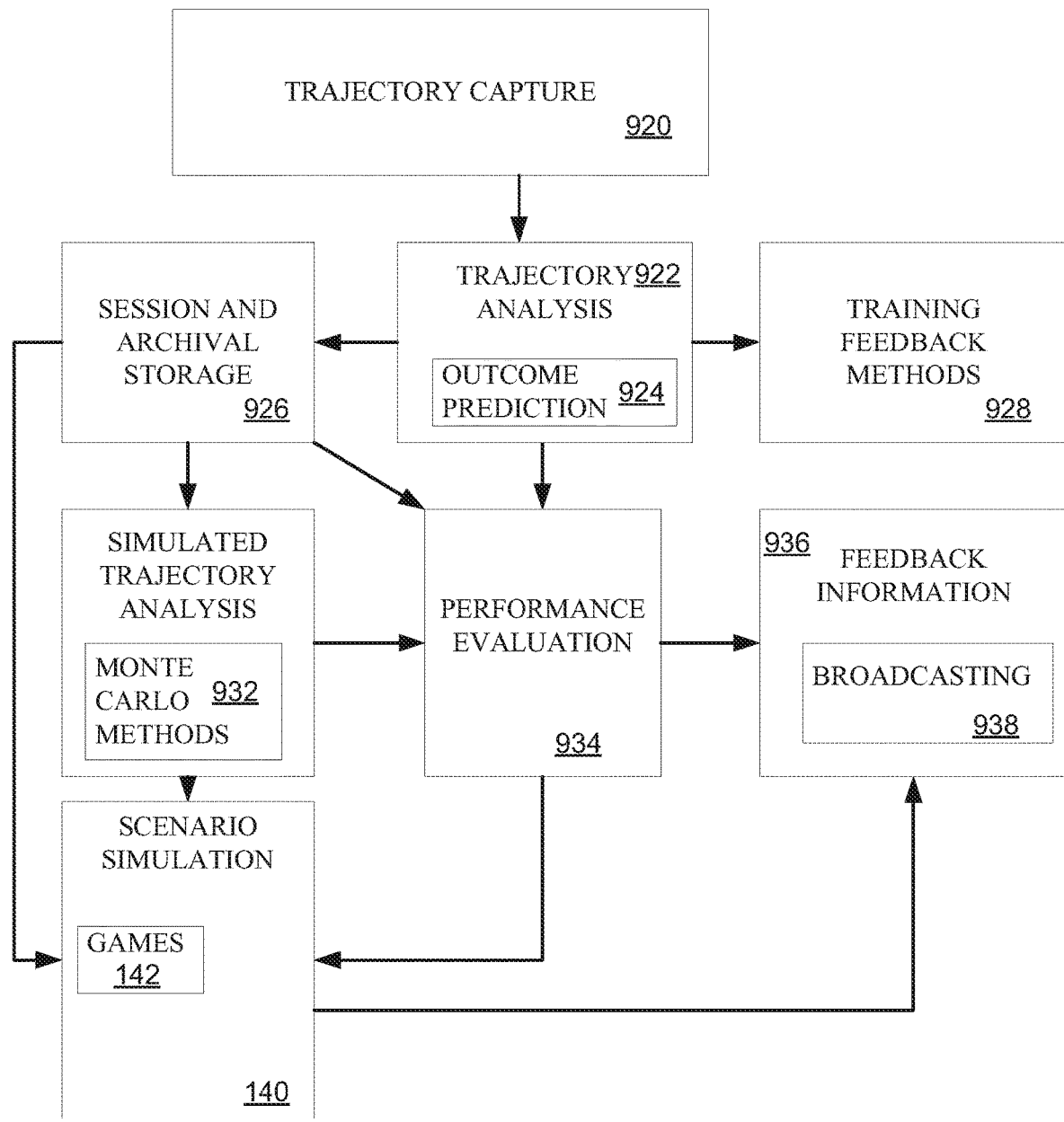
FIG. 17 is a block diagram showing some elements of systems, apparatus and methods utilized in sporting environment for embodiments described herein.

For a given sport, the observation that highly skilled participants are able to consistently reproduce the factors that lead to a particular trajectory has lead to the development of a number of systems, apparatus and methods, which are described herein. Some elements of these systems, apparatus and methods are described with respect to FIG. 17. For example, systems, methods and methods and apparatus may be utilized to capture data relative to the trajectory of a particular object 920, such as but not limited to video capture of trajectory data.

The captured trajectory data may be used to perform trajectory analysis 922. The trajectory analysis 922 may be used to quantify the factors that characterize a particular trajectory. For example, for golf, a quantified factor may be a velocity at which a golf ball leaves a club after being struck with a club, for tennis, a quantified factor may be a velocity at which the tennis ball leaves the racket after being struck with the racquet and for basketball, a quantified factor may be a velocity at which the ball leaves a shooters hand.

The trajectory capture 920 may only provide data relate to a portion of a trajectory, such as a beginning, middle or end portion of a trajectory. Using a trajectory analysis methodology, other portions of a trajectory not captured may be simulated. In particular, after an initial portion of a trajectory is captured, a later aspect of the trajectory may be predicted.

For instance, data regarding a player shooting a basketball may be used to predict whether the shot goes through a hoop or not. As described with respect to the previous figures, a hoop is a desired target area for the trajectory. In another example, data regarding a golfer striking a golf ball may be used to predict a location where the golf ball will land, such as on a green, which may be the desired target area for the shot. Method and apparatus related to trajectory predictions may be referred to as outcome prediction 924. As another example, based upon data captured of a basketball approaching a basketball hoop, it may be possible to predict the velocity, direction and angle of the ball as it left the shooters hand. Thus, the beginning of a trajectory is predicted based on data captured near the end of the trajectory.

In particular embodiments, to implement a trajectory calculation, it may not be necessary to capture a motion of the object being launched. For example, based upon video data captured of an individual shooting a basketball, body motions and an orientation of the individual as they are shooting the ball may be used to determine an initial force vector, i.e., a magnitude of forces and their associated direction including rotational forces if desired, for the basketball as it is released from the shooters hand. The initial force vector may be used as the initial conditions for a trajectory calculation where the outcome of the shot is predicted.

The initial forces applied to a basketball based upon a player's body motions and orientation may be determined using other devices alone or in combination with video capture. For instance, a player may wear a device, such as a glove, with sensors. The sensor may include but are not limited to accelerometers and rotational sensors that allow forces generated by the player to be determined. This methodology is not limited to basketball, an analysis of an individual body motions and orientation to determine initial conditions for an outcome prediction of the trajectory of an object may be utilized in other sports, such as golf, tennis, skateboarding, football, soccer, racquet ball, etc.

Using an analysis of body motions and body orientation to predict trajectory outcome, the individual doesn't necessarily have to launch or strike an object. For example, an individual in tennis may practice their service motion without hitting a tennis ball. An assumption may be made about where a virtual tennis ball would make contact with a racquet and a prediction of the outcome of the trajectory of a virtual tennis ball being struck could be made and feedback could be provided to the player in regards to characteristics of the virtual trajectory of the virtual tennis ball. In a particular embodiment, an image of a virtual tennis ball might be projected, such as a projection of a virtual serve toss, and the player may pretend to strike the virtual tennis ball and then a virtual trajectory including an outcome prediction may be generated for virtual tennis ball.

In another embodiment, an actual tennis ball might be hung from a string at an optimum height for the player to strike the ball, such as an optimum height for the player to hit a particular type of serve. Then, the player may strike the tennis ball. Based upon, an orientation and motions of the racquet and/or their body, an outcome for the serve may be predicted, such as in or out, hit the net, two feet from the corner, etc.

In yet other embodiments, it may not be necessary to generate a simulated trajectory each time an outcome is predicted for a trajectory. For example, curve fits, tables and other methods/data may be developed that correlate one or more parameters to an outcome prediction. For example, for basketball, it may be possible to correlate a velocity and direction at which a hand is moving when a basketball is moving to an outcome for the basketball shot, i.e., whether the ball goes into to the hoop or not. The velocity and direction may be input into a formula, such as curve fit, that predicts outcome or may be used as input to a table look-up routine that uses a series of curves fits to predict outcome based upon these input parameters. Similarly, based upon an initial velocity and direction determined for a basketball, it may be possible to predict an outcome without performing a simulated trajectory calculation each time. In one embodiment, the curve fits or correlations that predict outcome based upon one or input parameters may be generated from a database of actual trajectories and/or simulated trajectories.

Trajectory analysis 922 and outcome prediction 924 may be used as part of training methodologies that help a player to develop consistency in reproducing the factors that result in a particular trajectory of an object and thus, improve their skill level. Developing correct muscle memory is a term that is often associated with training methodologies that help a player develop a skill in a sport. The method and apparatus described herein may be used to provide feedback information as part of training feedback methods 928 that help a player develop consistent muscle memory for an activity associated with a particular sport.

Data related to trajectory capture 920 and trajectory analysis 922 may be stored and archived 926 and later utilized for a number of different purposes. These purposes may include but are not limited to a) simulating trajectories 930 including utilizing Monte Carlo methods 932 and b) Scenario simulation 940 which may include applications related to 3-D rendered games 942. The simulated trajectory analysis 930 may be used to quantify and determine optimum trajectory factors for a particular trajectory, such as the best angle at which to launch a shot of a basketball.

The trajectory analysis 922, archived data 926, simulated trajectory analysis 930 and scenario simulation 940 may be used to evaluate the performance 934 of individual participants or groups of participants. The evaluation of the performance may comprise quantifying a participant's ability to reproduce the factors related to generating a particular trajectory. Once a player's ability is quantified or qualified in some manner, the evaluation of performance 934 may include comparing 1) a participants performance against himself, such as past performance against a current performance, 2) comparing a participant's performance against another participants performance, 3) comparing a participant's performance against a defined standard, such as placing the participant's performance within a defined skill ranking and 4) comparing a participant's to some optimum, such as a comparing averages of factors that a player produces to generate a particular trajectory against optimum values of these factors determined from a simulated trajectory analysis 930.

In one embodiment, the performance evaluation 934 may include predictions of future performance, such as an improvement in performance that an individual might make if the individual were to change some aspect in the manner in which they generate the factors that produce a particular trajectory or were to improve a consistency in which they generate the factors that produce a particular trajectory. This type of analysis might be performed using the simulated trajectory analysis 930 including the Monte Carlo methods 932. In another embodiment, the performance evaluation 934 may include a prediction of future performance, such as a win differential, that a group may make if the individuals in the group were to change some aspect in the manner in which they generate the factors that produce a particular trajectory or were to improve a consistency in which they generate the factors that produce a particular trajectory, such as if a basketball team improved the consistency at which they generated free throws. This type of prediction may include scenario simulation 940.

In addition, a performance evaluation may be developed for a "composite" participant. For example, in basketball, the consistency at which a group of participants generate factors that produce shot against a particular defender may be determined. The shots made by each player against the defender may be treated as if a single player had made each of the shots and analyzed accordingly. In another example, the consistency at which a group of participants in golf on a particular golf hole generate a shot may be determined. The shots made by the group of participants may be treated as if a single player had made each of the shots on the selected hole. The evaluation of performance for a composite player may involve similar comparisons as described in the previous paragraph for an individual player Once performance is evaluated for an individual player, group of players or a composite player, feedback information 936 may be provided. In many instances, the feedback information may be provided in a graphical format where the graphical format provides some indication of a level consistency at which the factors that produce a particular trajectory are being generated. In a particular embodiment, the feedback information 936 may be utilized in a real-time sports environment, such as during a televised sporting event. Thus, particular methods and apparatus related to broadcasting 938 are described herein.

In the following paragraphs, descriptions of methods and apparatus related to outcome prediction 924, simulated trajectory analysis 930 including Monte Carlo methods, performance evaluation 934, feedback information 936 including broadcasting 938 and scenario simulation 940 including games 942 are emphasized. Some details regarding trajectory capture 920, trajectory analysis 922, training feedback methods 928 and session and archival storage 926 are provided.

Important aspects of sports training are assessing a participant's current ability, proscribing a training regimen and then determining whether an improvement has occurred as a result of the training regimen. In sporting activities where it is desirable to propel an object along a trajectory to a desired target area, assessing a participants current ability may involve having a participant propel the object a number of times and then counting the number of times the object reaches the desired target area and counting the number of times the object does not reach the desired target area. For example, a basketball player could be asked to take 25 free throws and based on the number of makes and misses a free throw percentage may be calculated for the player. In another example, a golfer could be asked to hit 25 shots from the same location with the same club and a percentage of shots that land within a desired target area could be calculated.

A downside of the counting methodology listed above is that a result may be used in an assessment and evaluation of the player that is statistically meaningless. In general, statistically, the sample size needed to produce an percentage error rate is proportional to $1/(\text{error rate})^2$. The exact value of the error rate may vary depending on the statistical methods that are used. Thus, qualitatively to produce an error rate that is less than ±10% the sample size is proportional to $1/(0.1)^2$ or about 100 samples. Thus, if a basketball player shot 100 free throws and made 70, one might say the player is 70% free throw shooter. The error rate may be about ±10% for this sample size. If the player practiced for a while and then shot another 100 free throws and made 75 free throws, one might say the player is 75% free throw shooter. Again, however, the error rate is about ±10%. The player may believe that they improved their free throw shooting as a result of their practice. However, based upon the statistically error rate resulting from the sample size, it is possible, the player improved but it is also possible that the player may have actually not improved and became a worse shooter.

To reduce the error rates associated with the sample size to below 1% on the order of 10,000 samples may be needed, i.e., $1/(0.01)^2$. To assess their current ability, most participants in any sport are not going to spend the time to accumulate this many samples, i.e., shoot 10,000 baskets, kick a soccer ball 10,000 times, throw a baseball 10,000 times, etc., to produce a sample size with an error rate less than ±1% and then repeat this process at a later time to assess an improvement in their ability. Further, since samples would likely have to be accumulated over many sessions over a period of time, it would be difficult to associate the samples with a player's current skill level because the player's skill level could change as the samples were accumulated over a period of time.

Figure 18A:
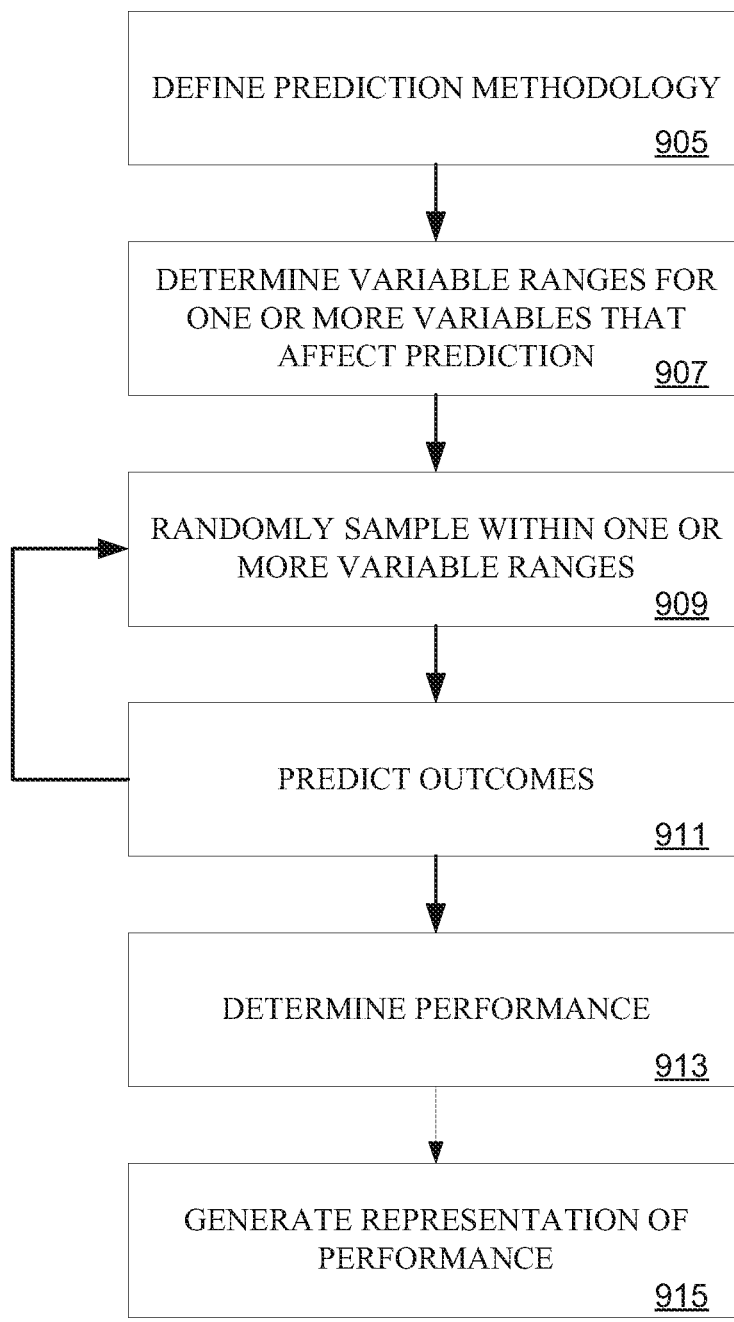
FIG. 18A is a flow chart of a methodology for characterizing an individual's skill level from a limited sample size.

A methodology is described herein that may overcome the difficulties associated with assessing a player's skill level in regards to propelling object a desired target area. In FIG. 18A, a flow chart that comprises some elements of a methodology for characterizing a player's skill level from a limited sample size is provided. In 905, a prediction methodology is defined that predicts a trajectory of an object based upon one or more input variables. The prediction methodology may be sensitive to one or more factors that may be controlled by a participant in a sporting activity involving the object. For instance, for basketball, the participant may control a height, a velocity and an initial direction at which the basketball is released and an associated trajectory prediction methodology may be sensitive to these variables. As another example, in tennis, the participant may be able to control, the velocity, direction, orientation and position ball relative to the face of the racquet as a tennis ball is struck and an associated trajectory prediction methodology that is defined may be sensitive to these variables.

Equations of motion that allow a trajectory of basketball and a golf ball to be predicted are described herein but this methodology is not limited to these objects as a trajectory prediction methodology may be defined for any type of object that may be used in a sporting activity. With the equations of motion applicable to a given object and a set of initial conditions a trajectory of an object may be predicted by solving the equations of motions. In many embodiments, the initial conditions may be determined from captured or measured data, such as from captured video data.

In some embodiments, it may not be necessary to solve equations of motions to predict an outcome for a trajectory. For example, a database may be developed that includes trajectories generated under experimental conditions, such as by using a mechanical device, to launch an object. The mechanical device may allow precise control of initial conditions for the trajectory. For each trajectory, the initial conditions and outcome for the trajectory may be recorded. An experimental database may be developed that includes the initial conditions and trajectory outcomes for a set of trajectories.

Using the trajectory database, initial conditions for a trajectory may be determined and the experimental database may be used with an interpolation scheme to predict the outcome of the trajectory. For example, a set of trajectories may be experimentally generated for basketball and incorporated into one of the devices utilizing video capture to determine a trajectory of a basketball. The experimental database may be used to predict a trajectory outcome for a shot of a player captured with the device.

A device for generating an experimental database for basketball trajectories is shown in FIG. 11. The device is set-up to automatically generate a set of basketball trajectories based on an initial set of input parameters, determine the outcome for the trajectory, i.e., if the shot is made or missed and store the outcome. For each object of interest, an appropriate device may be developed or it may be possible to modify an existing device if it allows the input conditions to be known precisely enough. For instance, mechanical devices for launching tennis balls, hitting golf balls, launching baseballs and launching footballs exist and one of these devices may possibly be modified to generate a trajectory database.

Analytical methods and methods using experimentally generated databases may be used in combination. For example, in a tennis environment, an analytic method may be used to predict where a ball will land after it is struck. After the ball hits the ground, it may bounce and the portion of a trajectory after it hits the ground may be predicted using an experimental database. Different databases might be developed for bounces on different surfaces, such as grass, clay or a synthetic surface. In a golf environment, a trajectory database to predict bounces might be developed to account a hardness of various surfaces, such as a green versus a fairway.

After a prediction methodology is defined, it may be used to assess an ability of a player. Further, it may be used to predict optimum sets of trajectory parameters for launching an object, such as via sensitivity studies. In a sensitivity study, one or more parameters that affect a trajectory may be varied over some range to see whether there is a particular range in which the chances of a desired outcome are maximized. In addition, it may be used to predict improvements when a player adopts a new set of trajectory parameters to use for launching an object (e.g., see FIGS. 18B-18E).

In 907, to initiate the applications described in the preceding paragraph, first one or more input variables to vary may be selected, then a range of one or more input variables may be determined. Not all of the variables that are input into a trajectory prediction have to be varied for a particular implementation. For example, in golf, a prediction methodology may be developed that accounts for the effects of wind. For a given set of trajectory predictions, the wind speed could be set at a constant for each trajectory, randomly varied within a range of wind speeds or set to zero. As another example, in basketball, an initial angle of a predicted series of shots may be varied where the angle varies only in a vertical plane aligned with the center of the basketball hoop and side to side errors of the ball may used in the prediction. As another example, the initial angle of predicted series shots may be varied in combination with a side-to-side error variable to account for incorrectly aligned shots, i.e., not aimed at the center of the hoop.

The range of a variable that is selected may vary according to the application. In a sensitivity study (see FIGS. 18B-18E), the one or more ranges may be varied such that a range of outcome that is generated that is representative of trajectories that may be produced by a group of players with a widely varying degree of skill level. In an assessment of an individual player, the range of variables may be selected that is representative of trajectories to be likely generated by the individual player.

In one embodiment, range of input variables for an individual player may be determined by capturing data from actual trajectories generated by a player and then using an analysis, such as a statistical analysis, to determine a mean or average for a variable of interest and then to determine an amount of variability around the mean or average. For example, in basketball environment, a player may be asked to take twenty to thirty shots from a particular location. Trajectory parameters associated with each shot may be determined using a device employing video capture. For each trajectory parameter of interest, a statistical mean and standard deviation may be calculated. Then, a range of the variable may be selected or determined. For instance, a determined range for a trajectory parameter of interest might be the statistical mean plus or minus one, two or three standard deviations.

As an example, for an individual basketball player, a range of an initial shot angle might be 42 degrees plus or minus 2 degrees where the 42 degrees is a mean value determined from a set of shots and the 2 degrees represents a range of two standard deviations. As mentioned in the description with respect to FIG. 18A, the ranges don't have to be determined necessarily from data generated by a single player, a performance evaluation may be performed where the data from a group of players is put together to form a "composite." For example, the range 42 degrees plus or minus 2 degrees may be representative of shots taken by multiple players against a particular defender. The composite player in this case may be considered a group of shooters taking shots against a particular defender. In another example, the range of 42 degrees plus or minus 2 degrees may be representative of the free throw shooting for a particular basketball team where the composite player is representative of the basketball team as a whole.

After a one or more variables are selected for an analysis and the range of these variables are determined, outcomes for a number of trajectories may be generated where for each trajectory a value for each of the one or more variables is selected such that is within the determined ranges for the variable. In one embodiment, the values to use for each trajectory may be selected such that the values fall along some preselected distribution, such as a linear distribution or a Gaussian distribution. Based upon the number of trajectories that are to be generated, the values may be selected such that they are representative of the distribution function that is being employed.

As an example, if the values are selected to fall along a linear distribution, then based upon the range value and the number of trajectories that are to be generated an interval may be determined and the analysis may step through range associated with a variable according to the determined interval. For instance, in the example of the paragraph above, a range of 4 degrees is specified about a mean of 42 degrees. For an analysis with 901 trajectories and a linear distribution, the angle may be varied from 40 degrees to 44 degrees by increments of 0.04 for each trajectory.

In another embodiment, in 909, a variable may be randomly sampled within its selected range such that a random value of the variable is within the selected range and is consistent with a selected distribution of the variable. If two are more independent variables are two be varied, then this process may be repeated for each of the variables. In 911, after values of the trajectory parameters that are to be varied are determined, a trajectory prediction may be made using these variables. For example, for a basketball shot, the outcome predicted may be a made or missed shot. For golf, the outcome predicted may be a location where the ball lands, which may or may not be within a desired target area. For tennis, the outcome predicted might be a landing location within or outside of a desired target area on the tennis court. Steps 909 and 911 may be repeated for a selected number of trajectories to be calculated. One hundred, one thousand, ten thousand or more trajectories may be calculated depending on a desired level of accuracy and a number of variables that are being varied in the trajectory analysis.

In 913, a performance evaluation may be made. For instance, a performance evaluation may be that a basketball player for their measured level of variability in shot mechanics is likely to make a certain percentage of shots from a certain distance where the percentage is determined from the predicted outcomes in 911 over the number of trajectories that were generated. This assessment may be made for a variety of shot distances. In another embodiment, a performance evaluation may be a prediction of the percentage of shots the player is likely to make from a certain distance if they were to reduce a variability in one or more variables associated with their shot mechanics (In one embodiment, the variability as described above may be characterized using a calculation of a standard deviation for one or more variables associated with a group of shots). In another embodiment, a performance evaluation may be a prediction of a shooting percentage of shots from a certain distance a player would make if they were to change their shot mechanics while maintaining their current variability, e.g., putting more arc in their shot. FIGS. 18B-18E, provide some examples of performance evaluation for basketball.

In 915, a representation of their performance may be generated. Typically, the representation may include a graphical component. The representation may include elements that quantitatively and/or qualitatively show how the variability in their mechanics affect an object's trajectory and the subsequent outcome of the trajectory which may be predicted. These graphical representations may include 2-D or 3-D components.

Figure 18B:
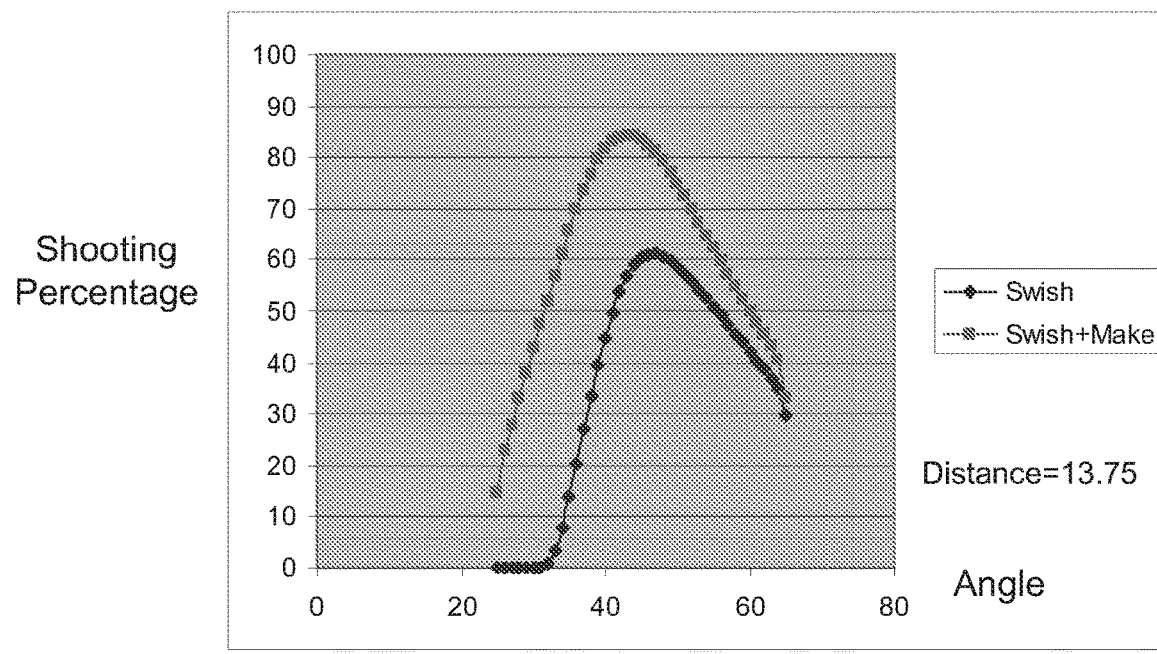
FIGS. 18B-18E are graphs of shooting percentage for a particular shot distance as a function of hoop entry angle.
Figure 18C:
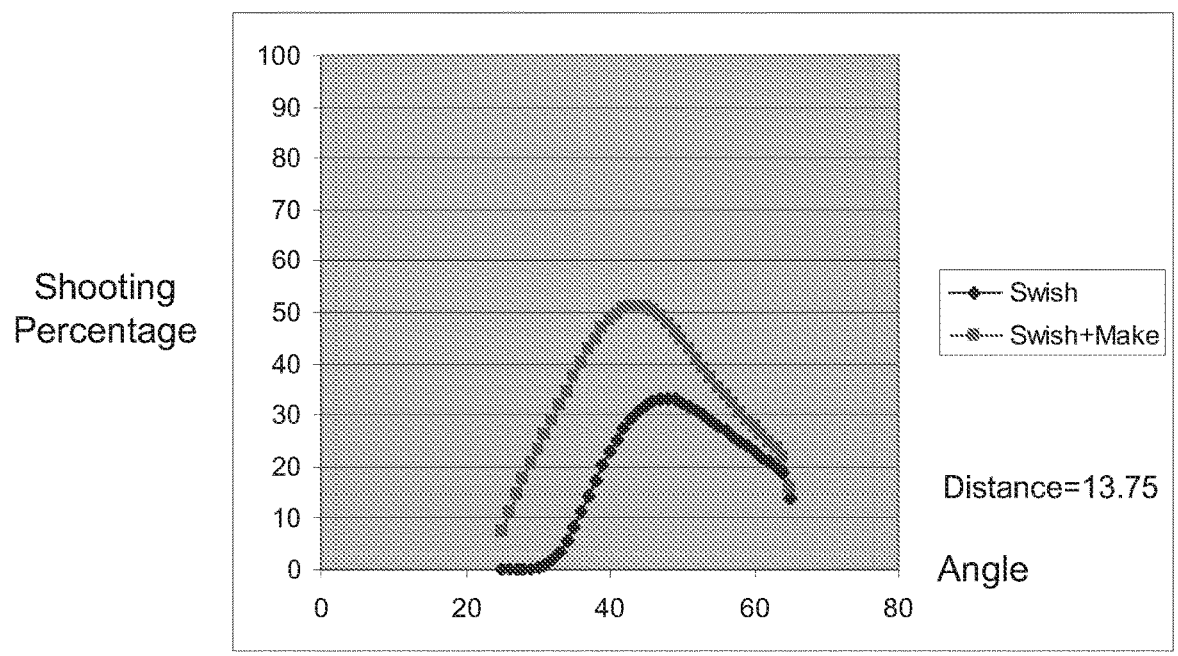
Figure 18D:
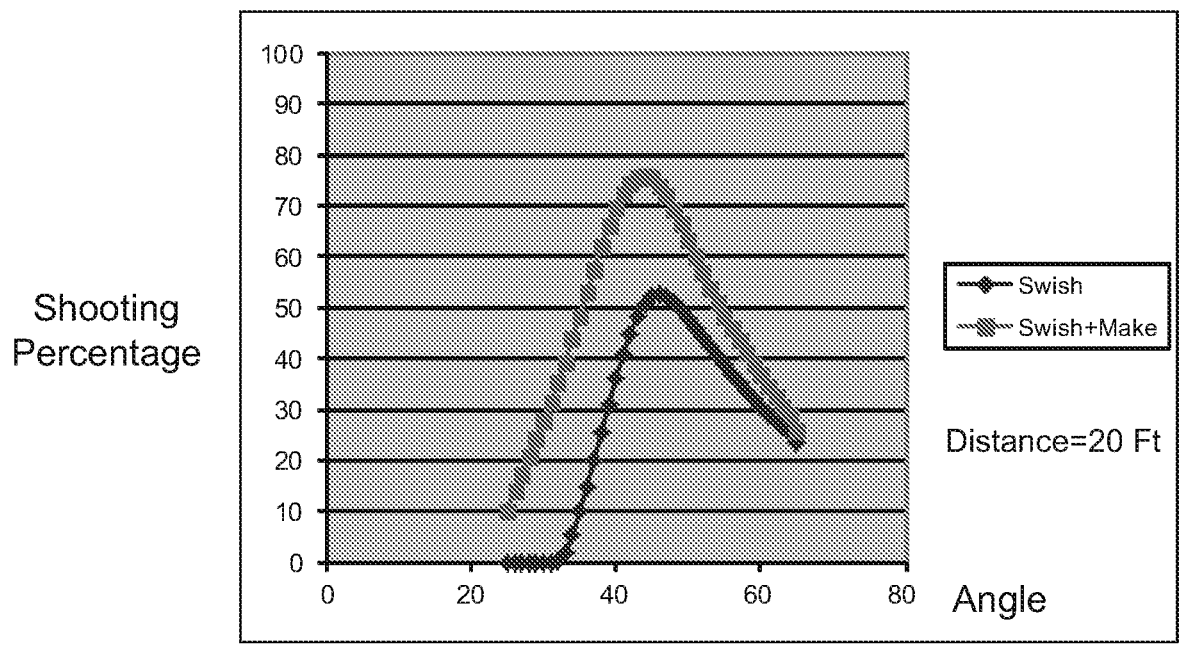
Figure 18E:
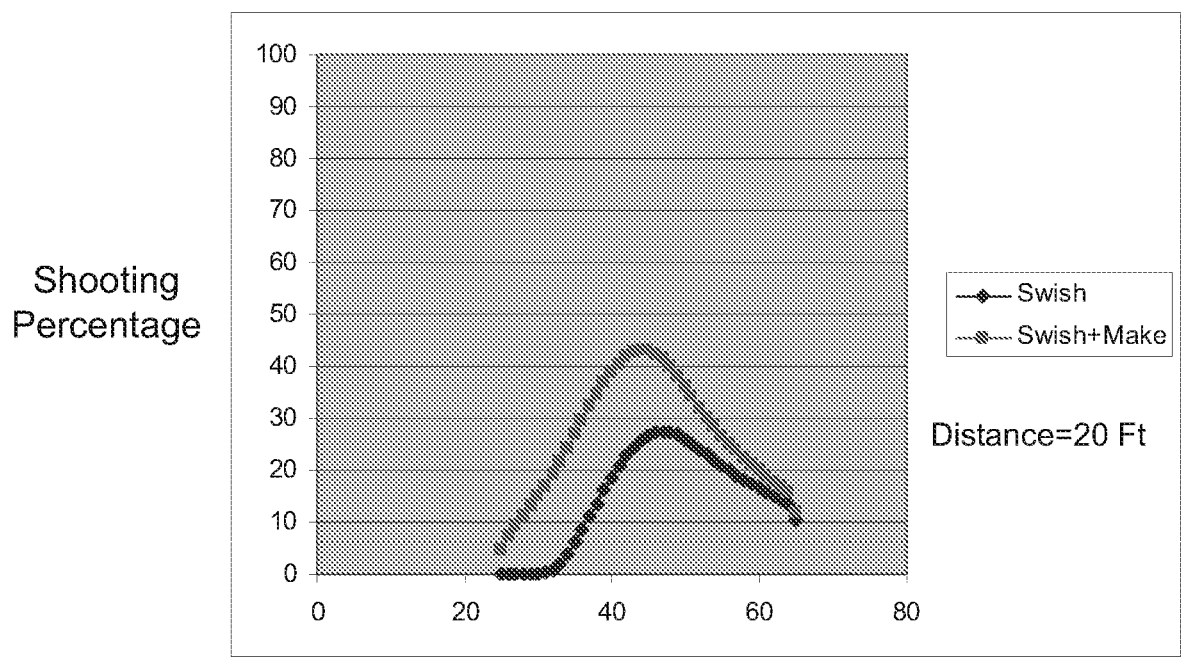

FIGS. 18B-18E are graphs of shooting percentage for a particular shot distance as a function of hoop entry angle. FIGS. 18B and 18C are for a shot distance of 13.25 feet. FIGS. 18D and 18E are for a shot distance of 20 feet. Hoop entry angle and hoop entry velocity are varied in the simulations. The hoop entry angle is directly related to the release angle of the shot. The entry velocity is directly related to the release velocity, which corresponds to the force that an individual applies to the ball prior to release. Two curves are shown on each figure. A first curve represents a swish percentage as a function of entry angle. A swish is a shot that goes through the hoop without touching the rim. Swish+Make refers to shots that go through the hoop including shots that hit the rim first and shots that don't touch the rim (swish).

In the analysis, a standard deviation for each of the entry velocity and the entry angle is utilized, such that the entry angle and entry velocity are varied about a mean to provide a range of values for each of these parameters. In FIGS. 18B and 18D a deviation of the entry angle and entry velocity that is more consistent with a skilled player is used. In FIGS. 18C and 18E, a deviation of the entry angle and entry velocity is used that is more consistent with a less skilled player. In these examples, the deviations relating to entry angle and entry velocity for the less skilled player are twice that of the more skilled player. As described above, the amount of deviation of these shooting parameters may be an indicator of the skill level of a player where more skilled players exhibit less deviation from the mean when a group of their shots is considered.

As expected, a comparison of FIGS. 18B and 18D, to FIGS. 18C and 18E shows the player with the less deviation in their shooting parameters makes a higher percentage of their shots over a range of release angles. As described above, the entry angle plotted in the figure is directly related to the release angle. Of interest, the shooting percentage increases from zero to a maximum and value and then declines for each set of curves. The peak in shooting percentage corresponds to a release angle, which is near 45 degrees. An experimental validation of this methodology is described with respect to FIGS. 11 and 12.

As describe above, via determinations made from actual shots, curves such as those shown in FIGS. 18B-18E could be generated for an individual player based upon a mean entry velocity and mean entry angle for a group of shots taken by the player and a deviation of these parameters associated with the player. The means and variations of the parameters could be calculated from less than 100 shots taken by the player. However, 40-60 shots may be sufficient. Although, it may be possible to use even less shots, such as 25-30. The shots used for analysis may be from shots taken in a practice environment or possibly from shots taken during an actual game or combinations thereof. From the generated curves, the player could see where their mean entry angle is relative to the peak on the curve and determine whether changing their release angle will significantly improve their shot. Further, plots could be generated for the player showing possible improvements if they were to improve the consistency with which they generate the entry angel and entry velocity, i.e., lower the deviations of these parameters associated with their shots.

Image Capture and Analysis System

There are aspects of the game of basketball that may lend itself to the use of the methods and apparatus described herein, such as a stereoscopic imaging system. A few of these aspects may be as follows: 1) basketball may be played in a confined space with a small scoring target, 2) the scoring occurs only when the basketball has gone above 10 feet, allowing scoring to be clearly identified and most player movements (offensive and defensive) to be associated with a particular shot (either prior to the shot or after the shot) and 3) basketball is often played in venues, such as an arena or gyms, where clear views of the entire court are valued, so camera positions that obstruct fan views are discouraged. Nevertheless, as described herein, outdoor applications using systems that may be temporarily set-up are also possible, basketball is played in a way that for most of the playing minutes, all 10 players are on only one end of the court rather than spread over the entire court, basketball has only 10 players on the court at a time.

For most of the minutes, the offensive players face the basket (post moves are the exception) and the defensive players have their backs to the basket. Players are usually separated from each other (post players the exception). Since there are large numbers on both front and back of uniforms, this allows a single camera system above the basket a clear view of player numbers.

Because of these aspects of the game of basketball, it may be possible, in one specific embodiment, to capture all important activity of a basketball game from two small, unobtrusive, relatively inexpensive, relatively easy to operate camera systems (one above each basket). However, other more complex camera systems may also be utilized.

Figure 19A:
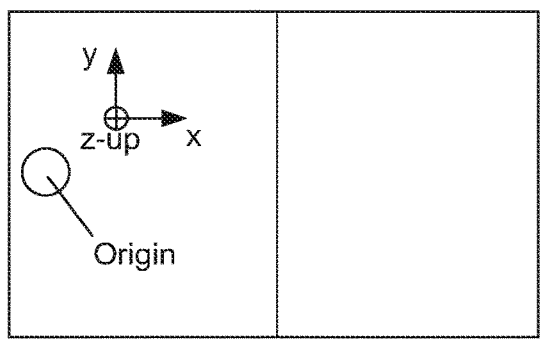
FIGS. 19A, 19B and 19C are illustrations of image capture system.
Figure 19B:
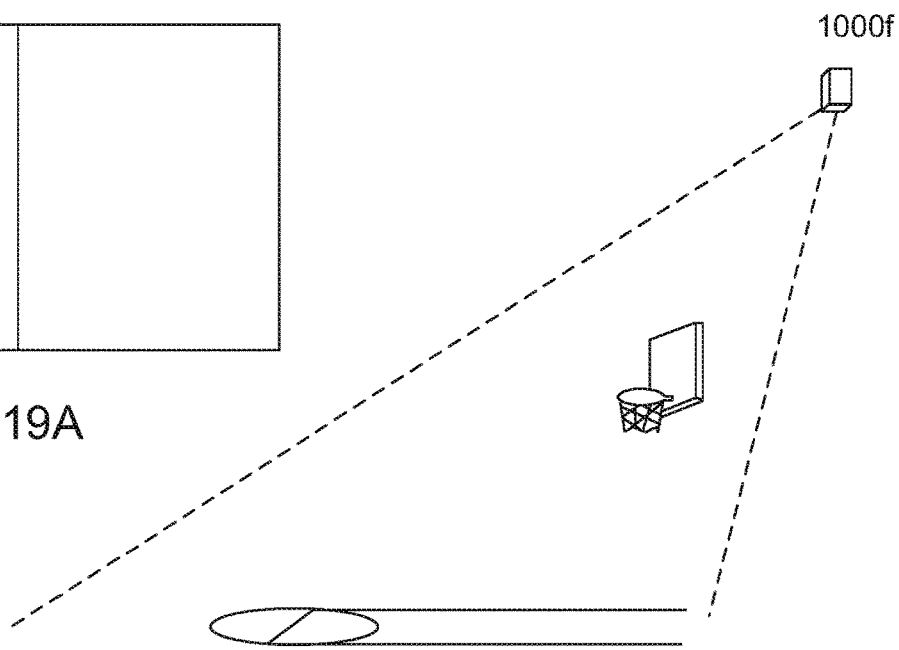
Figure 19C:
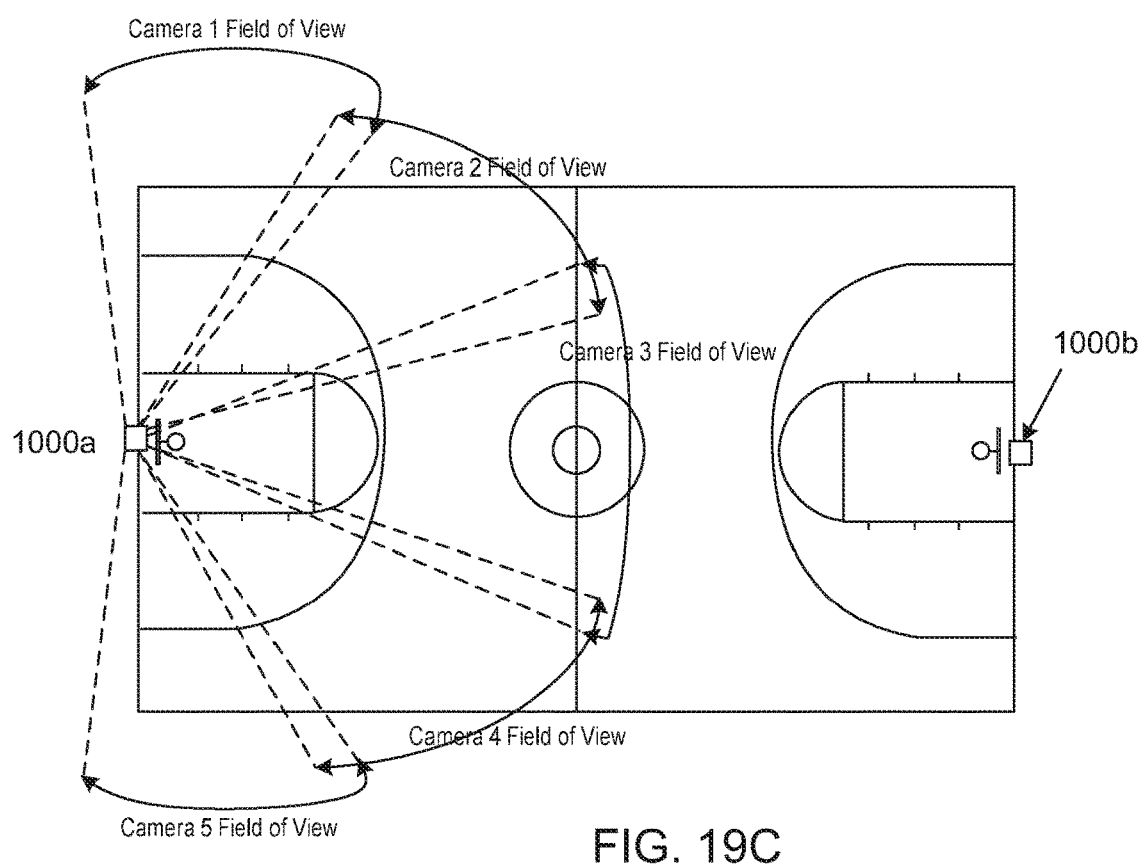

In one implementation, which is provided for illustrative purposes only, there is a camera system positioned above and behind the basket on each on each end of the floor. In FIG. 18C, the camera systems, 1000*a* and 1000*b*, above each basketball and behind on end of the floor are shown. Each camera system may have 6 stereo camera pairs with capability similar to the TYZX 3D Aware Stereo Vision product: 30 frames per second, 22 cm baseline, 512×480 resolution, 45 degrees field of view, 2.6 meter to 19 meter viewing range, range resolution of 0.6 cm at 2.6 meters and 34 cm at 19 meters, spatial resolution of 0.4 cm at 2.6 meters and 3 cm at 19 meters, 2.6 billion pixel-disparity evaluations per second. Five of the stereo camera pairs are focused on the floor action as shown in FIG. 19C. A field of view for each of the cameras in the camera system 1000*a* focused on the floor for one half of the court is shown in the figure. These cameras may be able to capture 3-D position of all movement of the ball, 10 players and 3 referees for the half court.

One of the stereo camera pairs, contained in the same enclosure as the other 5 pairs of 1000*a*, may be focused on the hoop and the surrounding vicinity as shown in FIG. 19C. This camera pair may be able to accurately resolve ball entry angle to +/−1 degree and ball entry position to +/−0.2 cm in the X and Y axis and to +/−0.3 cm in the Z axis. The x, y, z coordinate system is shown in FIG. 18A where the origin of the system may be the geometric center of the hoop. A simplified view of images that may be captured from camera 1000*f* is shown in FIG. 19B. In this embodiment, the primary cameras may be fixed in position at about a 45 degree angle to the court with at least 8 cameras per side. This angle may minimize occlusion for the camera views while increasing camera separation for accurate 3-D object/ human placement.

Additional cameras that may be utilized include cameras looking straight down from above, cameras placed on the top of the time clock, cameras placed on the basket pole, and cameras near (or in) the floor. The camera positions may be selected to avoid creating safety issues or blocking the view of coaches or fans. Cameras positioned in the fan seating may also be of value even though the view would often be obstructed due to movement of the fans. When the view is clear, then the cameras would provide useful additional information. Further, in one embodiment, images from cameras positioned in these locations may be used to generate simulations that compare a fans view with a player's view or a coach's view.

Camera calibration, both absolute across the field and relative camera-to-camera may be important for all 3-D motion capture systems. For the 45 degree cameras and the top view cameras, calibration may be performed using floor markings and hoop/backboard positions. For floor cameras and fan seating cameras, the floor markings may not be adequate and hoop/backboard position may not be sufficient for calibration purposes. Since these cameras may need to be calibrated in both absolute terms and relative to other cameras, one method for this calibration may be to use LED dots near the 45 degree cameras in conjunction with hoop and backboard position to perform the calibration for these cameras.

The captured image data may be analyzed to calculate important attributes that impact game performance. These attributes for a player or for a team may include maximum or average or average determinations of a number of parameters including but not limited to height of maximum jump, height and distance of maximum dunk shot, height of maximum rebounding hand, quickness of shot release, quickness of cross-over dribble, quickness of between the leg dribble, quickness of behind the back dribble, quickness and length of first drive step from triple threat position, etc. The captured image data may be stored in a searchable data and determinations above may be generated via an interface coupled to the database.

As another example, non-intrusive sensors, such as accelerometers or vibration sensors, may be integrated into the object, such as 159 or 160 (FIG. 20), a device worn by the players, 152 or 153, or other associated equipment, such as the backboard 151, the net 180 and the hoop 103. Information from these non-intrusive sensors may be utilized by the trajectory detection system. In particular, a small (silicon chip based) sensor system with a Radio Frequency Identification (RFID) tag may be integrated into an object, such as a basketball. The sensor chip may include sensors for measuring accelerations and rotation rates for the object along its trajectory. A microprocessor on the chip may be used to process the sensor data and an antenna may be used to broadcast signals to an RFID tag reader. The sensor chip may be powered by an electromagnetic energy received from the RFID tag reader. As another example, the non-intrusive sensors, such as a sensor chip, may be integrated into items worn by the player, such as player's shoes or integrated into their clothes. These sensors may allow the trajectory system to detect forces that a player's generates while launching an object, such as the directional forces, a player, such as 152 or 153, generates during a basketball jump shot. With this type of information, the player's release time may be correlated to where the player is in their jump, i.e., is the ball released at the peak of their jump, on the way up or on the way down. Also, information, such as whether the player jumps straight up and down, forward or backward or side-to-side may be determined. These types of sensors may be denoted as non-intrusive because a player using a ball with these types of sensors or wearing these types of sensors is not likely to be aware of their presence unless directly told about their presence. However, in general, any type of sensor that does not interfere with the player's normal play of the game may be considered non-intrusive. For instance, a small sensor package worn by the player may be considered non-intrusive if it does not interfere with their play even though the player may be aware of the sensor package.

Figure 21:
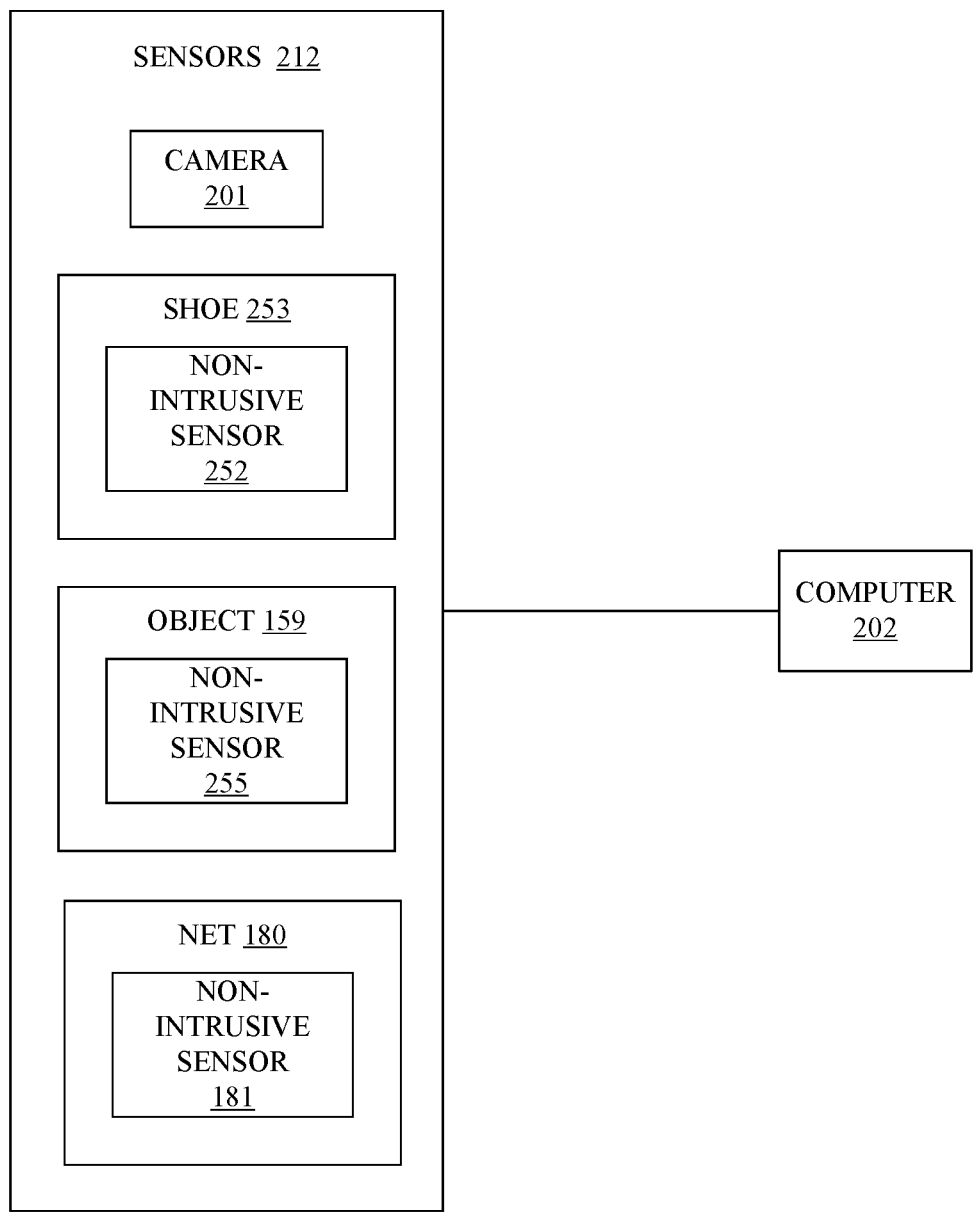
FIG. 21 is a block diagram of an embodiment of a trajectory detection and analysis system.

The present invention is not limited to one type of sensor system. For example, in some embodiments, combinations of sensor systems, such as a machine vision system, non-intrusive sensors integrated into the launched object or associated equipment, non-intrusive sensors worn by the player and emitter/detector systems may be used with the trajectory systems of the present invention. FIG. 21 shows a trajectory detection and analysis system having sensors 212, including a camera 201, a non-intrusive sensor 252 worn by the player, such as on the player's shoe 253, a non-intrusive sensor 181 incorporated into net 180, and a non-intrusive sensor 255 integrated into an object 159, such as a basketball. Further, the feedback information generated by the system may not be limited to trajectory parameters regarding the object's flight. For instance, as described in the previous paragraph, non-intrusive sensors may be used to measure forces that a player generates while launching an object or a position of the player during and after the launch of an object, such as shooting a basketball. Parameters regarding this information may be generated by the trajectory system and provided as feedback information to a system client, such as 152, 153 and 154.

Referring to FIG. 20, two players, 152 and 153, are shown shooting two balls, 159 and 160, that are in flight at the same time. The trajectory system may be capable of generating trajectory parameters and feedback information for two or more object with trajectories in flight at the same time, such as 161 and 162. When two objects collide before reaching the basket 103 and are deflected, the trajectory system may be capable of determining whether a shot would have been made based upon trajectory data measured before the objects collided.

Methods may be used by the system to distinguish between two or more players that have shot a ball while using the trajectory system. For instance, as described above, the ball used by each player may be marked in some manner allowing the system to distinguish between which of the two or more players has shot a ball. In another example, non-intrusive sensors worn by the player or markings on clothes worn by the player may allow the system to distinguish between players. The non-intrusive sensors may allow the system to determine when a particular player has shot the ball. The markings on the clothes, such as a different jersey worn by each player using the system, may allow the system to distinguish between players.

When the system can distinguish between two or more players using the system simultaneously, trajectory session data may be generated and archived for each player, which may be advantageous. Also, when the system can distinguish between players, the system may be able to provide personal feedback information to each player via feedback interfaces worn by the players. For instance, player 152 that has shot the ball 159 is wearing a feedback interface device 164, which provides feedback information in a kinetic format and player 153, which has shot the ball 160 is wearing a feedback interface device 164, which provides feedback information in an auditory format. In this embodiment, the system detects and analyzes the trajectories of balls, 159 and 160, generates trajectory parameters, determines which player has shot which ball and provides feedback information to each player via their respective feedback interface devices, 163 and 164. The feedback information is sent to each player's feedback interface device via a wireless communication interface used by the trajectory feedback system.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A system for monitoring basketball shots, comprising:
 a first non-intrusive sensor for sensing motion of a basketball as the basketball passes through a net of a basketball goal during a basketball shot by a shooter, the first non-intrusive sensor configured to transmit first data indicative of the sensed motion, wherein the first non-intrusive sensor is coupled to the basketball or the basketball goal;
 a second non-intrusive sensor worn by the shooter for sensing motion of the shooter; and
 at least one processor configured to receive the first data and to determine based on the first data whether the basketball shot is made, wherein the at least one processor is configured to identify the shooter as shooting the basketball for the basketball shot based on the second non-intrusive sensor worn by the shooter.

2. The system of claim 1, wherein the first non-intrusive sensor comprises an accelerometer.

3. The system of claim 1, wherein the system further comprises memory for storing second data indicating whether the basketball shot is determined to be made and for relating the second data to an identifier identifying the shooter.

4. The system of claim 3, wherein the at least one processor is configured to calculate a shooting parameter for the shooter over a plurality of basketball shots by the shooter based on the second data, and wherein the system further comprises at least one feedback output mechanism configured to output the shooting parameter.

5. The system of claim 4, wherein the shooting parameter is indicative of a shooting percentage for the shooter over a plurality of basketball shots by the shooter.

6. The system of claim 1, wherein at least one processor is configured to calculate at least one trajectory parameter based on the first data and to determine whether the basketball shot is made based on the at least one trajectory parameter.

7. The system of claim 1, wherein the second non-intrusive sensor comprises an accelerometer.

8. The system of claim 1, further comprising at least one feedback output mechanism configured to output the feedback information to a user.

9. A system for monitoring basketball shots, comprising:
 a first non-intrusive sensor for sensing motion of a basketball as the basketball passes through a net of a basketball goal during a basketball shot, the first non-intrusive sensor configured to wirelessly transmit first data indicative of the sensed motion, wherein the first non-intrusive sensor is coupled to one of the group consisting of: the basketball and the net;
 a second non-intrusive sensor worn by a shooter for the basketball shot, the second non-intrusive sensor configured to transmit second data indicative of motion of the shooter in launching the basketball during the basketball shot; and
 at least one processor configured to receive the first data and to determine, based on the first data, whether the basketball shot is made and configured to receive the second data and to determine, based on the second data, at least one parameter related to the basketball shot.

10. The system of claim 9, wherein the at least one processor is configured to generate feedback information based on the at least one parameter and a determination by the at least one processor whether the basketball shot is made, and wherein the system further comprises at least one feedback output mechanism configured to output the feedback information to a user.

11. The system of claim 9, wherein the at least one processor is configured to determine an identity of the shooter launching the basketball during the basketball shot based on the second data, the system further comprises memory for storing third data indicating whether the basketball shot is determined to be made and for relating the third data to the determined identity of the shooter.

12. The system of claim 11, wherein the at least one processor is configured to calculate a shooting parameter for the shooter over a plurality of basketball shots by the shooter based on the third data, and wherein the system further comprises at least one feedback output mechanism configured to output the shooting parameter.

13. A method, comprising:
sensing motion of a basketball with a first non-intrusive sensor as the basketball is passing through a net of a basketball goal during a basketball shot by a shooter, the first non-intrusive sensor coupled to the basketball or the basketball goal;
transmitting first data indicative of the sensing the motion of the basketball;
receiving the first data with at least one processor;
determining, with the at least one processor, whether the basketball shot is made based on the received first data;
sensing motion of the shooter with a second non-intrusive sensor worn by the shooter; and
identifying, with the at least one processor, the shooter as shooting the basketball for the basketball shot based on the sensing.

14. The method of claim 13, wherein the sensing the motion of the basketball comprises sensing an acceleration of the basketball with the first non-intrusive sensor.

15. The method of claim 13, further comprising:
storing in memory second data indicating whether the basketball shot is determined to be made; and
relating the second data to an identifier identifying the shooter.

16. The method of claim 15, further comprising:
calculating a shooting parameter for the shooter over a plurality of basketball shots by the shooter with the at least one processor based on the second data; and
outputting the shooting parameter with at least one feedback output mechanism.

17. The method of claim 16, wherein the shooting parameter is indicative of a shooting percentage of the shooter over a plurality of basketball shots.

18. The method of claim 13, further comprising outputting the feedback information to a user with at least one output mechanism.

19. A method, comprising:
sensing motion of a basketball with a first non-intrusive sensor as the basketball is passing through a net of a basketball goal during a basketball shot, the first non-intrusive sensor coupled to one of the group consisting of: the basketball and the net;
sensing motion of a shooter in launching the basketball during the basketball shot with a second non-intrusive sensor worn by the shooter;
wirelessly transmitting first data indicative of the sensing the motion of the basketball as the basketball is passing through the net during the basketball shot with the first non-intrusive sensor;
wirelessly transmitting second data indicative of the sensing the motion of the shooter in launching the basketball during the basketball shot with the second non-intrusive sensor;
receiving the first data and the second data with at least one processor;
determining, with the at least one processor based on the received first data, whether the basketball shot is made; and
determining, with the at least one processor based on the second data, at least one parameter related to the basketball shot.

20. A system for monitoring basketball shots, comprising:
a first non-intrusive sensor for sensing motion of a basketball as the basketball passes through a net of a basketball goal during a basketball shot, the first non-intrusive sensor configured to provide first data indicative of the sensed motion of the basketball;
a second non-intrusive sensor configured to provide second data for use in identifying a shooter of the basketball shot, wherein the second non-intrusive sensor is configured to sense a launching motion associated with the shooter launching the basketball toward the basketball goal during the basketball shot;
memory; and
at least one processor configured to receive the first data and the second data, the at least one processor configured to determine whether the basketball shot is made based on the first data and to identify the shooter based on the second data, the at least one processor further configured to store in the memory third data indicating whether the basketball shot is determined to be made by the at least one processor, wherein the at least one processor is configured to associate the third data in the memory with an identifier identifying the shooter, wherein the third data associated with the identifier indicates whether a plurality of basketball shots by the shooter have been determined to be made by the at least one processor, and wherein the at least one processor is configured to calculate a shooting parameter for the shooter over the plurality of basketball shots by the shooter based on the third data and the identifier.

21. The system of claim 20, wherein the at least one processor is configured to generate feedback information based on the third data, and wherein the system further comprises at least one feedback output mechanism configured to output the feedback information.

22. The system of claim 20, wherein the first non-intrusive sensor is coupled to one of the group consisting of: the basketball and the net.

23. The system of claim 22, wherein the second non-intrusive sensor is worn by the shooter.

24. The system of claim 22, wherein the first non-intrusive sensor comprises an accelerometer.

25. The system of claim 20, wherein the first non-intrusive sensor comprises a camera.

26. The system of claim 20, further comprising a third non-intrusive sensor for sensing motion of the basketball during the basketball shot, the third non-intrusive sensor configured to provide fourth data indicative of the motion of the basketball sensed by the third non-intrusive sensor, wherein the at least one processor is configured to determine, based on the fourth data, at least one parameter indicative of a trajectory of the basketball during the basketball shot.

27. The system of claim 20, further comprises at least one feedback output mechanism configured to output the shooting parameter.

28. The system of claim 20, wherein the shooting parameter is indicative of a shooting percentage for the shooter over a plurality of basketball shots by the shooter.

29. The system of claim 20, wherein the at least one processor configured to identify the shooter shooting the basketball shot based on the second data.

30. The system of claim 29, wherein the second non-intrusive sensor comprises an accelerometer.

31. A system for monitoring basketball shots, comprising:
a first non-intrusive sensor for sensing motion of a basketball as the basketball passes through a net of a basketball goal during a basketball shot, the first non-intrusive sensor configured to provide first data indicative of the sensed motion of the basketball;

a second non-intrusive sensor configured to provide second data for use in identifying a shooter of the basketball shot, wherein the second non-intrusive sensor is configured to sense a launching motion associated with the shooter launching the basketball toward the basketball goal during the basketball shot, and wherein the second data is based on the sensed launching motion;

memory; and at least one processor configured to receive the first data and the second data, the at least one processor configured to determine whether the basketball shot is made based on the first data and to identify the shooter based on the second data, the at least one processor further configured to store in the memory third data indicating whether the basketball shot is determined to be made by the at least one processor, wherein the at least one processor is configured to associate the third data in the memory with an identifier identifying the shooter, wherein the third data associated with the identifier indicates whether a plurality of basketball shots by the shooter have been determined to be made by the at least one processor, and wherein the at least one processor is configured to calculate a shooting parameter for the shooter over the plurality of basketball shots by the shooter based on the third data and the identifier.

32. The system of claim 31, wherein the second non-intrusive sensor comprises an accelerometer.

33. The method of claim 31, wherein the second non-intrusive sensor is worn by the shooter.

34. The method of claim 33, wherein the first non-intrusive sensor is coupled to the one of the group consisting of: the basketball and the net.

* * * * *